(12) United States Patent
Tojo

(10) Patent No.: US 8,718,128 B2
(45) Date of Patent: May 6, 2014

(54) MOVING IMAGE PROCESSING METHOD AND APPARATUS

(75) Inventor: Hiroshi Tojo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 3556 days.

(21) Appl. No.: 10/829,437

(22) Filed: Apr. 22, 2004

(65) Prior Publication Data

US 2004/0239769 A1      Dec. 2, 2004

(30) Foreign Application Priority Data

May 7, 2003   (JP) ................................. 2003-129454
May 7, 2003   (JP) ................................. 2003-129455

(51) Int. Cl.
*H04N 7/12*          (2006.01)

(52) U.S. Cl.
USPC ................................ 375/240.01; 348/207.99

(58) Field of Classification Search
USPC ............................... 382/190, 103; 375/240.01
See application file for complete search history.

(56) References Cited

U.S. PATENT DOCUMENTS

| 5,809,202 A | 9/1998 | Gotoh et al. ................. 386/69 |
| 6,571,052 B1 | 5/2003 | Wakimoto et al. ............. 386/55 |
| 6,625,383 B1 | 9/2003 | Wakimoto et al. ............. 386/46 |
| 6,842,197 B1 * | 1/2005 | Llach-Pinsach et al. ..... 348/700 |
| 2002/0152267 A1 * | 10/2002 | Lennon ......................... 709/203 |
| 2003/0016942 A1 | 1/2003 | Tojo et al. ..................... 386/46 |
| 2003/0095789 A1 | 5/2003 | Wakimoto et al. ............. 386/52 |
| 2004/0085341 A1 * | 5/2004 | Hua et al. ..................... 345/723 |
| 2004/0086265 A1 | 5/2004 | Tojo et al. ..................... 386/69 |

FOREIGN PATENT DOCUMENTS

| JP | 07-023322 | | 1/1995 |
| JP | 07023322 | * | 1/1995 |
| JP | 08163488 | * | 6/1995 |
| JP | 8-163488 | | 6/1996 |
| JP | 3192663 | | 5/2001 |

OTHER PUBLICATIONS

Kenichi Kanatani, "Image Understanding", Morikita Shuppan Kabushiki Kaisha, May 24, 1990.

* cited by examiner

*Primary Examiner* — Jay Patel
*Assistant Examiner* — Jessica Prince
(74) *Attorney, Agent, or Firm* — Fitzpatrick, Cella, Harper & Scinto

(57) ABSTRACT

A moving image is divided on the basis of a plurality of items of additional data which indicate states upon sensing the moving image. The additional data is added to the moving image and is able to be read out for each item from the moving image. An item group formed of one or a plurality of items selected from the plurality of items is defined, and division information corresponding to the item group is generated on the basis of the additional data of the items which belong to the item group. In a case that a plurality of division information are generated in correspondence with a plurality of item groups, the plurality of division information generated for each item group are hierarchized, and division positions are added. The division information is held in correspondence with the moving image data.

12 Claims, 37 Drawing Sheets

F I G. 6
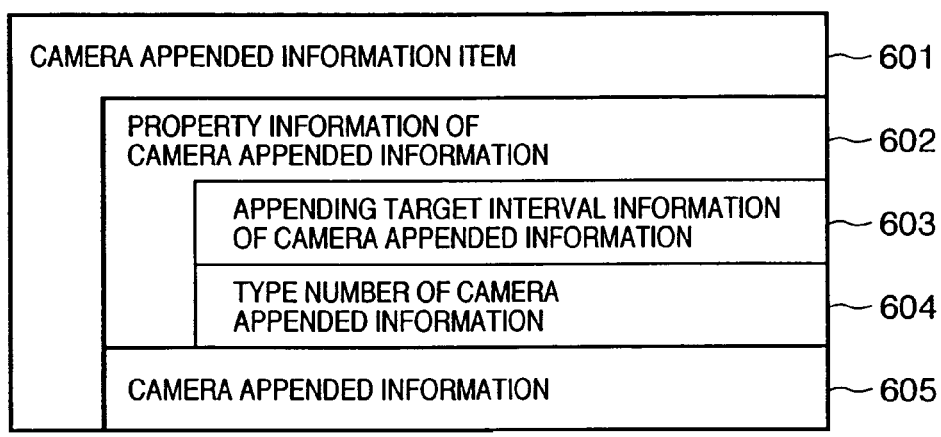

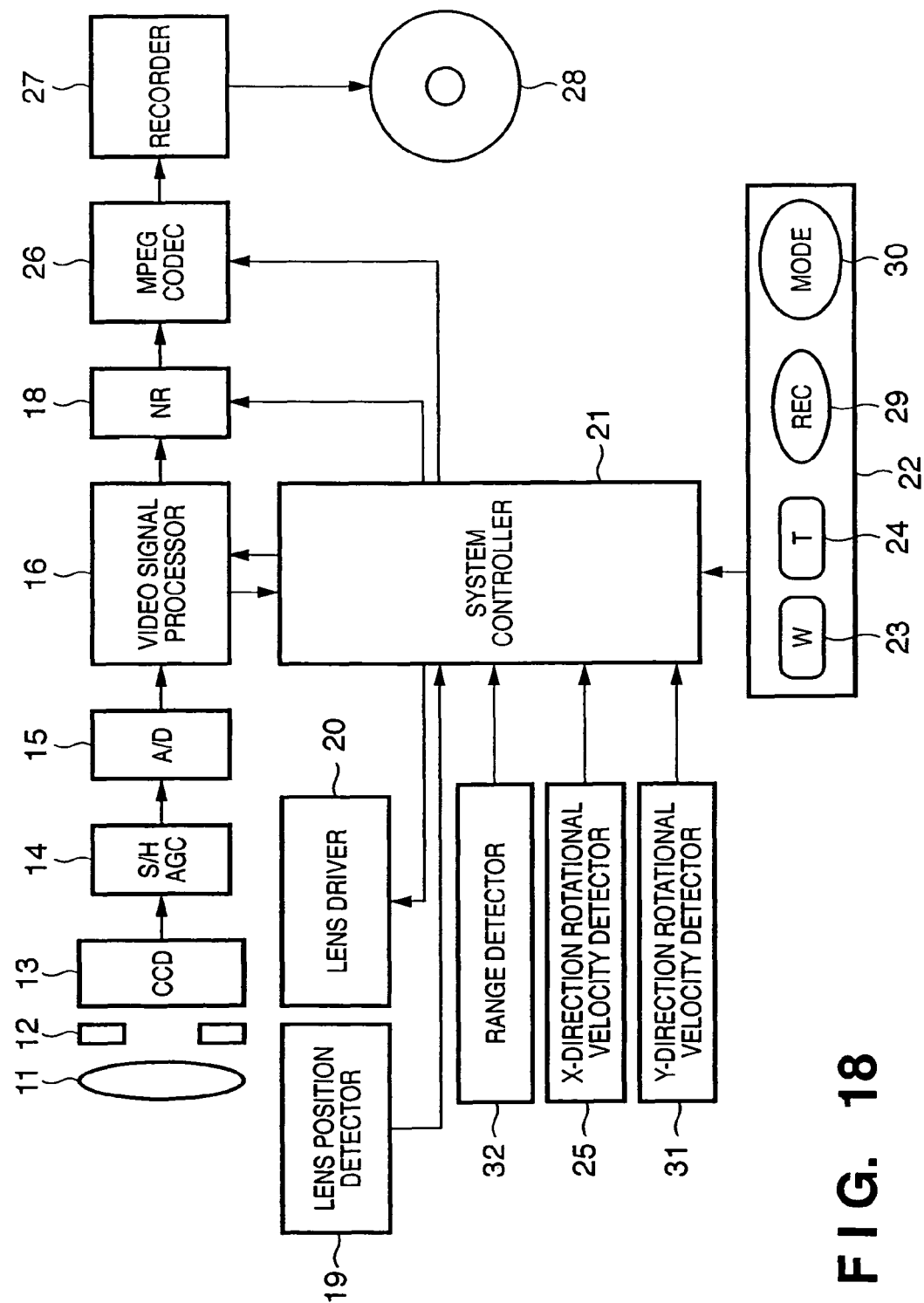
F I G. 18

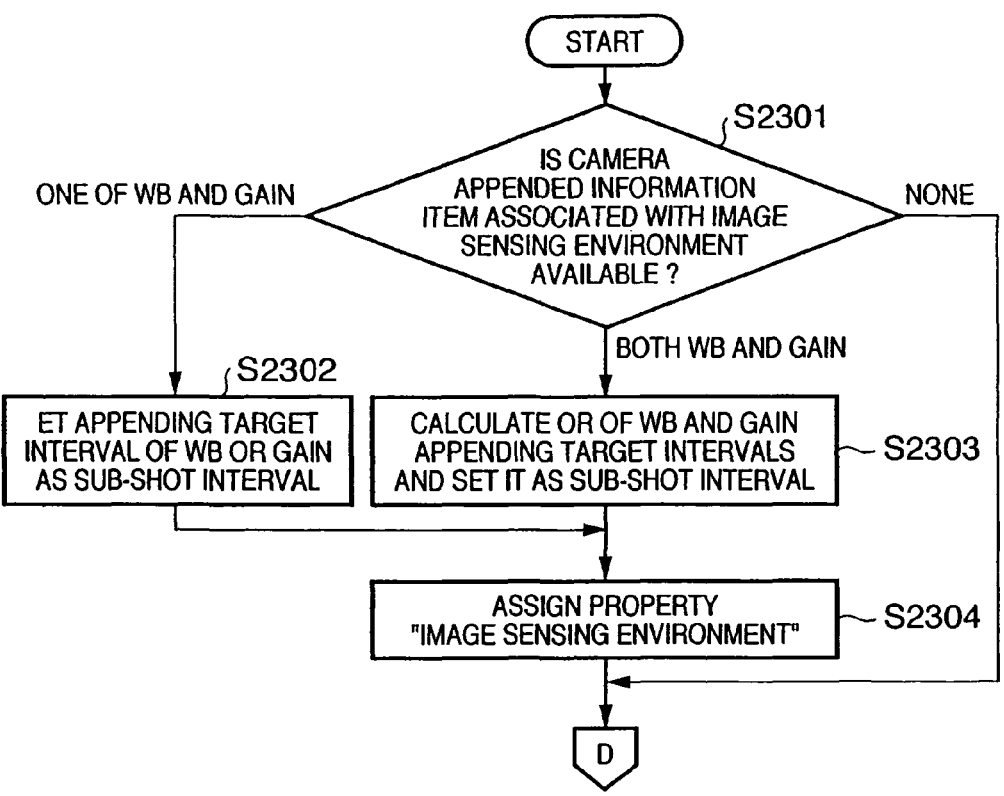
F I G. 23A

MOVING IMAGE PROCESSING METHOD AND APPARATUS

FIELD OF THE INVENTION

The present invention relates to a technique for dividing a moving image by utilizing the changing points of operations and states of an image sensing device, and the like.

BACKGROUND OF THE INVENTION

In general, as described in Japanese Patent Laid-Open No. 8-163488 and Japanese Patent No. 3,192,663, since a moving image is divided in correspondence with the changing points of operations (pan, tilt) or states (focus and the like) of a moving image sensing device, a playback process from a desired location, a moving image edit process, and an automatic generation of a summary of a moving image can be achieved, thus allowing easy confirmation of the contents. Such method is effective especially when one moving image contains various subjects to be sensed or when an image sensing environment changes.

However, as a moving image gets longer, and as that moving image includes more subjects to be sensed and more changes in image sensing environment, the moving image is divided into a large number of intervals by the conventional method.

For example, FIG. 17 is a view for explaining the conventional moving image dividing technique. (a) of FIG. 17 shows the changing points (Gain, White Balance, subject distance, Zoom, Pan) of the operation intervals and the states of the image sensing device with respect to a single moving image for respective items. (b) of FIG. 17 shows the image dividing result using these Gain, White Balance, subject distance, Zoom, and Pan items. As shown in (b) of FIG. 17, since division positions based on a plurality of different items are present together, the moving image is segmented into many intervals. Also, when a given interval is determined by a plurality of different items, it does not become a significant unit (note that the significant unit means, for example, an interval where subject A appears). For example, interval A in (b) of FIG. 17 starts from a changing point of White balance, and ends at an end point of Pan operation, and does not form a significant unit.

The aforementioned moving image is often obtained when an amateur photographer makes an image sensing operation. Since such amateur photographer is not used to do such image sensing, he or she tends to sense an image while seeking a subject to be sensed. In such situation, in order to search for a desired interval in a moving image, each individual interval takes much confirmation time, and the load on the user cannot be reduced.

SUMMARY OF THE INVENTION

The present invention has been made in consideration of the aforementioned problems, and has as its object to quickly find a desired position and to allow easy playback and edit processes even when a moving image is divided into many intervals based on changes in operation or state of an image sensing device.

In order to achieve the above object, a moving image processing method according to the present invention, comprising:

a first generation step of generating division information required to divide a moving image on the basis of each of a plurality of items of data which indicate states upon sensing the moving image;

a registration step of registering the division information, which is generated in the first generation step and corresponds to each of the plurality of items, in correspondence with the moving image data, so as to be able to be read out for each item; and a second generation step of integrating one or a plurality of pieces of division information corresponding to one or a plurality of items selected from the plurality of items and generating integrated division information corresponding to a combination of the items.

In order to achieve the above object, a moving image processing method according to another aspect of the present invention, for processing moving image data for which a plurality of pieces of division information required to divide a moving image on the basis of each of a plurality of items of data which indicate states upon sensing the moving image, so as to be able to be read out for each item, comprising:

a first generation step of defining an item group formed of one or a plurality of items selected from the plurality of items, and generating integrated division information corresponding to the item group by integrating one or a plurality of pieces of division information corresponding to the items which belong to the item group; and a holding step of holding a plurality of pieces of integrated division information, which are generated in the first generation step for a plurality of different item groups, in correspondence with the moving image data.

In order to achieve the above object, a moving image processing apparatus according to the present invention comprises the following arrangement. That is, a moving image processing apparatus comprising:

first generation unit adapted to generate division information required to divide a moving image on the basis of each of a plurality of items of data which indicate states upon sensing the moving image;

registration unit adapted to register the division information, which is generated by the first generation unit and corresponds to each of the plurality of items, in correspondence with the moving image data, so as to be able to be read out for each item; and second generation unit adapted to integrate one or a plurality of pieces of division information corresponding to one or a plurality of items selected from the plurality of items and generating integrated division information corresponding to a combination of the items.

Furthermore, in order to achieve the above object, a moving image processing method according to the present invention, further comprising a setting step of setting the hierarchical order of the plurality of pieces of integrated division information on the basis of division counts of the integrated division information.

Also, in order to achieve the above object, a moving image processing apparatus according to the present invention comprises the following arrangement. That is, a moving image processing apparatus for processing moving image data for which a plurality of pieces of division information required to divide a moving image on the basis of each of a plurality of items of data which indicate states upon sensing the moving image, so as to be able to be read out for each item, comprising:

generation unit adapted to define an item group formed of one or a plurality of items selected from the plurality of items, and generating integrated division information corresponding to the item group by integrating one or a plurality of pieces of division information corresponding to the items which belong to the item group;

hierarchization unit adapted to add division positions based on integrated division information of an upper layer to division positions of integrated division information of a lower layer in accordance with a hierarchical order of a plurality of pieces of integrated division information, which are generated by the generation unit in correspondence with a plurality of different item groups; and holding unit adapted to hold the integrated division information obtained by the hierarchization unit in correspondence with the moving image data.

According to the present invention, even when a moving image is divided into many intervals based on changes in operation or state of an image sensing device, a desired position can be quickly found and playback and edit processes can be easily made.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows an example of the internal structure of a camera appended information item shown in FIG. 5;

FIG. 18 is a block diagram showing the arrangement of an image sensing device according to the fourth to sixth embodiment;

FIG. 23A is a flow chart showing the detailed sequence of a sub-shot division process of the browse device;

DETAILED DESCRIPTION OF THE PREFERRED EMBODIMENTS

Preferred embodiments of the present invention will now be described in detail in accordance with the accompanying drawings.

First Embodiment

Figure 1:
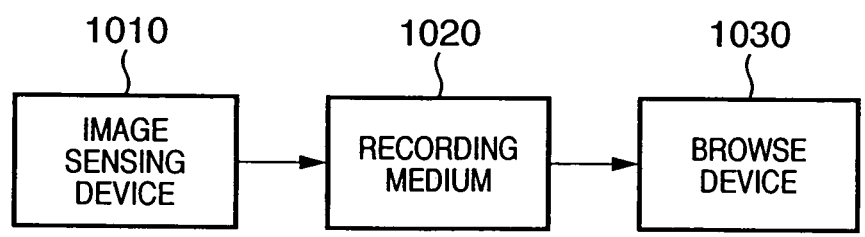
FIG. 1 is a schematic block diagram showing the arrangement of a moving image processing system in an embodiment of the present invention.

FIG. 1 is a block diagram showing the arrangement of a moving image processing system according to the first embodiment. Referring to FIG. 1, reference numeral 1010 denotes an image sensing device which senses a moving image. Reference numeral 1020 denotes a storage medium which is used to store a moving image and the like. Reference numeral 1030 denotes a browse device which is used to browse and play back a moving image stored in the storage device 1020. The image sensing device 1010 and its control method according to this embodiment and an embodiment of a storage medium will be described below.

Figure 2:
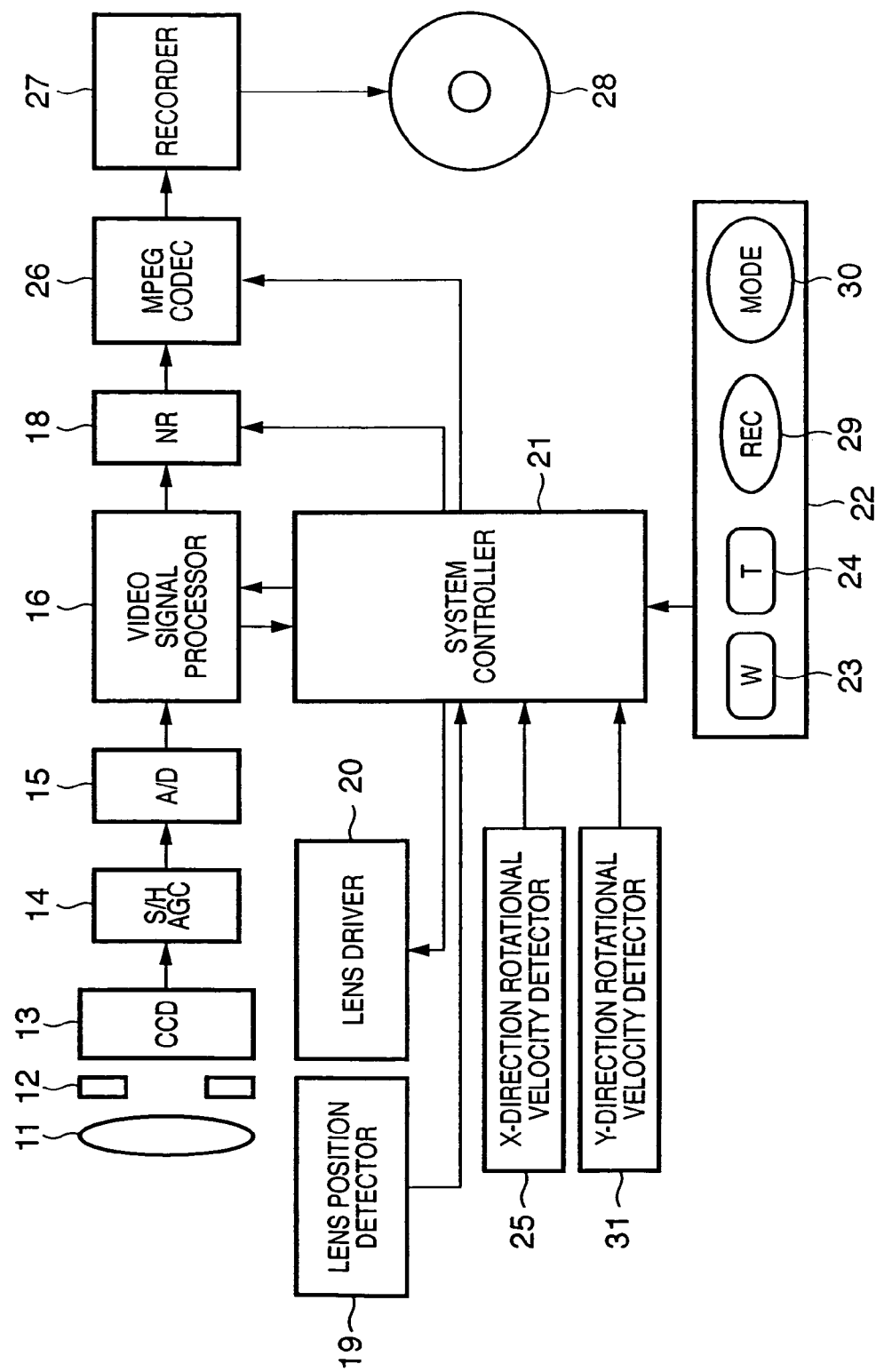
FIG. 2 is a block diagram showing the arrangement of an image sensing device according to the first to third embodiments.

FIG. 2 is a block diagram showing the arrangement of the image sensing device in this embodiment. Referring to FIG. 2, reference numeral 11 denotes a lens unit which includes a focus lens used to adjust the subject distance and a zoom lens used to adjust the focal length, and forms a subject image on an image sensing element 13. Reference numeral 12 denotes an aperture used to adjust the amount of light that reaches the image sensing element 13. The image sensing element 13 includes a CCD that converts input light into an electrical signal. Reference numeral 14 denotes a sample & hold/AGC circuit, which executes a sample & hold process and gain adjustment. Reference numeral 15 denotes an A/D converter for performing analog-to-digital (A/D) conversion. Reference numeral 16 denotes a video signal processor which processes a signal and generates a video signal. Reference numeral 18 denotes a noise reduction (NR) unit which has a field memory, and removes noise of a video signal. Reference numeral 19 denotes a lens position detector which detects the lens position. Reference numeral 20 denotes a lens driver which drives the lens.

Figure 3:
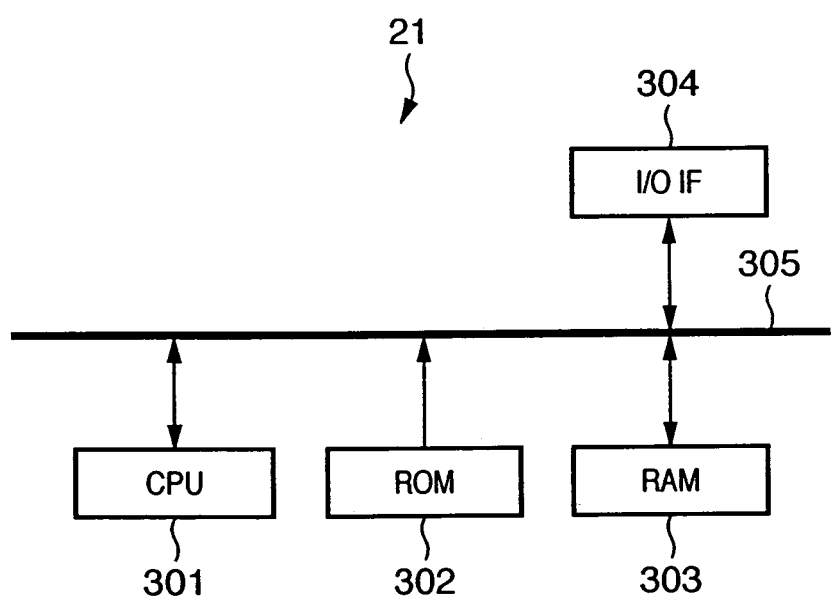
FIG. 3 is a block diagram showing the arrangement of a system controller in the image sensing device shown in FIG. 2.

Reference numeral 21 denotes a system controller which controls the overall image sensing device. FIG. 3 is a block diagram showing the arrangement of the system controller 21. The system controller 21 has a known CPU 301, ROM 302, RAM 303, I/O interface 304, and bus 305. The ROM 302 stores programs (to be described later) to be executed by the CPU 301, table values, and the like.

Reference numeral 22 denotes a user operation unit on which keys used by the user to operate the image sensing device are arranged. Reference numeral 23 denotes a wide key for moving the zoom lens in a wide (wide angle=to reduce an image) direction; and 24, a tele key for moving the zoom lens in a tele (telephoto=to enlarge an image) direction. The wide and tele keys 23 and 24 are, for example, seesaw type interlocking keys, and output an output signal indicating which of keys is pressed and a pressure at that time to the system controller 21. Note that the pressure determines the enlargement/reduction speed. Reference numeral 29 denotes a video recording button. When this button 29 is turned on, the system controller 21 sets the image sensing device in a video recording mode. Reference numeral 30 denotes a mode dial. The user operates this mode dial to make various setups. For example, the user can set a focus mode (auto/manual), exposure mode (auto, gain priority, shutter speed priority, aperture priority, manual), White Balance Mode (to be abbreviated as WB Mode hereinafter) (preset—sunlight, cloudy, incandescent lamp, fluorescent lamp), and so forth.

The set information is input to the system controller 21, which controls the image sensing device in accordance with such information. The noise reduction (NR) unit 18 is formed of a cyclic noise reduction circuit. Reference numeral 26 denotes an MPEG CODEC that encodes video data into an MPEG-2 format. Reference numeral 27 denotes a recorder which includes a drive for driving a recording medium and recording information. Reference numeral 28 denotes a recording medium which includes an optical disk, magnetic disk, magnetooptical disk, magnetic tape, hard disk, nonvolatile semiconductor memory (for example, flash memory), and the like. Reference numeral 25 denotes an X-rotational velocity detector which detects the velocity upon moving the image sensing device in the horizontal direction using a gyro sensor or the like. Reference numeral 31 denotes a Y-rotational velocity detector which detects the velocity upon moving the image sensing device in the vertical direction using a gyro sensor or the like, as in the X-rotational velocity detector 25.

An outline of the operation of the image sensing device with the above arrangement will be explained below. The amount of light, which comes from the subject and is received by the lens unit 11, is adjusted by the aperture 12, and that light forms an image on the surface of the image sensing element 13. The light is converted into an electrical signal by the image sensing element 13. The electrical signal is A/D-converted by the A/D converter 15 via the sample & hold/AGC unit 14, and the converted digital signal is input to the video signal processor 16. The video signal processor 16 generates a video signal by applying processes such as aperture correction, gamma correction, white balance correction, and the like for respective luminance and color components of the input signal, and outputs that video signal to the noise reduction unit 18. The noise reduction unit 18 removes noise of the video signal under the control of a control signal from the system controller 21. The noise-removed video signal is output to the MPEG CODEC 26. The MPEG CODEC 26 encodes the input video signal. At this time, the MPEG CODEC 26 stores camera appended information (to be described later) input from the system controller 21 in a file together with the encoded video signal, and outputs the stored file to a recording device or the like connected to the MPEG CODEC 26.

The system controller 21 controls the respective units of the image sensing device. Also, the system controller 21 controls the lens driver 20 or a digital zoom unit 17 upon depression of the wide or tele key 23 or 24 of the zoom operation key unit (user operation unit) 22 so as to move the zoom lens in the wide or tele direction. Furthermore, the system controller 21 determines the current position of the zoom lens (that is, the tele end (telephoto end), the wide end (wide-angle end), or a position between the tele and wide ends (zoom magnification)) on the basis of the lens position detection signal from the lens position detector 19.

The system controller 21 switches a noise reduction control value depending on whether the optical zoom function is inactive or active using a control signal to be output to the noise reduction unit 18. With this signal, a noise reduction effect, that is, noise reduction amount, is varied. At this time, the control value to be switched is a cyclic coefficient K. The control value is also switched depending on the brightness of a subject using the control signal. That is, as the brightness of a subject becomes lower, the S/N of a video signal deteriorates. Hence, to compensate for such deterioration, the control value is switched to enhance the noise reduction effect. Moreover, the system controller 21 controls the aperture 12, the sample & hold/AGC unit 14, a digital shutter (not shown in FIG. 2), and the like so as to maintain the level of a video signal to be generated to a predetermined value with respect to the amount of a light signal from a subject, and comprehensively determines the brightness of a subject on the basis of the aperture value, AGC gain, digital shutter speed, and the like used in such exposure control.

In the above arrangement, the image sensing device of this embodiment appends camera appended information to each sensed frame. The camera appended information is information that can be appended by the image sensing device and pertains to a moving image. This camera appended information includes various kinds of additional information such as information associated with aperture correction, gamma correction, and WB correction used when the system controller 21 controls the video signal processor 16, noise reduction unit 18, digital zoom unit 17, and lens driver 20, information obtained from sensors such as the lens position detector 19, X-rotational velocity detector 25, and the like, information (WB Mode or the like) associated with user's setups obtained from the user operation unit 22, information associated with user's operation (zoom operation or the like) obtained from the user operation unit 22, and so on. If the image sensing device has other sensors such as a thermometer, hygrometer, and the like (not shown in FIG. 2), information from such sensors can be used as the camera appended information. Furthermore, information of external devices such as accessories (electronic flash or the like), measuring instruments, and the like connected to the image sensing device 1010 can also be used as the camera appended information as long as a correspondence between such information and a video can be determined.

Figure 4:
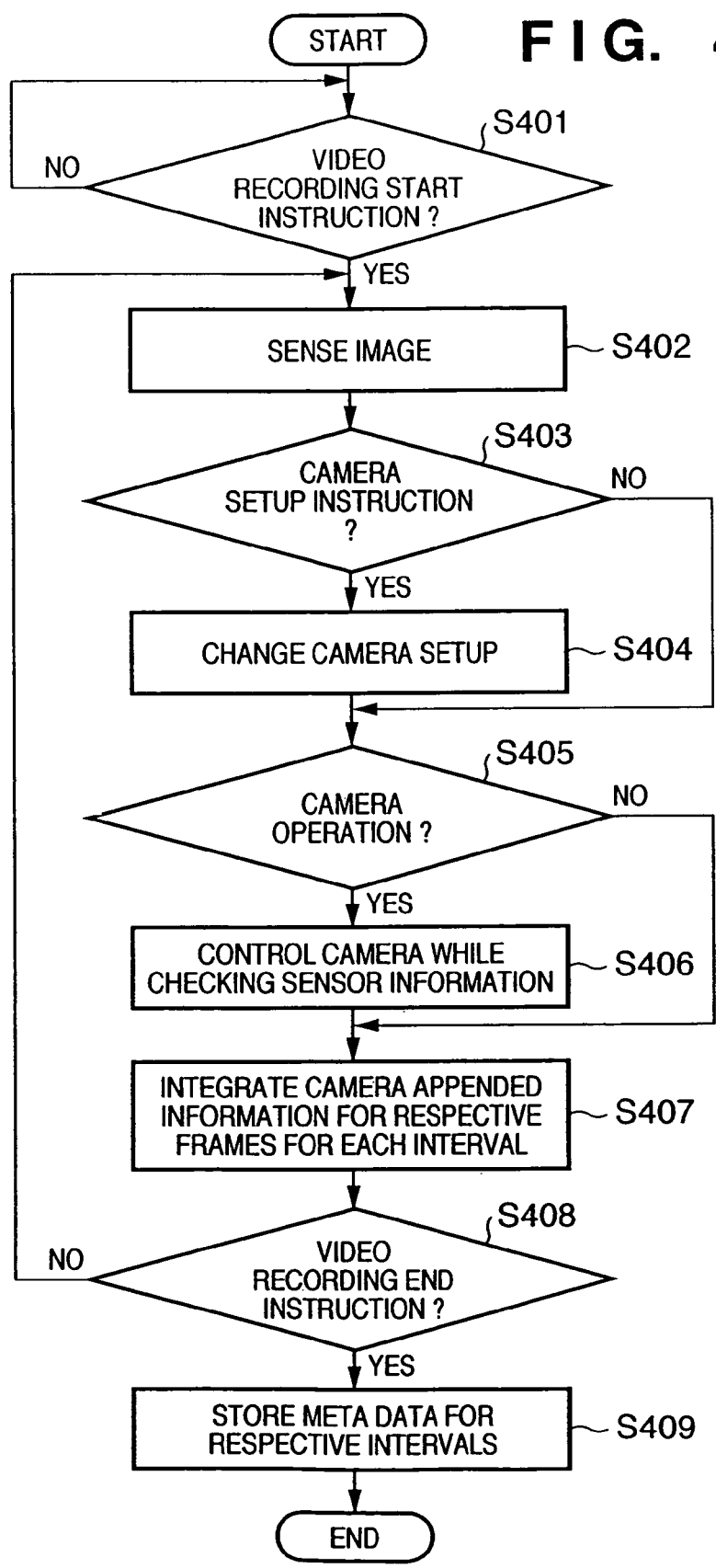
FIG. 4 is a flow chart showing the sequence of a moving image sensing process by the image sensing device of the first to third embodiments.

The sequence of a moving image sensing process of the image sensing device 1010 will be described below with reference to the flow chart shown in FIG. 4. It is checked in step S401 if the user has turned on the video recording button 29 to input a video recording start instruction. The image sensing device 1010 stands by until the video recording start instruction is input. If the video recording start instruction is input, the video recording mode is set, and the flow advances to step S402. At this time, the system controller 21 sends the video recording start time to the MPEG CODEC 26 and controls it to describe that time in a file header. In step S402, the system controller 21 controls the image sensing device 1010 on the basis of aforementioned information from various sensors and the like to sense an image for one frame. At this time, the control information of the image sensing device 1010 is held in the RAM 303 as camera appended information for each frame. Table 1 below shows setup information associated with Gain as an example of the format of control information.

TABLE 1

Example of control information
Gain

| Field Name | Size | Description |
|---|---|---|
| Gain Value Factor | 8 bits | Describe Gain Value (unit: dB) using coefficient GF of: Gain value = GF × 3 [dB] |

It is checked in step S403 if the user has made camera setups via the camera operation unit 22. If the camera setups have been made, the system controller 21 changes the camera setups in step S404. At this time, the changed camera setup information is held in the RAM 303 as camera appended information for each frame. Table 2 below shows setup information associated with WB as an example of the format of setup information that serves as the camera appended information.

TABLE 2

Example of setup information
White Balance

| Field Name | Size | Description |
|---|---|---|
| White Balance Mode | 4 bits | Describe White Balance Mode using following IDs: 1: preset - sunlight 2: preset - cloudy 3: preset - incandescent lamp 4: preset - fluorescent lamp |

It is checked in step S405 if the user has operated the camera. Whether or not the camera operation has been made can be determined as follows. For example, a zoom operation can be determined by checking if the user has operated the wide or tele key 23 or 24 of the user operation unit 22, and a pan/tilt operation can be detected based on the X- or Y-rotational velocity detector 25 or 31. If the camera has been operated, the flow advances to step S406, and the system controller 21 controls the image sensing device in correspondence with that operation while checking various kinds of sensor information. At this time, information associated with the operation is held in the RAM 303 as camera appended information for each frame. Table 3 below shows setup information associated with Zoom and Pan as an example of the format of operation information which serves as the camera appended information.

TABLE 3

Example of Operation information

| Field Name | Size | Description |
|---|---|---|
| Zoom | | |
| Direction | 1 bit | Describe zoom direction 0: tele 1: wide |
| Magnification | 8 Bits | Describe Zoom magnification using integer value |
| Pan | | |
| Direction | 1 bit | Describe Pan direction 0: left 1: right |
| Speed | 4 bits | Describe Pan Speed in three steps: STEP-1: low speed STEP-2: middle speed STEP-3: high speed |

The camera appended information for each frame, which is held in the RAM 303 in steps S402, S404, and S406, is managed in bit fields for each frame, and is held for a predetermined number of frames. In step S407, respective items of camera appended information for respective fields held in the RAM 303 are referred to, and the contents of items that can be integrated for each interval are held together in the RAM 303.

Tables 4 to 6 below show examples of items of camera appended information for each interval. In order to integrate the contents of items for each interval, if the contents of Gain for respective frames are to be integrated for each interval, an interval corresponding to frames with the Gain value=0 is set as one interval, and an interval corresponding to frames with the Gain value>0 is set as another interval. In case of WB, an interval corresponding to frames with the identical WB mode is set as one interval. In case of Zoom, an interval corresponding to frames from the beginning to the end of the Zoom operation is set as one interval. In case of Pan, an interval corresponding to frames from the beginning to the end of the Pan operation is set as one interval. At this time, the frame positions of the start and end points of each interval are stored in association with each other as time information from the beginning of image sensing of that shot. Note that frame numbers may be used as the start and end points of the interval in place of the time information as long as the frame positions can be specified.

TABLE 4

Example of control information
Gain

| Field Name | Size | Description |
|---|---|---|
| Gain Value | 1 bit | 0: interval with Gain value = 0 1: interval with +Gain value |

TABLE 5

Example of setup information
White Balance

| Field Name | Size | Description |
|---|---|---|
| White Balance Mode | 4 bits | Same as that for each frame |

TABLE 6

Example of Operation information

| Field Name | Size | Description |
|---|---|---|
| Zoom | | |
| Direction | 1 bit | Same as that for each frame |
| Start Magnification | 8 Bits | Describe Zoom magnification at Zoom operation start position using integer value |
| End Magnification | 8 Bits | Describe Zoom magnification at Zoom operation end position using integer value |
| Pan | | |
| Direction | 1 bit | Same as that for each frame |
| Speed | 4 bits | Express Pan average speed in three steps: STEP-1: low speed STEP-2: middle speed STEP-3: high speed |

It is checked in step S408 if the user has issued a video recording end instruction (for example, by turning off the video recording button 29). If no video recording end instruction is input, steps S402 to S407 are repeated to continue video recording. On the other hand, if the video recording end instruction is input, the flow advances to step S409 to store the camera appended information for respective intervals held in the RAM 303. That is, all pieces of camera appended information for respective intervals are sent from the system controller 21 to the MPEG CODEC 26, and are appended as a footer to the latter half of video data, which is then sent to the recorder 27. As this method, for example, all the pieces of camera appended information for respective intervals are converted into a private stream of TS (Transport Stream) packets, which can be additionally written at the end of video data. In this embodiment, one shot from the beginning to the end of video recording forms one file, and camera operation information associated with one shot is appended as a footer of that file.

Figure 5:
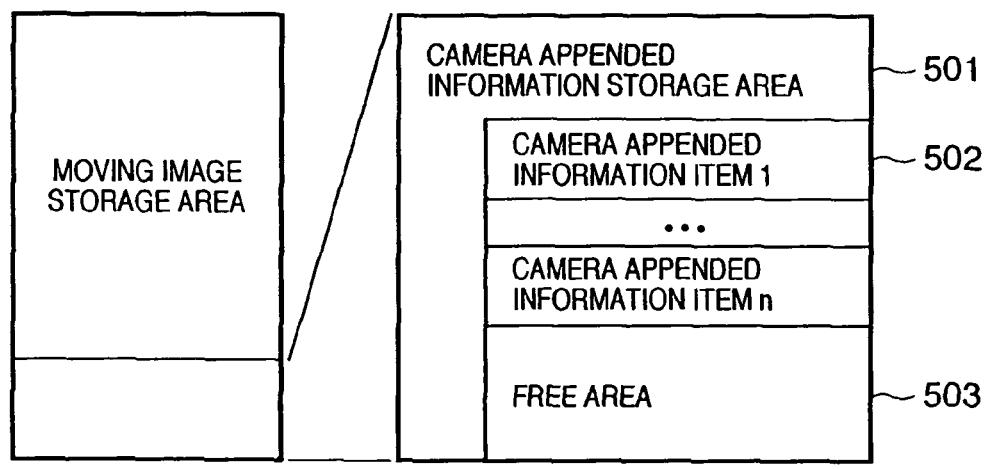
FIG. 5 shows an example of the storage format of camera appended information.

FIG. 5 shows an example of the format upon storing the camera appended information for respective intervals as the footer. FIG. 5 shows the storage format of camera appended information contained in a moving image file, which is recorded in the recording medium 28. This moving image file is appended with camera appended information that shortly expresses information such as the contents of moving image information and the like together with the moving image information. More specifically, the moving image file has a moving image storage area and camera appended information storage area, and the storage format of the camera appended information shown in FIG. 5 represents the internal structure of this camera appended information storage area. A camera appended information storage area 501 has some camera appended information items 502 each having a fixed length size, and the remaining area as a free area 503.

FIG. 6 shows the internal structure of the camera appended information item 502 shown in FIG. 5. Referring to FIG. 6, a camera appended information item 601 has some fixed-length items. The contents of the camera appended information item 601 are roughly divided into two fields, one of which stores camera appended information property information 602, and the other of which stores camera appended information 605. The camera appended information property information 602 further has an internal structure, which includes appending target interval information 603 of camera appended information, and a camera appended information type number 604.

The camera appended information type number 604 is used to identify camera appended information, and stores an identification number which is assigned in advance to each individual camera appended information (for example, "10" for zoom information upon image sensing). Using this type number 604, a moving image processing device can search for specific camera appended information in a moving image file. The appending target interval information 603 of camera appended information expresses an interval of moving image data to which the camera appended information is to be appended using time information.

The browse device of this embodiment, which is used to browse a moving image file obtained by the aforementioned image sensing device, will be described below.

Figure 7:
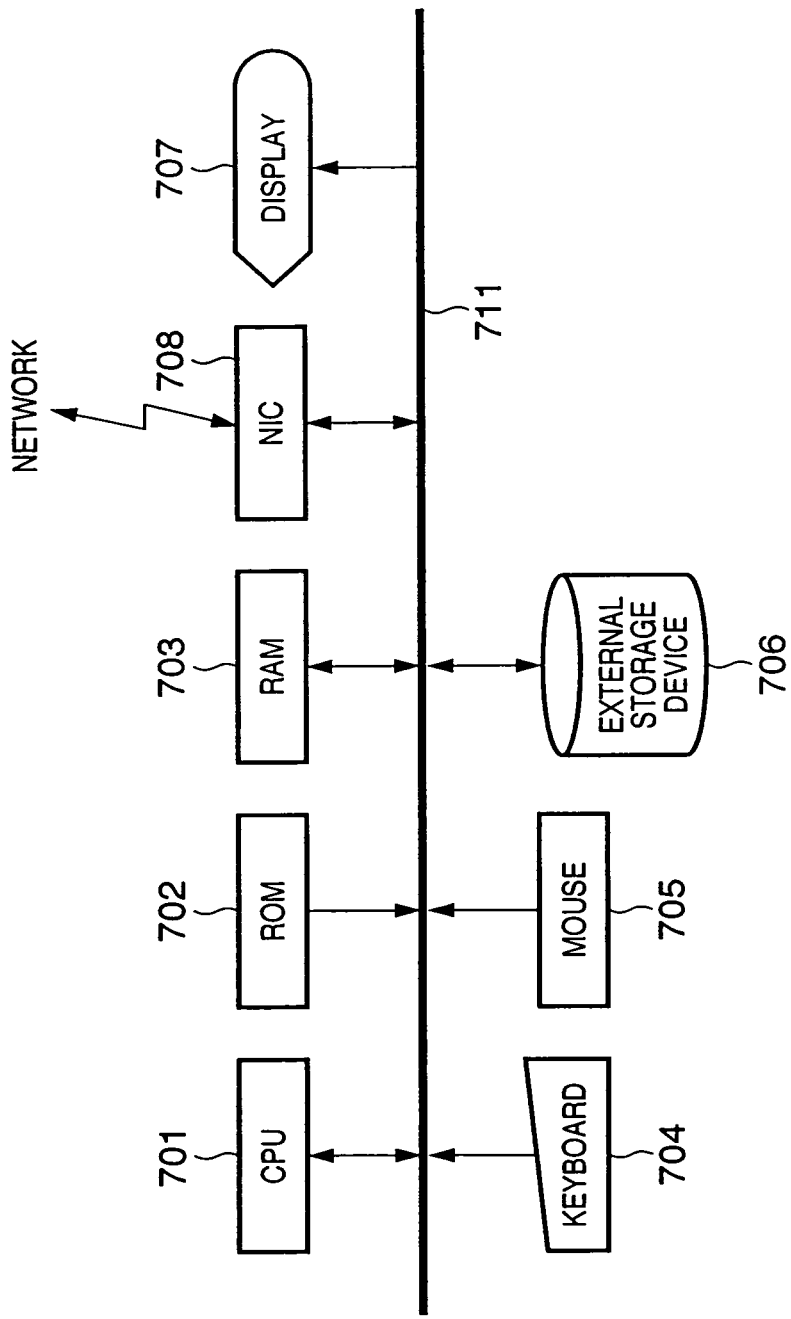
FIG. 7 is a block diagram showing the control arrangement of a browse device according to an embodiment of the present invention.

FIG. 7 is a block diagram showing the control arrangement of the browse device of this embodiment. Referring to FIG. 7, reference numeral 701 denotes a CPU, which executes various kinds of control in the browse device of this embodiment. Reference numeral 702 denotes a ROM, which stores a boot program upon booting this device, and various data. Reference numeral 703 denotes a RAM, which stores control programs to be processed by the CPU 701, and provides a work area used when the CPU 701 executes various kinds of control. Reference numeral 704 denotes a keyboard; and 705, a mouse, which provide various input operation environments for the user.

Reference numeral 706 denotes an external storage device which comprises at least one of a hard disk, Floppy® disk, optical disk, magnetic disk, magnetooptical disk, magnetic tape, nonvolatile memory (for example, flash memory), and the like. Reference numeral 707 denotes a display unit which comprises, for example, a display, and displays various processing results and the like to the user under the control of the CPU 701. Reference numeral 708 denotes a network interface which allows communications with respective devices on the network. Reference numeral 711 denotes a bus which interconnects the above components.

Figure 8:
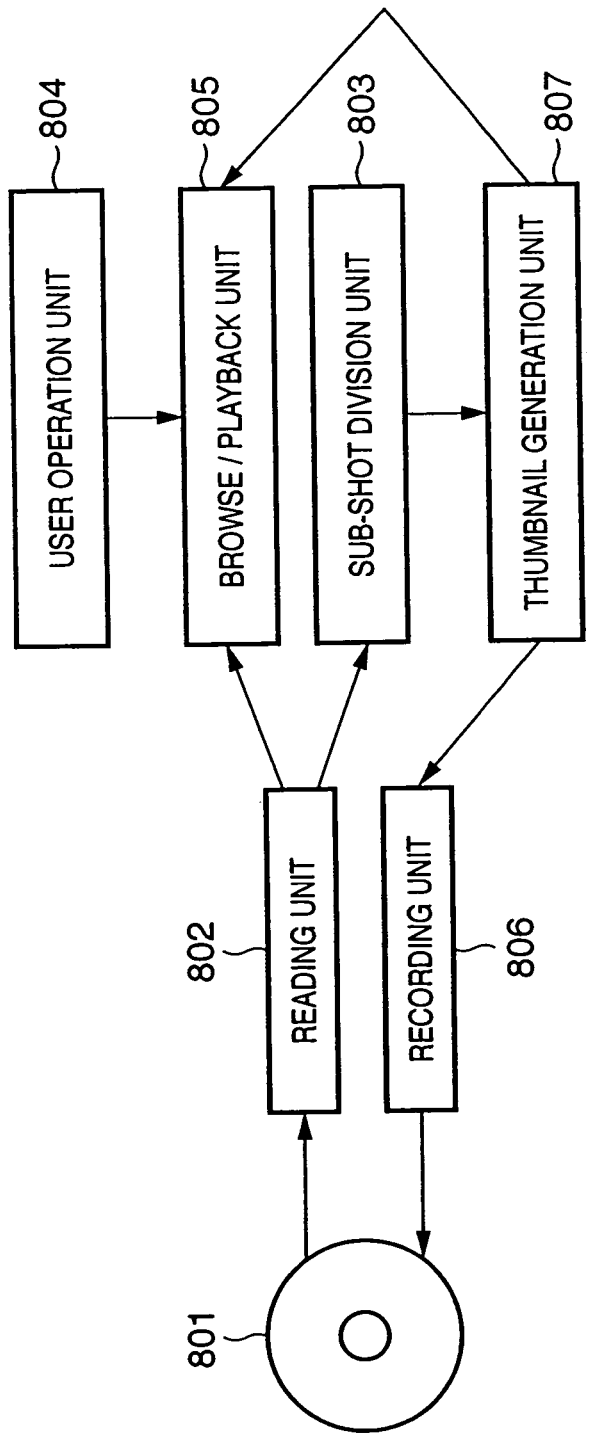
FIG. 8 is a block diagram showing the functional arrangement of the browse device according to the first embodiment.

FIG. 8 is a block diagram showing the functional arrangement of the browse device of this embodiment. Reference numeral 801 denotes a storage medium, which corresponds to the storage medium 28 in FIG. 2. Reference numeral 802 denotes a reading unit, which reads a moving image and camera appended information on the storage medium 801. Reference numeral 803 denotes a sub-shot division unit, which divides a moving image into significant intervals (sub-shots) on the basis of the aforementioned camera appended information which is appended to the footer of moving image data. Reference numeral 807 denotes a thumbnail generation unit which generates thumbnails of sub-shots determined by the sub-shot division unit 803. Reference numeral 806 denotes a recording unit which records division points determined by the sub-shot division unit 803 on the storage medium 801 as sub-shot information, and also records the thumbnails generated by the thumbnail generation unit 807 on the storage medium 801. Reference numeral 804 denotes a user operation unit, which includes the keyboard 704 and mouse 705 and is used to input a moving image playback instruction and the like. Reference numeral 805 denotes a browse/playback unit which allows a browse process, playback process, and the like of a moving image file on the display unit 707 on the basis of user's instruction input via the user operation unit 804.

Figure 15:
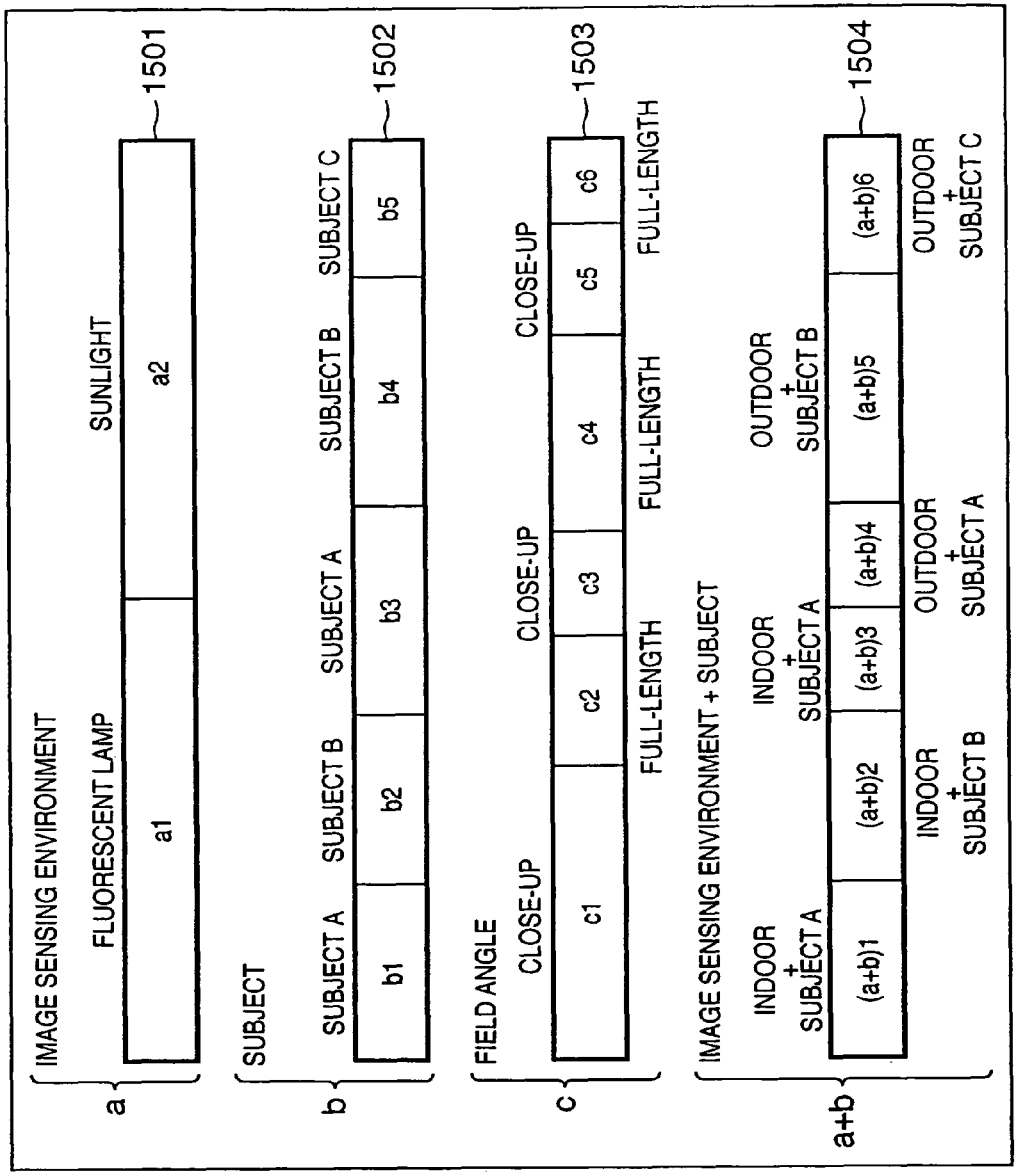
FIG. 15 is view for explaining an outline of the sub-shot division process.

The sub-shot division process will be explained below. FIG. 15 is view for explaining an outline of the sub-shot division process. In FIG. 15, 1501 to 1504 indicate moving image data in a single moving image file (single shot), which is divided into significant intervals (also called sub-shots) on the basis of respective viewpoints. Note that "divide" means determining division points of sub-shots, and does not means actually separating a moving image file.

Referring to FIG. 15, reference numeral 1501 denotes a division result which is obtained by dividing moving image data from the viewpoint of image sensing environments. In this example, moving image data is divided into two sub-shots, that is, an interval (a1) as an indoor image sensing interval under the light of the fluorescent lamp, and an interval (a2) as an outdoor image sensing interval under the sunlight. Reference numeral 1502 denotes a division result which is obtained by dividing moving image data from the viewpoint of sensed subjects. In this example, moving image data is divided into five sub-shots, that is, intervals (b1, b3) as image sensing intervals of subject A, intervals (b2, b4) as image sensing intervals of subject B, and an interval (b5) as an image sensing interval of subject C. Reference numeral 1503 denotes a division result which is obtained by dividing moving image data from the viewpoint of field angles upon image sensing. In this example, moving image data is divided into six sub-shots, that is, intervals (c1, c3, c5) that correspond to close-up shots, and intervals (c2, c4, c6) that correspond to full-length shots. Note that whether a close-up or full-length shot can be determined based on a Zoom magnification (in this sense, a close-up interval is equivalent to a zoom-in interval). Reference numeral 1504 denotes a division result which is obtained by dividing moving image data on the basis of two or more viewpoints, that is, a division result (a result obtained by combining divided sub-shots) from both the viewpoint (1501) of image sensing environments and the viewpoint (1502) of sensed subjects. In this example, since interval b3 in the result 1502 includes fluorescent lamp interval (a1) and sunlight interval (a2), the division result 1504 includes six sub-shots (one sub-shot more than the result 1502).

Figure 9:
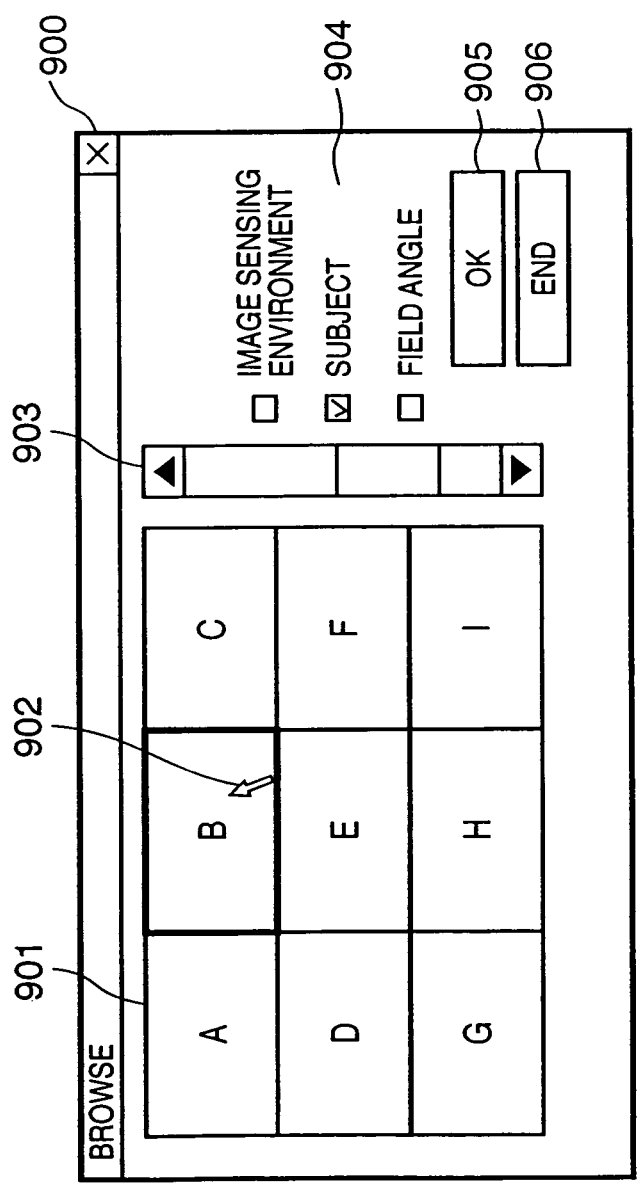
FIG. 9 shows an example of a user interface of the browse device.

FIG. 9 shows an example of the user interface of the browse device of this embodiment. Reference numeral 901 denotes a thumbnail & moving image playback display area. The display area 901 displays thumbnails of shots or sub-shots in a browse mode, and displays a played-back moving image in a moving image playback mode. Reference numeral 902 denotes a pointer which is used to select a shot or sub-shot and to issue a playback instruction. Reference numeral 903 denotes a scroll bar. Upon displaying thumbnails on the display area 901, when the number of thumbnails to be displayed exceeds the maximum number of thumbnails (nine thumbnails in FIG. 9) that can be displayed, thumbnails which are not displayed can be displayed in turn by operating the scroll bar 903. Reference numeral 904 denotes viewpoint designation buttons, which are used to select a sub-shot division viewpoint. In this embodiment, three viewpoints "image sensing environment", "subject", and "field angle" are prepared. Reference numeral 905 denotes an OK button. When this button is ON, a list of sub-shots, which are divided in accordance with the viewpoint designated using one of the viewpoint designation buttons 904, is displayed on the display area 901. Reference numeral 906 denotes an end button which is used to input a processing end instruction to this device.

Figure 16:
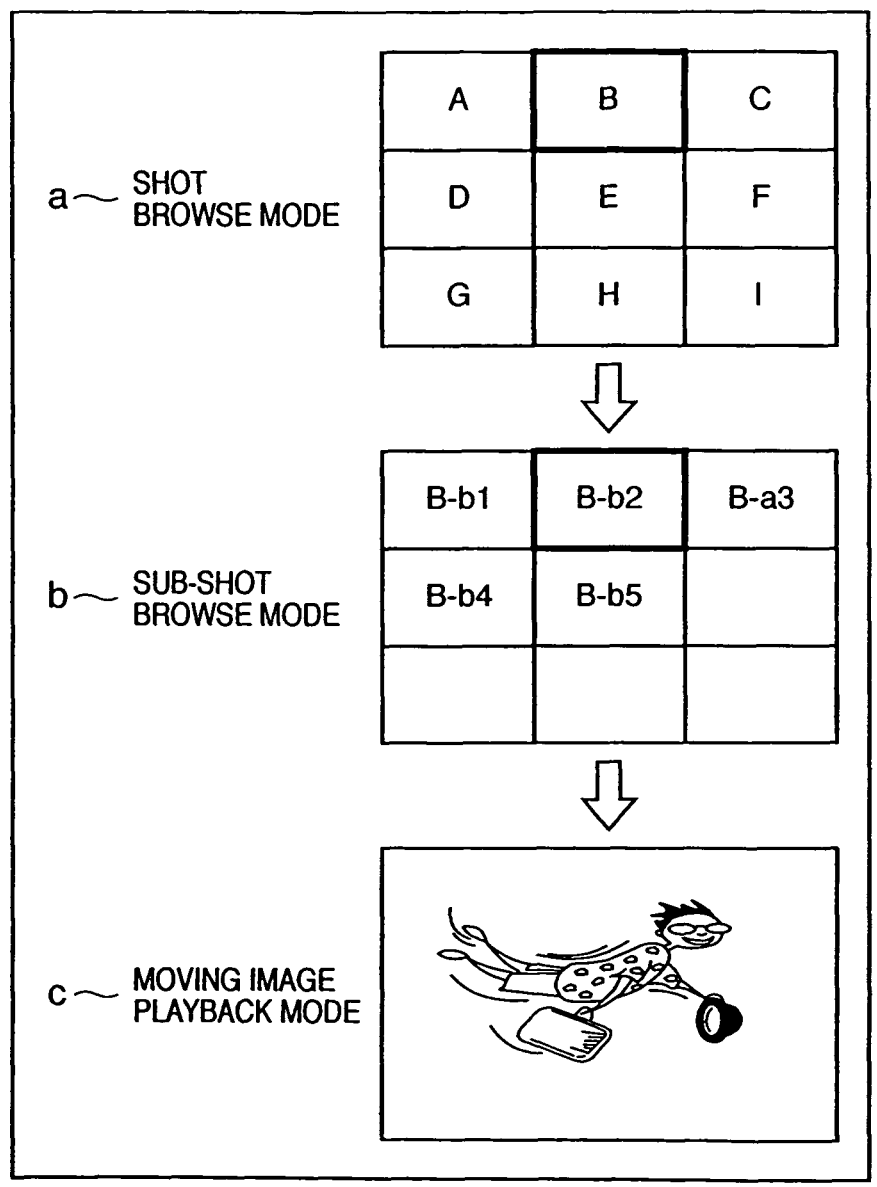
FIG. 16 shows an example of the operation of a display area on the user interface shown in FIG. 9.
Figure 17:
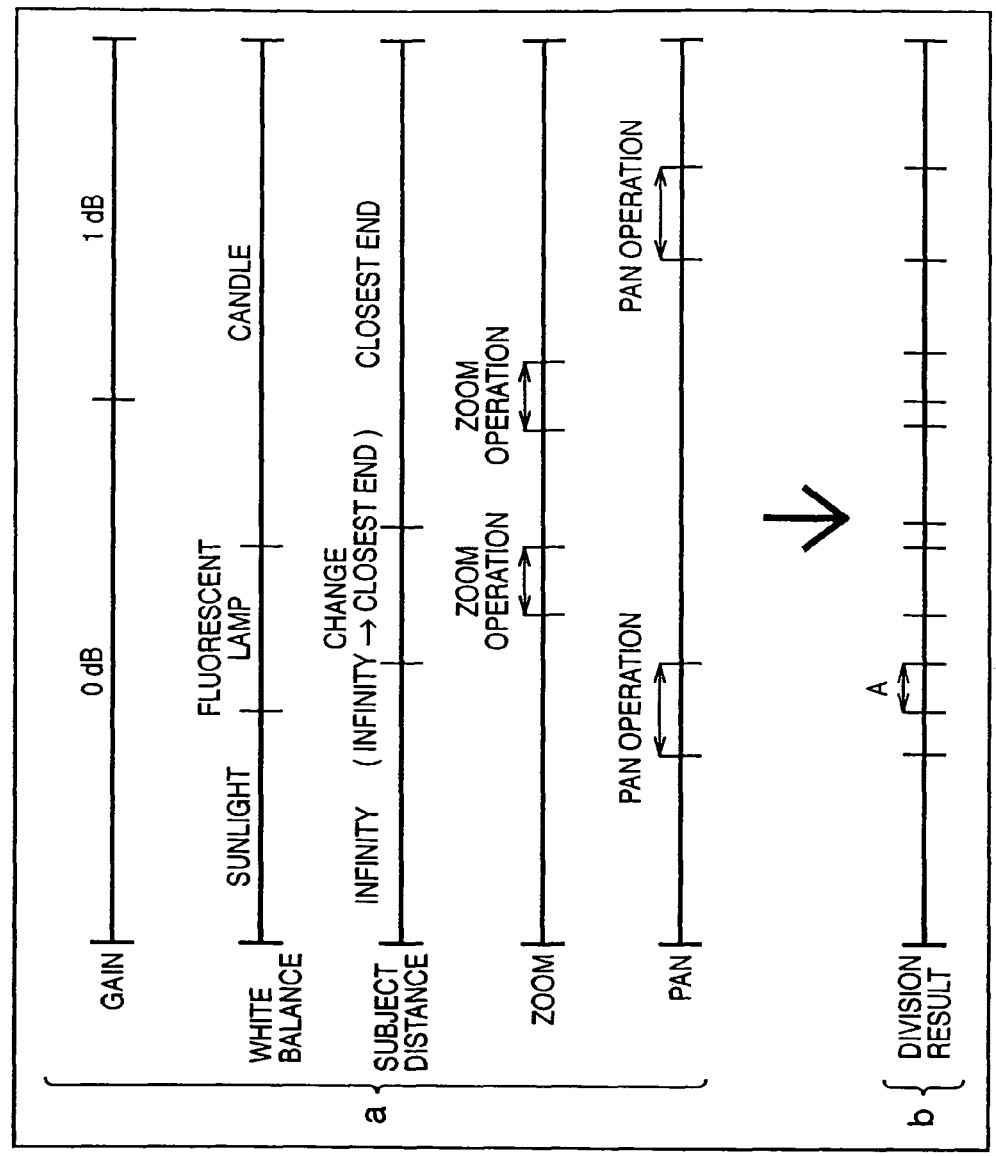
FIG. 17 shows a general moving image division process.

FIG. 16 shows the display states on the display area 901 in FIG. 9 according to respective operations. In a shot browse mode (a) in FIG. 16, a list of thumbnails corresponding to respective shots is displayed. When the user selects a desired thumbnail (shot) (in FIG. 16, a bold frame indicates that shot B is selected), designates a sub-shot division viewpoint using one of the viewpoint designation buttons 904 (in FIG. 9, "subject" is designated), and then turns on the OK button 905 using the pointer 902, sub-shots (the divided state of a moving image from the viewpoint of "subject") of the selected shot (shot B in FIG. 16) are displayed (viewpoint b in FIG. 16). When the user selects one sub-shot (B-b2 in FIG. 16) using the pointer 902 and then double-clicks it, a moving image is played back from the beginning of the selected sub-shot, and is displayed on the display area 901 ((c) in FIG. 16). Of course, when the user selects a given shot in the shot browse mode (a) and then double-clicks it, a moving image can be played back from the beginning of that shot.

Figure 10:
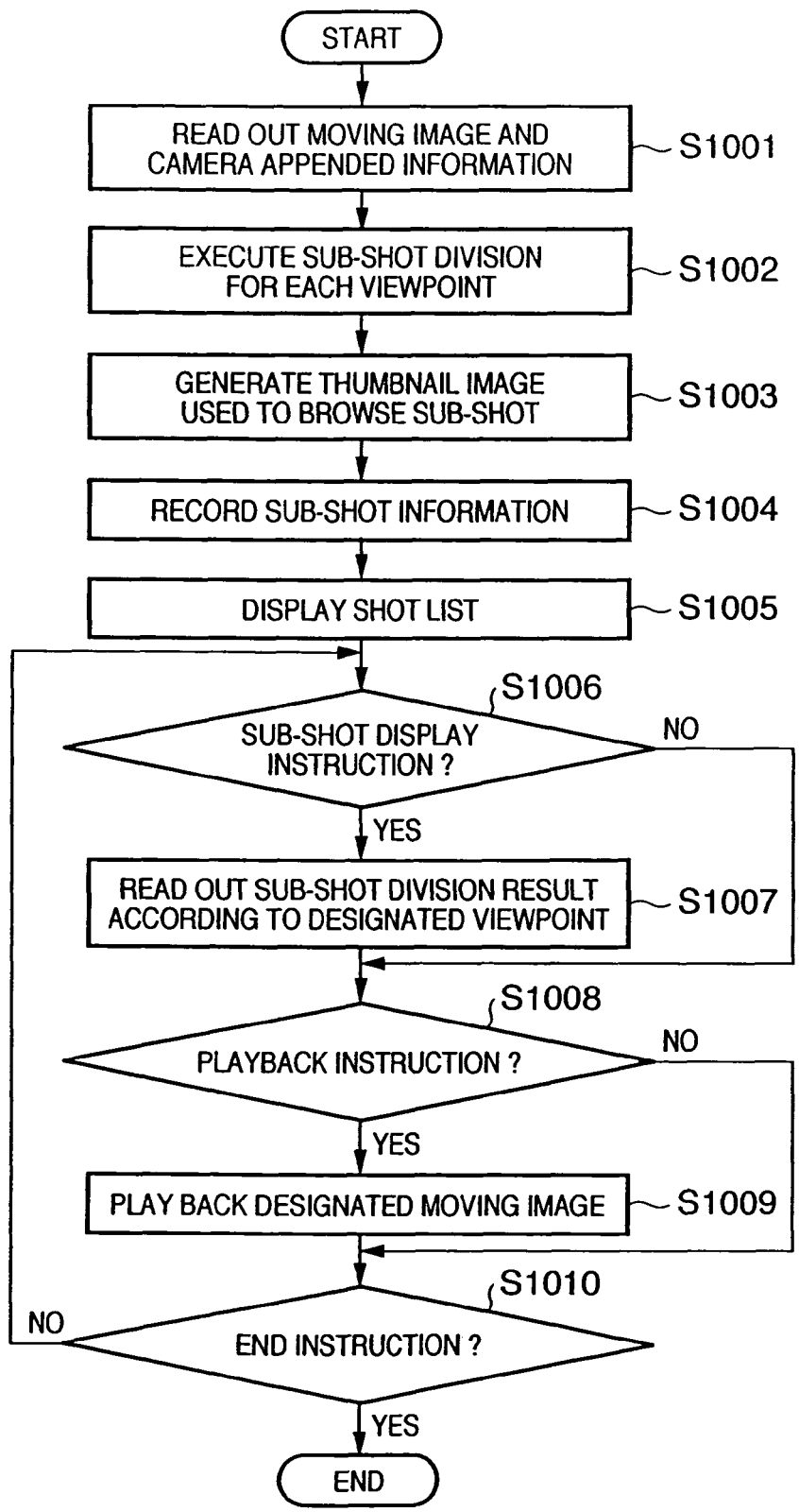
FIG. 10 is a flow chart showing an example of the operation of the browse device.

The operation of the browse device of this embodiment with the above arrangement will be described in more detail below with reference to FIG. 10. FIG. 10 is a flow chart showing an example of the operation of the browse device according to this embodiment.

The process of this device is roughly classified into a sub-shot division process from step S1001 to step S1004, and a browsing process from step S1005 to step S1010.

The sub-shot division process will be explained first. In step S1001, the reading unit 802 reads out all moving image files from the storage medium 801, and acquires moving image data and a plurality of pieces of camera appended information (to be referred to as a camera appended information list hereinafter) included in the readout files. In step S1002, the sub-shot division unit 802 divides each moving image data into sub-shots for respective viewpoints on the basis of the readout camera appended information list, and determines division points for respective viewpoints (details of this process will be described later). In step S1003, the thumbnail generation unit 807 generates thumbnail images which are used to display a list of sub-shots on the browse device. Each thumbnail image can be generated by acquiring the first frame of each sub-shot interval from a moving image, and reducing it. Of course, the list display pattern and thumbnail generation method are not limited to these specific ones, and any other patterns may be adopted as long as the contents of sub-shots can be approximately recognized.

In step S1004, the recording unit 806 records the sub-shot division results in the storage medium 801 as sub-shot information. This process is not indispensable, but when such sub-shot information is recorded in the storage medium 801, other devices can use the sub-shot division results.

Figure 13:
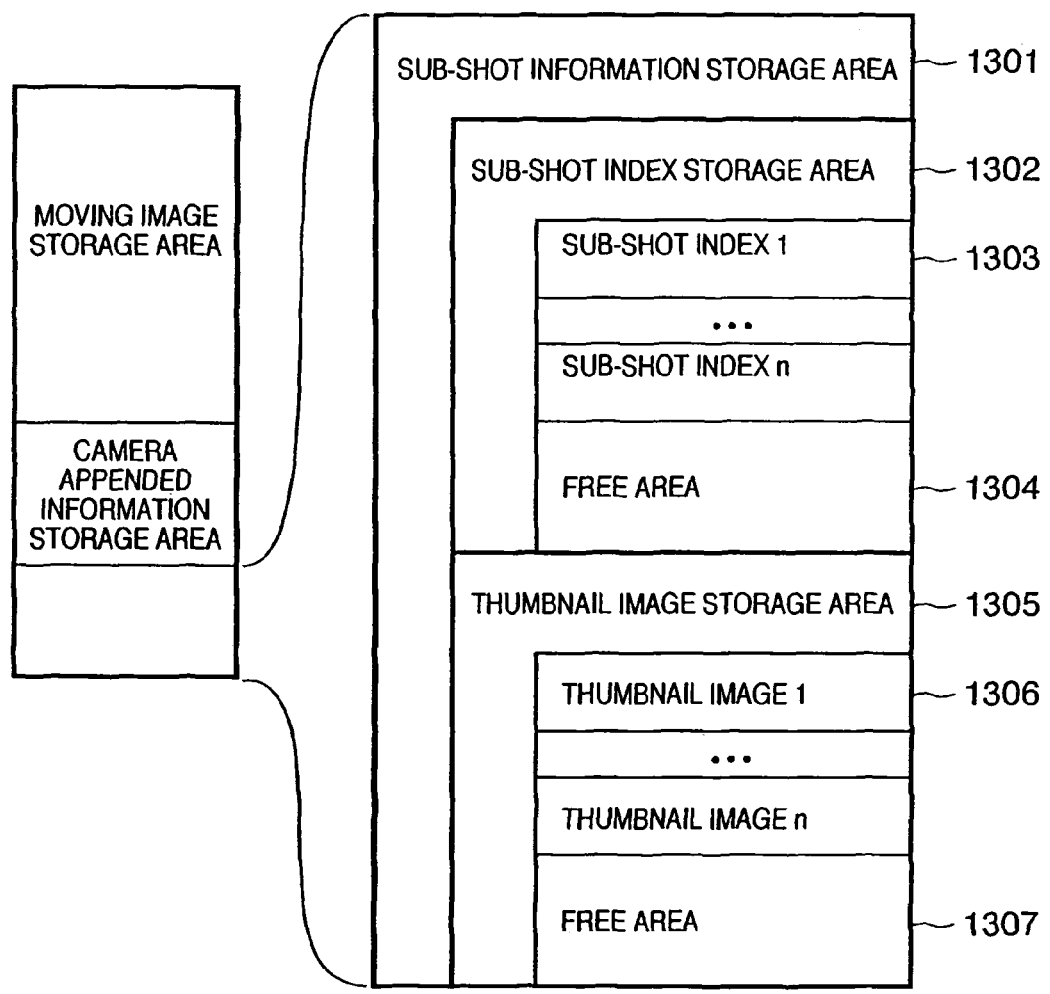
FIG. 13 shows an example of the storage format of sub-shot information in an embodiment of the present invention.

An example of the format upon storing sub-shot information will be described below. FIG. 13 shows the storage format of sub-shot information of a moving image file recorded in the storage medium 801. As shown in FIG. 13, a sub-shot information storage area is added after the camera appended information storage area described using FIG. 5. The sub-shot information storage format shown in FIG. 13 shows the internal structure of this sub-shot information storage area.

A sub-shot information storage area 1301 is further divided into two areas, that is, a sub-shot index storage area 1302 and a thumbnail image storage area 1305. The sub-shot index storage area 1302 has some sub-shot indices 1303 each having a fixed-length size, and the remaining area as a free area 1304. The thumbnail image storage area 1305 has some thumbnail images 1306 and the remaining area as a free area 1307.

Figure 14:
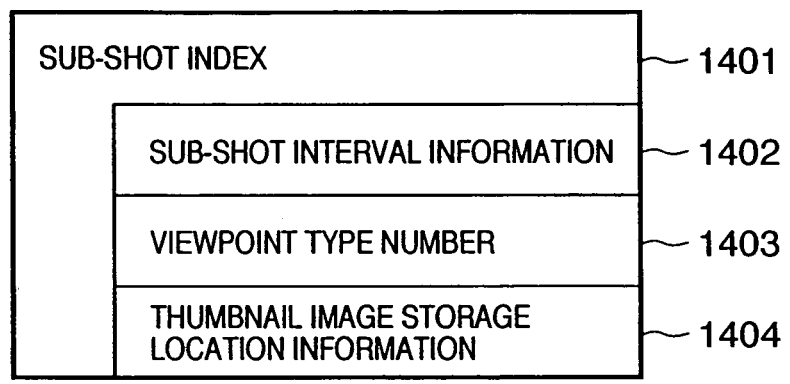
FIG. 14 shows an example of the internal structure of a sub-shot index shown in FIG. 13.

FIG. 14 shows the internal structure of each sub-shot index 1303 in FIG. 13. A sub-shot index 1401 has some fixed-length items. Sub-shot interval information 1402 represents a sub-shot interval using time information, and is used to designate one sub-shot in a shot. Note that the sub-shot interval may be expressed using a frame number as in the camera appended information. A viewpoint type number 1403 is used to identify a viewpoint (to be described later) upon sub-shot division. Thumbnail image storage location information 1404 represents the storage location of a thumbnail image in the thumbnail image storage area using, for example, an offset from the head of that area.

Figure 11A:
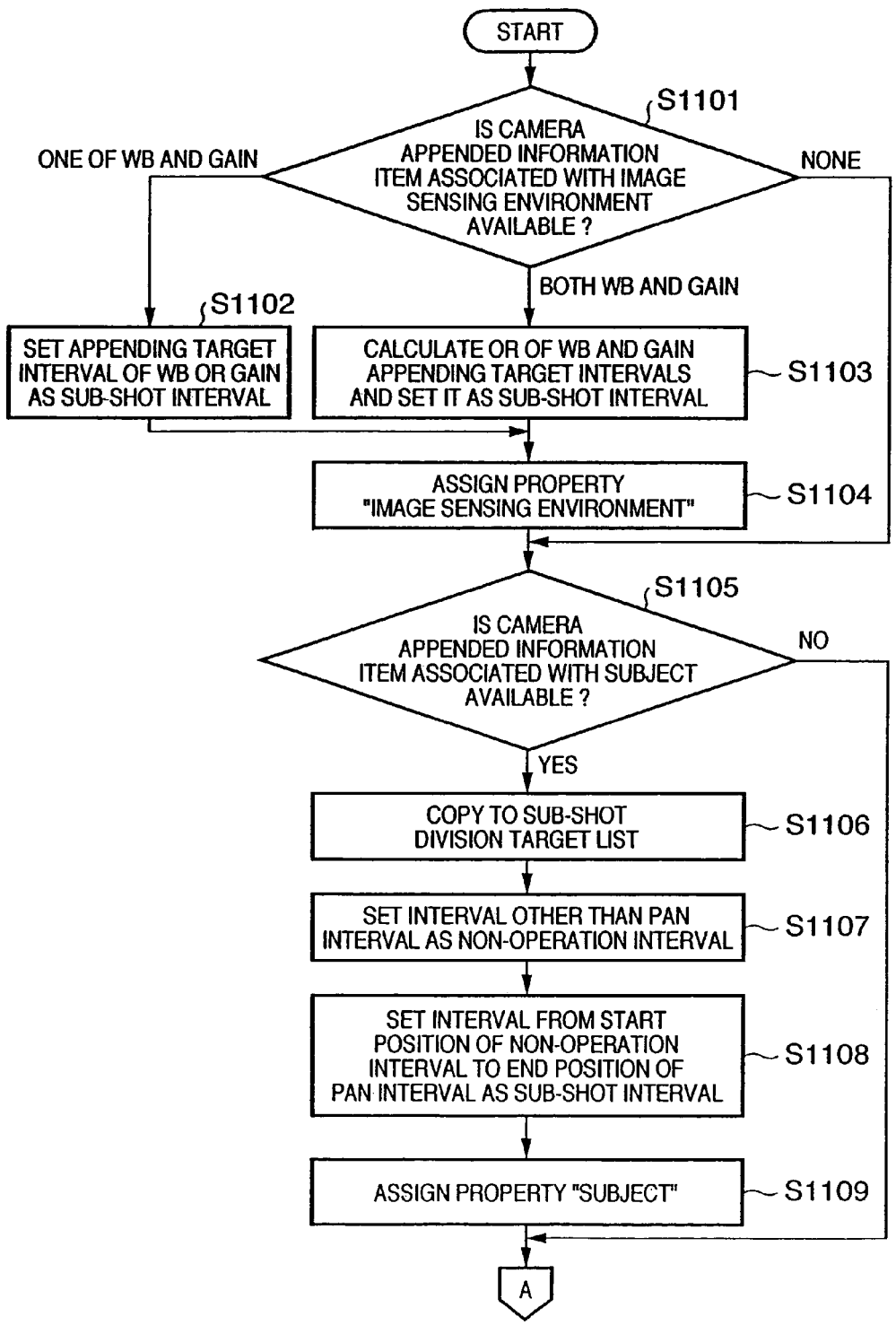
FIG. 11A is a flow chart showing the detailed sequence of a sub-shot division process of the browse device.
Figure 11B:
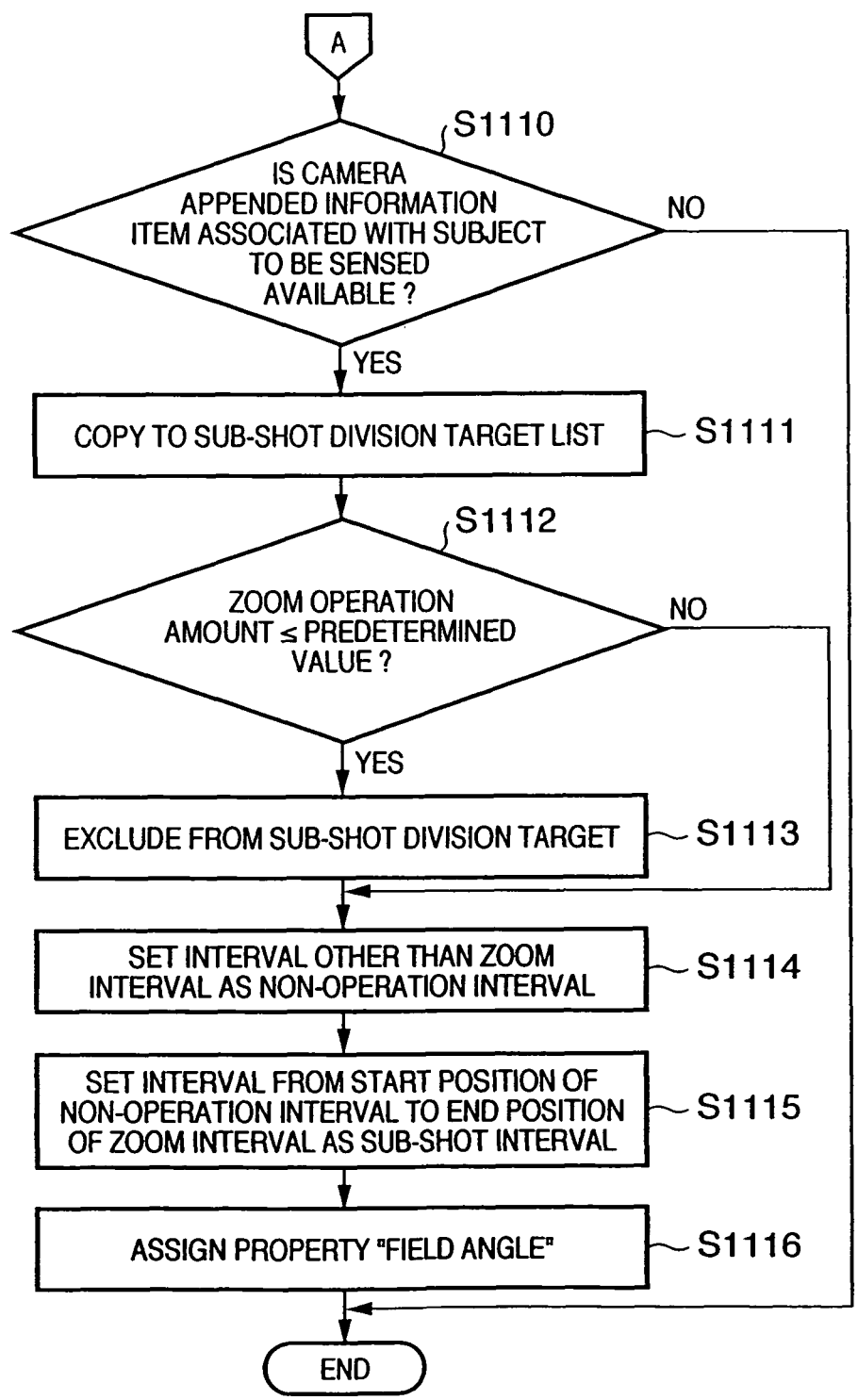
FIG. 11B is a flow chart showing the detailed sequence of a sub-shot division process of the browse device.

The detailed sequence of the sub-shot division process in step S1002 will be described below using FIGS. 11A and 11B.

A sub-shot division process associated with the viewpoint "image sensing environment" is executed first. It is checked in step S1101 if camera appended information items associated with the viewpoint "image sensing environment" are available. As specific items associated with an image sensing environment, various items such as focus, IRIS, Gain, WB, AE Mode, and the like are available. However, in this embodiment, WB and Gain are used for the sake of simplicity. WB setups are changed according to an image sensing environment. For example, the user sets a preset sunlight mode under the sunlight, and sets a preset fluorescent lamp mode under the light of the fluorescent lamp. If different WB Modes are set, it can be determined that an image sensing environment has changed. Gain assumes a positive value upon sensing an image in a very dark environment, and is used as means for correcting the brightness of an image by the image sensing device. Whether or not an image sensing environment has changed can be determined by checking if Gain assumes a positive value.

If neither of WB and Gain are available in the camera appended information item list, since the sub-shot division process from the viewpoint of "image sensing environment" cannot be made, the control skips steps S1102 to S1104, and jumps to step S1005. If either WB or Gain is available, the flow advances to step S1102. In step S1102, the appending target interval of WB or Gain is used as a sub-shot interval intact, and is copied to the sub-shot interval information 1402. If both WB and Gain are available, the flow advances to step S1103. In step S1003, the OR of the appending target intervals of WB and Gain is calculated and is copied as a sub-shot interval to the sub-shot interval information 1402. In step S1104, a viewpoint type number "1" indicating "image sensing environment" is appended to the sub-shot interval determined in step S1102 or S1103, and is recorded as the viewpoint type number 1403.

In this manner, in the example of the viewpoint "image sensing environment", only a plurality of different items that match the viewpoint are selected from the camera appended information, and respective intervals are ORed to determine a sub-shot interval. Hence, intervals of items which are not related to this viewpoint can be excluded.

Next, a sub-shot division process associated with the viewpoint "subject" is executed. It is checked in step S1105 if camera appended information items associated with the viewpoint "subject" are available. As specific items associated with the viewpoint "subject", various items such as Pan, Tilt, and the like are available. However, in this embodiment, only Pan is used for the sake of simplicity. Upon moving a viewpoint from subject A to subject B, the user must make a Pan operation that swings the image sensing device in the horizontal direction. Hence, it can be determined that a subject has changed before and after the Pan operation.

If Pan is not available in the camera appended information item list, the control skips the sub-shot division process associated with the viewpoint "subject" (from step S1106 to step S1109), and jumps to step S1110. On the other hand, if Pan is available in the camera appended information item list, the flow advances to step S1106 to copy all Pan appending target intervals to a sub-shot interval target list. The sub-shot interval target list is used as a temporary file, and has the same format as the camera appended information storage area 501.

The flow then advances to step S1107 to insert intervals without any Pan operations to the sub-shot interval target list as non-operation intervals. At this time, a special number (for example, 0) is recorded in the type number 604 so as to indicate a non-operation. The flow advances to step S1108 to copy an interval from the start position of each non-operation interval to the end of the Pan operation in the sub-shot interval target list to the sub-shot interval information 1402 as a sub-shot interval. If the terminal end of a shot corresponds to a non-operation interval, that interval is set as a sub-shot interval intact (not shown). In step S1109, a viewpoint type number "2" that represents "subject" is appended to respective sub-shot intervals determined in step S1108, and is recorded in the viewpoint type number 1403. In this embodiment, a sub-shot interval is defined from the start position of each non-operation interval to the end of the Pan operation. This is because the Pan operation forms an interval in which subjects are changing, and an interval immediately before the Pan operation is considered as a part of a sub-shot interval of the Pan operation. Hence, these intervals are merged to form one sub-shot interval.

Finally, a sub-shot division process associated with the viewpoint "field angle" is executed. It is checked in step S1110 if camera appended information items associated with the viewpoint "field angle" are available. As specific items associated with the viewpoint "field angle", various items such as Zoom, Digital Zoom, and the like are available. However, in this embodiment, only Zoom is used for the sake of simplicity. In order to take a close-up shot of the face of subject A after the user adjusts the field angle to take a full-length shot of subject A, he or she must operate Zoom to the tele side. Hence, after the Zoom operation is made, it can be determined that the field angle has been changed.

If Zoom is not available in the camera appended information item list, the control skips the sub-shot division process associated with the viewpoint "field angle" (from step S1111 to step S1116). If Zoom is available, the flow advances to step S1111 to copy all Zoom appending target intervals to the aforementioned sub-shot interval target list. It is then checked in step S1112 if a Zoom operation amount is equal to or smaller than a predetermined value. This is for the following reason. That is, if the operation amount is small, it can be determined that the user finely adjusts the field angle. Note that the operation amount can be expressed by the absolute value of the difference between the start and end zoom magnifications. Also, "1.5×" is preferably used as the predetermined value, but the present invention is not limited to such specific value. If the Zoom operation amount is equal to or smaller than the predetermined value, the flow advances to step S1113 to delete Zoom whose operation amount is equal to or smaller than the predetermined value from the sub-shot division target list.

The flow then advances to step S1114 to insert intervals without any Zoom operations to the sub-shot interval target list as non-operation intervals. The flow advances to step S1115 to copy an interval from the start position of each non-operation interval to the end of the Zoom operation in the sub-shot interval target list to the sub-shot interval information 1402 as a sub-shot interval. If the terminal end of a shot corresponds to a non-operation interval, that interval is set as a sub-shot interval intact (not shown). In step S1116, a viewpoint type number "3" that represents "field angle" is appended to respective sub-shot intervals determined in step S1115, and is recorded in the viewpoint type number 1403. In this embodiment, a sub-shot interval is defined from the start position of each non-operation interval to the end of the Zoom operation. This is because the Zoom operation is an interval in which the field angle is changing, and an interval immediately before the Zoom operation is considered as a part of a sub-shot interval of the Zoom operation. Hence, these intervals are merged to form one sub-shot interval.

Referring back to FIG. 10, the browsing process from step S1005 to step S1010 will be described below.

In step S1005, thumbnails that represent respective moving image files (shots) are displayed on the display area 901. As a thumbnail that represents each shot, a thumbnail of a sub-shot which is registered at the head position may be used. However, a thumbnail for a shot may be independently generated. That is, the contents of each shot need only be surveyed. Note that the thumbnails are arranged on the display area 901 in turn from the uppermost row to lower rows and from the left to the right in each row in the order of, for example, image sensing start times described in the file headers.

It is checked in step S1006 if a sub-shot display instruction is input. This checking step can be implemented by examining if the OK button 905 in FIG. 9 is ON. If the OK button 905 is OFF, the control skips step S1007 and jumps to step S1008. If the OK button 905 is ON, the flow advances to step S1007 to display sub-shots which are divided according to the viewpoint designated using one of the viewpoint designation buttons 904. For example, if "image sensing environment" is designated, only sub-shots which have the viewpoint type number 1403=1 are read out, and their thumbnail images are displayed. In this embodiment, a plurality of viewpoints can be selected at the same time. For example, when "image sensing environment" and "subject" are designated, sub-shots which have the viewpoint type number 1403=1 and 2 are read out, and the ORs of the sub-shot intervals are calculated and displayed, as shown in 1504 in FIG. 15.

It is checked in step S1008 if a moving image playback instruction is input. This checking step can be implemented by examining if the user double-clicks a specific shot or sub-shot using the pointer 902. If no playback instruction is input, the control skips step S1009 and jumps to step S1010. On the other hand, if the playback instruction is input, the flow advances to step S1009 to play back a moving image from the beginning of the designated shot or sub-shot. After the playback process, the control returns to the previous shot or sub-shot list display (not shown). It is then checked in step S1010 if an end instruction is input. This checking step can be implemented by examining if the end button 906 in FIG. 9 is turned on. If no end instruction is input, steps S1006 to S1009 above are repeated. If an end instruction is input, this process ends in step S1010.

As described above, according to the first embodiment, even when a moving image is divided into many intervals on the basis of the operations or changes in state of the image sensing device, sub-shots can be obtained by dividing the moving image from a desired viewpoint, and the divided sub-shots are displayed as thumbnails. For this reason, the user can quickly find out a desired position of the moving image, thus allowing each playback and edit processes.

Second Embodiment

The second embodiment will be described below. In the first embodiment, information acquired from the sensors and the operation unit provided to the image sensing device 1010 or control information is appended as camera appended information. In the second embodiment, camera appended information that can extracted by analyzing sensed image data is appended after image sensing, and is used as camera appended information.

Since the arrangement of the moving image processing system, those of the image sensing device 1010 and browse device 1030, and the like are substantially the same as those in the first embodiment, a description thereof will be omitted, and only differences will be explained below.

Figure 12:
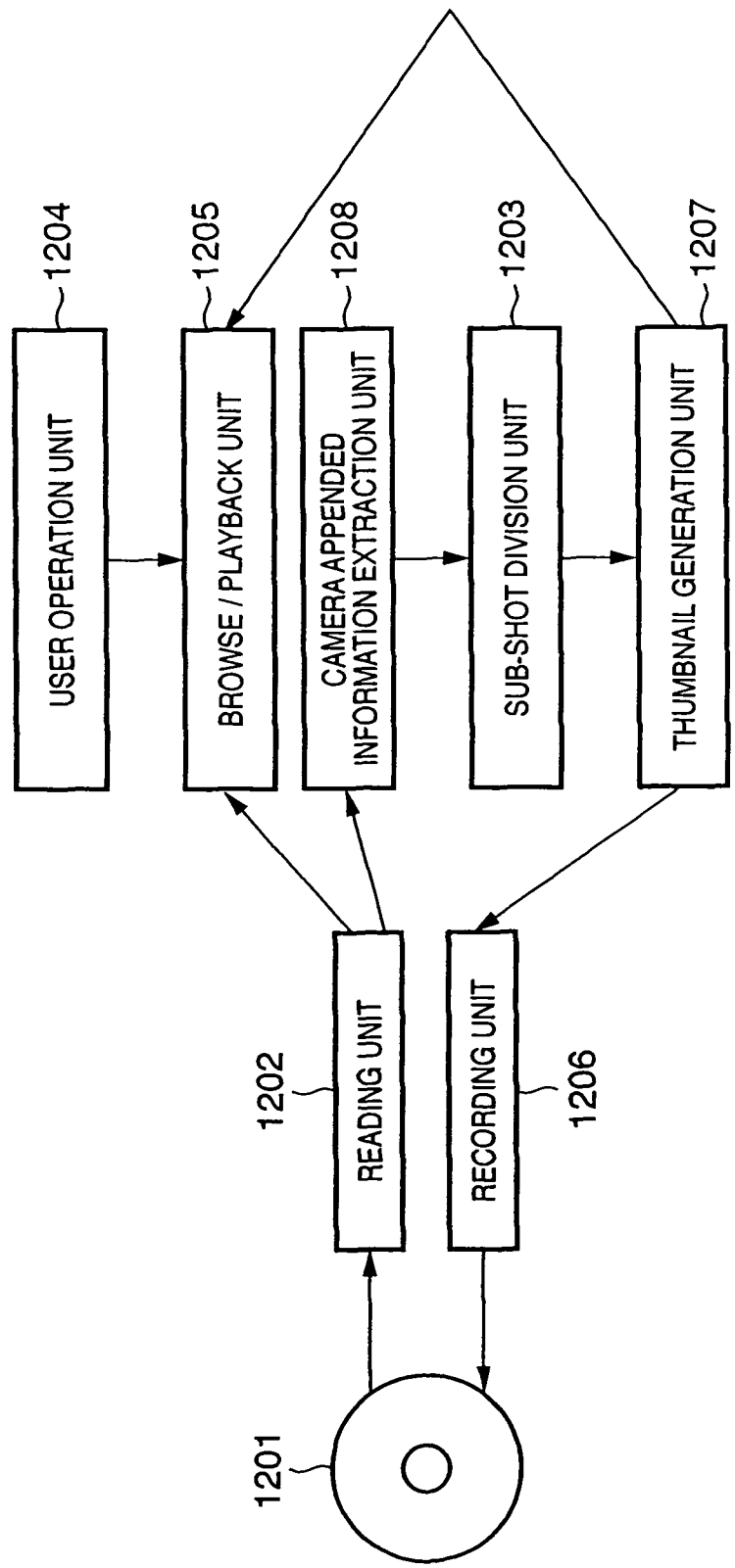
FIG. 12 is a block diagram showing the functional arrangement of a browse device according to the second embodiment.

FIG. 12 is a block diagram showing the functional arrangement of the browse device 1030. Components 1201 to 1207 are the same as the components 801 to 807 of the first embodiment (FIG. 8), and a description thereof will be omitted. Reference numeral 1208 denotes a camera appended information extraction unit, which analyzes video data read out from a storage medium 1201 via a reading unit 1202, and extracts camera appended information which is not appended by the image sensing device 1010. In the following description, assume that, for example, pan/tilt information is not appended by the image sensing device 1010.

As a method of extracting pan/tilt information from video data, focuses of expansion of motion vectors are calculated using Huff transformation, a focus of expansion that gains a maximum score of a plurality of focuses of expansion is determined as that for a background, and constraint equations about pan/tilt information are solved. For further details about a method of calculating the relationship between the pan/tilt information and focuses of expansion, and the pan/tilt information, please refer to, for example, "Kenichi Kanatani, "Image Understanding", Morikita Shuppan". Camera appended information obtained by analyzing video data in this way is further added, and can be used in a sub-shot division unit 1203.

The pan/tilt information obtained in this way is added to the camera appended information storage area described using FIG. 5, and is used upon generating the contents of the sub-shot information storage area shown in FIG. 13.

Third Embodiment

In the first and second embodiments, two devices, that is, the image sensing device 1010 and browse device 1030 are used. Alternatively, if the image sensing device 1010 has sufficient processing performance, it may be used alone by including the functions of the browse device 1030. In this case, if sub-shot information is recorded on the storage medium 1020, the sub-shot division result can be used by other devices.

In the first and second embodiments, the sub-shot division unit 803, thumbnail generation unit 807, and camera appended information extraction unit 1208 are implemented on the browse device 1030. However, if the image sensing device 1010 has sufficient processing performance, these units may be implemented on the image sensing device 1010. In this case, the browse device 1030 can execute the aforementioned browse process by reading out sub-shot information from the storage medium 1020.

In the first and second embodiments, the image sensing device 1010 generates camera appended information for each interval during image sensing, and records the generated information in the storage medium 1020. However, if the image sensing device 1010 does not have a sufficient memory size or processing performance, camera appended information for each frame may be recorded, and a process for integrating the recorded information may be executed later. In this case, as a method of storing camera appended information for each frame, information may be stored in an unused area or the like in management information of image data. More specifically, in case of, for example, an MPEG-2 stream, information may be stored in a user area of a picture header.

The image sensing device 1010 may also record camera appended information for respective frames even if it has performance that can record camera appended information for respective intervals. In this way, although recording becomes redundant, even when camera appended information for each interval is lost by a file operation or need be changed, camera appended information for each interval can be re-generated based on those for respective frames.

In the first and second embodiments, camera appended information and sub-shot information for respective intervals are stored in a binary format. However, if the image sensing device 1010 has sufficient processing performance, or using the browse device 1030, the information may be expressed in a text format, an XML (Extensible Markup Language) format by defining a unique DTD (Document Type Definition), or the like. When such information is stored in a format according to MPEG7, it may be stored in Segment DS.

In the first and second embodiments, camera appended information and sub-shot information are exchanged via the storage media 28, 801, and 1201, but may be exchanged by communication means such as IEEE1394 or the like.

In the first and second embodiments, one shot forms one moving image file. Alternatively, a plurality of shots may form one moving image file. In this case, identification numbers may be assigned to specify correspondence among respective shots, camera appended information, and sub-shot information.

In the first and second embodiments, three sub-shot division viewpoints, that is, "image sensing environment", "subject", and "field angle", have been exemplified. However, the present invention is not limited to such specific viewpoints, and various other viewpoints (for example, an effect ON/OFF state and the like) may be used.

Moreover, in the first and second embodiments, the sub-shot division result is used in browsing. However, if a sub-shot is defined as a basic unit, and viewpoint type designation means is provided, the sub-shot division result may be used by various other methods such as a moving image edit process, frame print process, digest playback process, and the like. For example, in case of the moving image edit process, if a sensed shot is divided into sub-shots from respective viewpoints, the division positions can be used to designate In and Out points of the edit process. In case of the frame print process, frame print candidates for each viewpoint can be presented by extracting central frames of sub-shot intervals. In case of the digest playback process, digest playback for the designated viewpoint can be executed by playing back respective sub-shots several seconds from their beginning.

As described above, according to the above embodiments, when the user designates a viewpoint of interest, sub-shots can be obtained according to the designated viewpoint. Hence, the user can quickly obtain a desired sub-shot. Also, since sub-shot information is stored in the storage medium in association with the viewpoint, the sub-shot information can be used in various devices.

Fourth Embodiment

In the first to third embodiments, the image sensing device shown in FIG. 2, the control method thereof, and the storage medium have been described. However, the present invention is not limited to them, and may be applied to different image sensing devices. An embodiment of an image sensing device having an arrangement different from that of the image sensing device of the first to third embodiment, a control method thereof, and a storage medium will be explained below.

FIG. 18 is a block diagram showing the arrangement of the image sensing device in this embodiment. Referring to FIG. 18, reference numeral 11 denotes a lens unit which includes a focus lens used to adjust the subject distance and a zoom lens used to adjust the focal length, and forms a subject image on an image sensing element 13. Reference numeral 12 denotes an aperture used to adjust the amount of light that reaches the image sensing element 13. The image sensing element 13 includes a CCD that converts input light into an electrical signal. Reference numeral 14 denotes a sample & hold/AGC circuit, which executes a sample & hold process and gain adjustment. Reference numeral 15 denotes an A/D converter for performing analog-to-digital (A/D) conversion. Reference numeral 16 denotes a video signal processor which processes a signal and generates a video signal. Reference numeral 18 denotes a noise reduction (NR) unit which has a field memory, and removes noise of a video signal. Reference numeral 19 denotes a lens position detector which detects the lens position. Reference numeral 20 denotes a lens driver which drives the lens.

Reference numeral 21 denotes a system controller which controls the overall image sensing device. Note that the arrangement of the system controller 21 is the same as that in the first embodiment (see FIG. 3), and a description thereof will be omitted.

Reference numeral 22 denotes a user operation unit on which keys used by the user to operate the image sensing device are arranged. Reference numeral 23 denotes a wide key for moving the zoom lens in a wide (wide angle=to reduce an image) direction; and 24, a tele key for moving the zoom lens in a tele (telephoto=to enlarge an image) direction. The wide and tele keys 23 and 24 are, for example, seesaw type interlocking keys, and output an output signal indicating which of keys is pressed and a pressure at that time to the system controller 21. Note that the pressure determines the enlargement/reduction speed. Reference numeral 29 denotes a video recording button. When this button 29 is turned on, the system controller 21 sets the image sensing device in a video recording mode. Reference numeral 30 denotes a mode dial. The user operates this mode dial to make various setups. For example, the user can set a focus mode (auto/manual), exposure mode (auto, gain priority, shutter speed priority, aperture priority, manual), White Balance Mode (to be abbreviated as WB Mode hereinafter) (preset—sunlight, cloudy, incandescent lamp, fluorescent lamp), and so forth.

The set information is input to the system controller 21, which controls the image sensing device in accordance with such information. The noise reduction (NR) unit 18 is formed of a cyclic noise reduction circuit. Reference numeral 26 denotes an MPEG CODEC that encodes video data into an MPEG-2 format. Reference numeral 27 denotes a recorder which includes a drive for driving a recording medium and recording information. Reference numeral 28 denotes a recording medium which includes an optical disk, magnetic disk, magnetooptical disk, magnetic tape, hard disk, nonvolatile semiconductor memory (for example, flash memory), and the like. Reference numeral 25 denotes an X-rotational velocity detector which detects the velocity upon moving the image sensing device in the horizontal direction using a gyro sensor or the like. Reference numeral 31 denotes a Y-rotational velocity detector which detects the velocity upon moving the image sensing device in the vertical direction using a gyro sensor or the like, as in the X-rotational velocity detector 25. Reference numeral 32 denotes a range detector which detects the distance to a subject. As the range detector 32, a known device can be adopted. For example, infrared light which is emitted from a light-emitting window (not shown) of the image sensing device and is reflected by the subject is received via a light-receiving window (not shown), and the received light is converted into a range signal by a light-receiving element arranged in the image sensing device 1010, for example, a PSD (Position Sensitive Device).

An outline of the operation of the image sensing device with the above arrangement will be explained below. The amount of light, which comes from the object and is received by the lens unit 11, is adjusted by the aperture 12, and that light forms an image on the surface of the image sensing element 13. The light is converted into an electrical signal by the image sensing element 13. The electrical signal is A/D-converted by the A/D converter 15 via the sample & hold/AGC unit 14, and the converted digital signal is input to the video signal processor 16. The video signal processor 16 generates a video signal by applying processes such as aperture correction, gamma correction, white balance correction, and the like for respective luminance and color components of the input signal, and outputs that video signal to the noise reduction unit 18. The noise reduction unit 18 removes noise of the video signal under the control of a control signal from the system controller 21. The noise-removed video signal is output to the MPEG CODEC 26. The MPEG CODEC 26 encodes the input video signal. At this time, the MPEG CODEC 26 stores camera appended information (to be described later) input from the system controller 21 in a file together with the encoded video signal, and outputs the stored file to a recording device or the like connected to the MPEG CODEC 26.

The system controller 21 controls the respective units of the image sensing device. Also, the system controller 21 controls the lens driver 20 or a digital zoom unit 17 upon depression of the wide or tele key 23 or 24 of the zoom operation key unit (user operation unit) 22 so as to move the zoom lens in the wide or tele direction. Furthermore, the system controller 21 determines the current position of the zoom lens (that is, the tele end (telephoto end), the wide end (wide-angle end), or a position between the tele and wide ends (zoom magnification)) on the basis of the lens position detection signal from the lens position detector 19.

The system controller 21 switches a noise reduction control value depending on whether the optical zoom function is inactive or active using a control signal to be output to the noise reduction unit 18. With this signal, a noise reduction effect, that is, noise reduction amount, is varied. At this time, the control value to be switched is a cyclic coefficient K. The control value is also switched depending on the brightness of a subject using the control signal. That is, as the brightness of a subject becomes lower, the S/N of a video signal deteriorates. Hence, to compensate for such deterioration, the control value is switched to enhance the noise reduction effect. Moreover, the system controller 21 controls the aperture 12, the sample & hold/AGC unit 14, a digital shutter (not shown in FIG. 18), and the like so as to maintain the level of a video signal to be generated to a predetermined value with respect to the amount of a light signal from a subject, and comprehensively determines the brightness of a subject on the basis of the aperture value, AGC gain, digital shutter speed, and the like used in such exposure control.

In the above arrangement, the image sensing device of this embodiment appends camera appended information to each sensed frame. The camera appended information is information that can be appended by the image sensing device and pertains to a moving image. This camera appended information includes various kinds of additional information such as information associated with aperture correction, gamma correction, and WB correction used when the system controller 21 controls the video signal processor 16, noise reduction unit 18, digital zoom unit 17, and lens driver 20, information (subject distance and the like) obtained from detection means such as the lens position detector 19, X-rotational velocity detector 25, Y-rotational velocity detector 31, range detector 32, and the like, information (WB Mode or the like) associated with user's setups obtained from the user operation unit 22, information associated with user's operation (zoom operation or the like) obtained from the user operation unit 22, and so on. If the image sensing device has other sensors such as a thermometer, hygrometer, and the like (not shown in FIG. 18), information from such sensors can be used as the camera appended information. Furthermore, information of external devices such as accessories (electronic flash or the like), measuring instruments, and the like connected to the image sensing device 1010 can also be used as the camera appended information as long as a correspondence between such information and a video can be determined.

Figure 19:
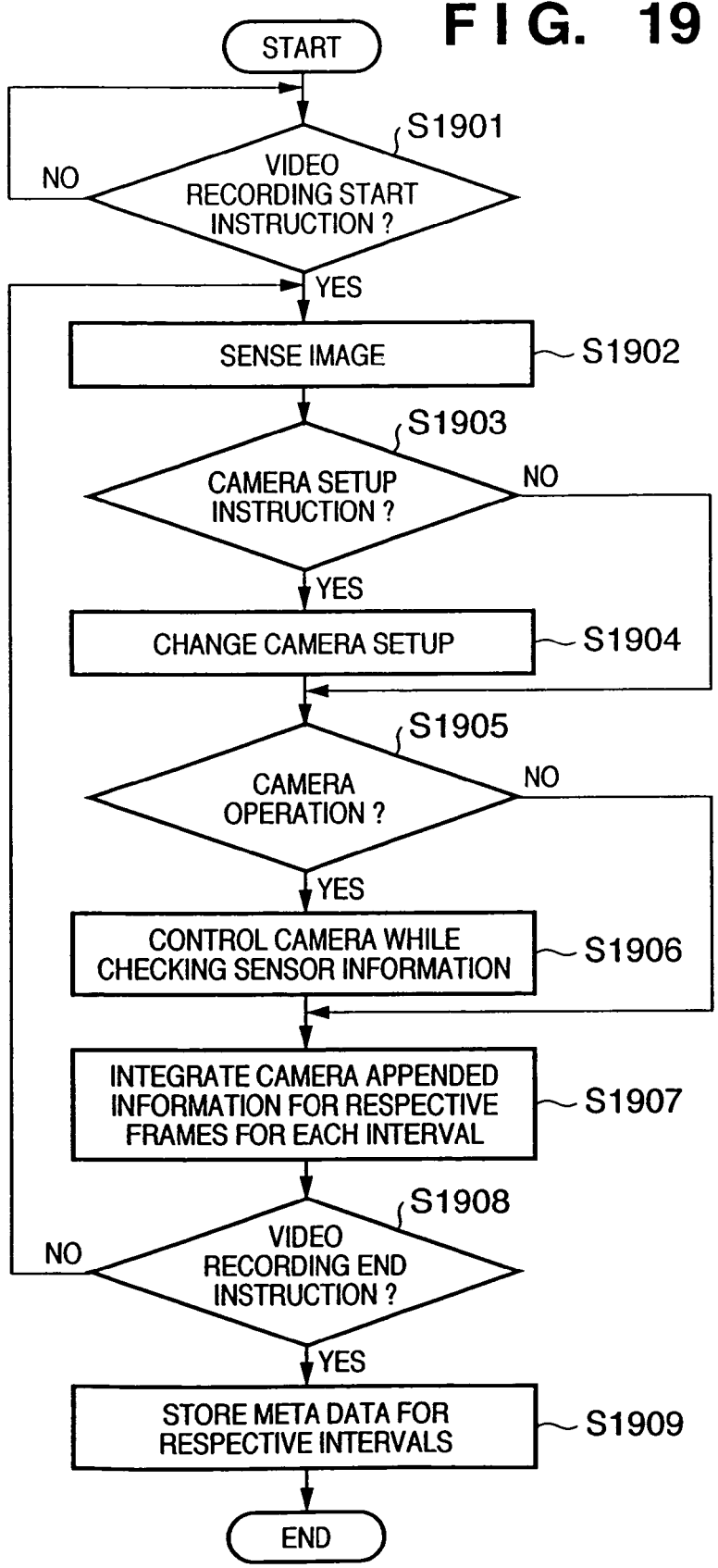
FIG. 19 is a flow chart showing the sequence of a moving image sensing process by the image sensing device of the fourth to sixth embodiments.

The sequence of a moving image sensing process of the image sensing device 1010 will be described below with reference to the flow chart shown in FIG. 19. It is checked in step S1901 if the user has turned on the video recording button 29 to input a video recording start instruction. The image sensing device 1010 stands by until the video recording start instruction is input. If the video recording start instruction is input, the video recording mode is set, and the flow advances to step S1902. At this time, the system controller 21 sends the video recording start time to the MPEG CODEC 26 and controls it to describe that time in a file header. In step S1902, the system controller 21 controls the image sensing device 1010 on the basis of aforementioned information from various sensors and the like to sense an image for one frame. At this time, the control information of the image sensing device 1010 is held in the RAM 303 as camera appended information for each frame. Table 7 below shows setup information associated with Gain and Subject Distance as an example of the format of control information.

TABLE 7

Example of control information

| Field Name | Size | Description |
|---|---|---|
| Gain | | |
| Gain Value Factor | 8 bits | Describe Gain Value (unit: dB) using coefficient GF of: Gain value = GF × 3 [dB] |
| Subject Distance | | |
| Subject Distance Power | 4 bits | Describe subject distance using coefficients Subject Distance Power and Subject Distance Base of: Subject Distance = Subject Distance Base × $10^{Subject\ Distance\ Power}$ [cm] |
| Subject Distance Base | 8 bits | |

It is checked in step S1903 if the user has make camera setups via the camera operation unit 22. If the camera setups have been made, the system controller 21 changes the camera setups in step S1904. At this time, the changed camera setup information is held in the RAM 303 as camera appended information for each frame. Table 8 below shows setup information associated with WB as an example of the format of setup information that serves as the camera appended information.

TABLE 8

Example of setup information
White Balance

| Field Name | Size | Description |
| --- | --- | --- |
| White Balance Mode | 4 bits | Describe White Balance Mode using following IDs:<br>1: preset - sunlight<br>2: preset - cloudy<br>3: preset - incandescent lamp<br>4: preset - fluorescent lamp |

It is checked in step S1905 if the user has operated the camera. Whether or not the camera operation has been made can be determined as follows. For example, a zoom operation can be determined by checking if the user has operated the wide or tele key 23 or 24 of the user operation unit 22, and a pan/tilt operation can be detected based on the X- or Y-rotational velocity detector 25 or 31. If the camera has been operated, the flow advances to step S1906, and the system controller 21 controls the image sensing device in correspondence with that operation while checking various kinds of sensor information. At this time, information associated with the operation is held in the RAM 303 as camera appended information for each frame. Table 9 below shows setup information associated with Zoom and Pan as an example of the format of operation information which serves as the camera appended information.

TABLE 9

Example of Operation information

| Field Name | Size | Description |
| --- | --- | --- |
| Zoom | | |
| Direction | 1 bit | Describe zoom direction<br>0: tele<br>1: wide |
| Magnification | 8 Bits | Describe Zoom magnification using integer value |
| Pan | | |
| Direction | 1 bit | Describe Pan direction<br>0: left<br>1: right |
| Speed | 4 bits | Describe Pan Speed in three steps:<br>STEP-1: low speed<br>STEP-2: middle speed<br>STEP-3: high speed |

The camera appended information for each frame, which is held in the RAM 303 in steps S1902, S1904, and S1906, is managed in bit fields for each frame, and is held for a predetermined number of frames. In step S1907, respective items of camera appended information for respective fields held in the RAM 303 are referred to, and the contents of items that can be integrated for each interval are held together in the RAM 303.

Tables 10 to 12 below show examples of items of camera appended information for each interval. In order to integrate the contents of items for each interval, if the contents of Gain for respective frames are to be integrated for each interval, an interval corresponding to frames with the Gain value=0 is set as one interval, and an interval corresponding to frames with the Gain value>0 is set as another interval. If the contents for respective frames are to be integrated in association with the subject distance, they are integrated while being classified into Constant Subject Distance intervals in which the subject distance is constant, and Changing Subject Distance intervals in which the subject distance has changed. In the Constant Subject Distance interval, the subject distance is expressed using six STEPs. For example, if the subject distance falls within the range from 0 to 20 cm, it is expressed by STEP1. Each STEP is defined depending on whether or not a subject size changes sufficiently. Note that the subject size is the ratio of the size of the subject to the frame. That is, if the subject size is maximum, a close-up video is obtained.

The Changing Subject Distance interval is an interval in which the subject distance has changed one STEP or more. At this time, the subject distances at the start and end points are expressed using the same six STEPs as in the Constant Subject Distance interval. Assume that the Changing Subject Distance interval has one change direction. That is, when the subject distance increases, and then decreases in turn, the increasing interval forms one interval, and the decreasing interval forms another interval.

In case of WB, an interval corresponding to frames with the identical WB mode is set as one interval. In case of Zoom, an interval corresponding to frames from the beginning to the end of the Zoom operation is set as one interval. In case of Pan, an interval corresponding to frames from the beginning to the end of the Pan operation is set as one interval. At this time, the frame positions of the start and end points of each interval are stored in association with each other as time information from the beginning of image sensing of that shot. Note that frame numbers may be used as the start and end points of the interval in place of the time information as long as the frame positions can be specified.

TABLE 10

Example of control information

| Field Name | Size | Description |
| --- | --- | --- |
| Gain | | |
| Gain Value | 1 bit | 0: interval with Gain value = 0<br>1: interval with +Gain value |
| Constant Subject Distance | | |
| Subject Distance Step | 4 bits | Express subject distance using 6 STEPs:<br>STEP1: 0 to 20 [cm]<br>STEP2: 20 to 100 [cm]<br>STEP3: 1 to 5 [m]<br>STEP4: 5 to 10 [m]<br>STEP5: 10 to 100 [m]<br>STEP6: 100 to infinity [m] |
| Changing Subject Distance | | |
| Start Subject Distance | 4 bits | Describe subject distance at start point of changing interval using STEP |
| End Subject Distance | 4 bits | Describe subject distance at end point of changing interval using STEP |

TABLE 11

Example of setup information
White Balance

| Field Name | Size | Description |
| --- | --- | --- |
| White Balance Mode | 4 bits | Same as that for each frame |

TABLE 12

Example of Operation information

| Field Name | Size | Description |
| --- | --- | --- |
| Zoom | | |
| Direction | 1 bit | Same as that for each frame |
| Start Magnification | 8 Bits | Describe Zoom magnification at Zoom operation start position using integer value |
| End Magnification | 8 Bits | Describe Zoom magnification at Zoom operation end position using integer value |
| Pan | | |
| Direction | 1 bit | Same as that for each frame |
| Speed | 4 bits | Express Pan average speed in three steps: STEP-1: low speed STEP-2: middle speed STEP-3: high speed |

It is checked in step S1908 if the user has issued a video recording end instruction (for example, by turning off the video recording button 29). If no video recording end instruction is input, steps S1902 to S1907 are repeated to continue video recording. On the other hand, if the video recording end instruction is input, the flow advances to step S1909 to store the camera appended information for respective intervals held in the RAM 303. That is, all pieces of camera appended information for respective intervals are sent from the system controller 21 to the MPEG CODEC 26, and are appended as a footer to the latter half of video data, which is then sent to the recorder 27. As this method, for example, all the pieces of camera appended information for respective intervals are converted into a private stream of TS (Transport Stream) packets, which can be additionally written at the end of video data. In this embodiment, one shot from the beginning to the end of video recording forms one file, and camera operation information associated with one shot is appended as a footer of that file.

Note that the format used upon storing the camera appended information for respective intervals as the footer is the same as that in the first embodiment (see FIG. 5), and a description thereof will be omitted.

Also, the internal structure of the camera appended information 502 shown in FIG. 5 is the same as that in the first embodiment (see FIG. 6), and a description thereof will be omitted.

Furthermore, the browse device of this embodiment, which is used to browse moving image files obtained by the aforementioned image sensing device is the same as that in the first embodiment (see FIG. 7), and a description thereof will be omitted.

Figure 20:
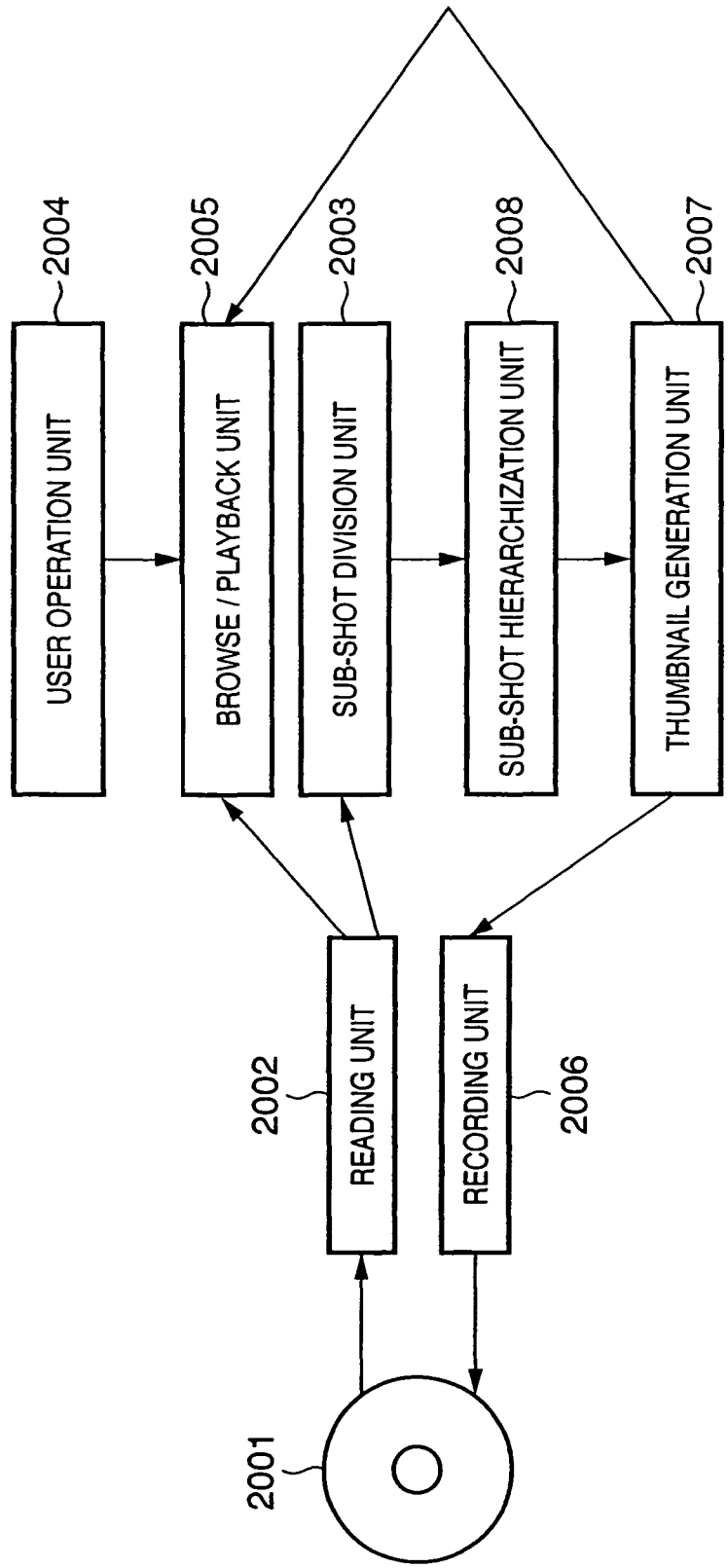
FIG. 20 is a block diagram showing the functional arrangement of a browse device according to the fourth embodiment.

FIG. 20 is a block diagram showing the functional arrangement of the browse device of this embodiment. Reference numeral 2001 denotes a storage medium, which corresponds to the storage medium 28 in FIG. 18. Reference numeral 2002 denotes a reading unit, which reads a moving image and camera appended information on the storage medium 2001. Reference numeral 2003 denotes a sub-shot division unit, which divides a moving image into significant intervals (sub-shots) on the basis of the aforementioned camera appended information which is appended to the footer of moving image data. Reference numeral 2008 denotes a sub-shot hierarchization unit, which hierarchizes intervals determined by the sub-shot division unit 2003. Reference numeral 2007 denotes a thumbnail generation unit which generates thumbnails of intervals hierarchized by the sub-shot hierarchization unit 2008. Reference numeral 2006 denotes a recording unit which records division points and layers determined by the sub-shot division unit 2003 and sub-shot hierarchization unit 2008 thumbnails generated by the thumbnail generation unit 2007 on the storage medium 2001. Reference numeral 2004 denotes a user operation unit, which includes the keyboard 704 and mouse 705 and is used to input a moving image playback instruction and the like. Reference numeral 2005 denotes a browse/playback unit which allows a browse process, playback process, and the like of a moving image file on the display unit 707 on the basis of user's instruction input via the user operation unit 2004.

Figure 26:
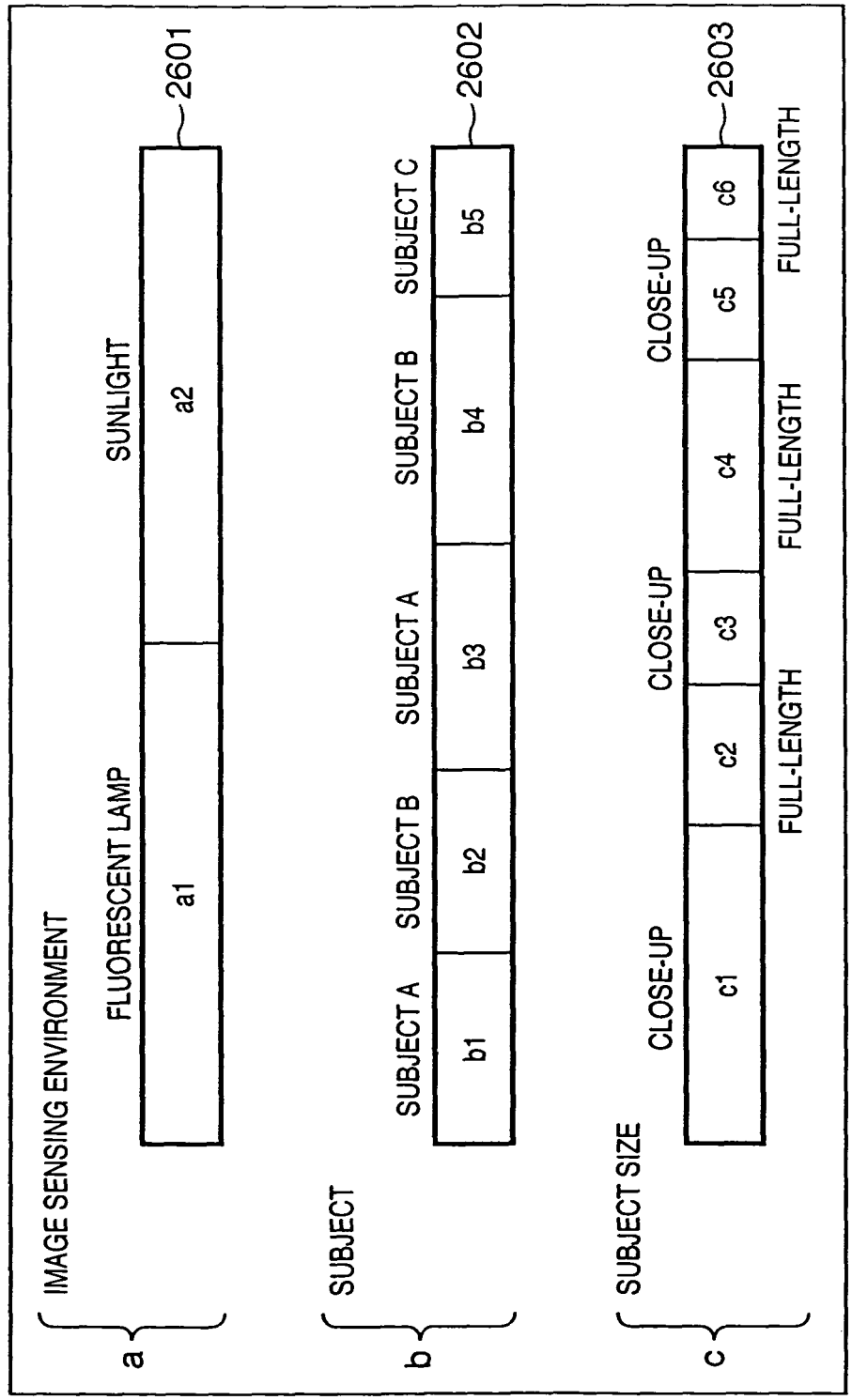
FIG. 26 is a view for explaining an outline of the sub-shot division process.

The sub-shot division process will be explained below. FIG. 26 is view for explaining an outline of the sub-shot division process. In FIG. 26, 2601 to 2603 indicate moving image data in a single moving image file (single shot), which is divided into significant intervals (also called sub-shots) on the basis of respective viewpoints. Note that "divide" means determining division points of sub-shots, and does not means actually separating a moving image file.

Referring to FIG. 26, reference numeral 2601 denotes a division result which is obtained by dividing moving image data from the viewpoint of image sensing environments. In this example, moving image data is divided into two sub-shots, that is, an interval (a1) as an indoor image sensing interval under the light of the fluorescent lamp, and an interval (a2) as an outdoor image sensing interval under the sunlight. Reference numeral 2602 denotes a division result which is obtained by dividing moving image data from the viewpoint of sensed subjects. In this example, moving image data is divided into five sub-shots, that is, intervals (b1, b3) as image sensing intervals of subject A, intervals (b2, b4) as image sensing intervals of subject B, and an interval (b5) as an image sensing interval of subject C. Reference numeral 2603 denotes a division result which is obtained by dividing moving image data from the viewpoint of field angles upon image sensing. In this example, moving image data is divided into six sub-shots, that is, intervals (c1, c3, c5) that correspond to close-up shots, and intervals (c2, c4, c6) that correspond to full-length shots.

Figure 29:
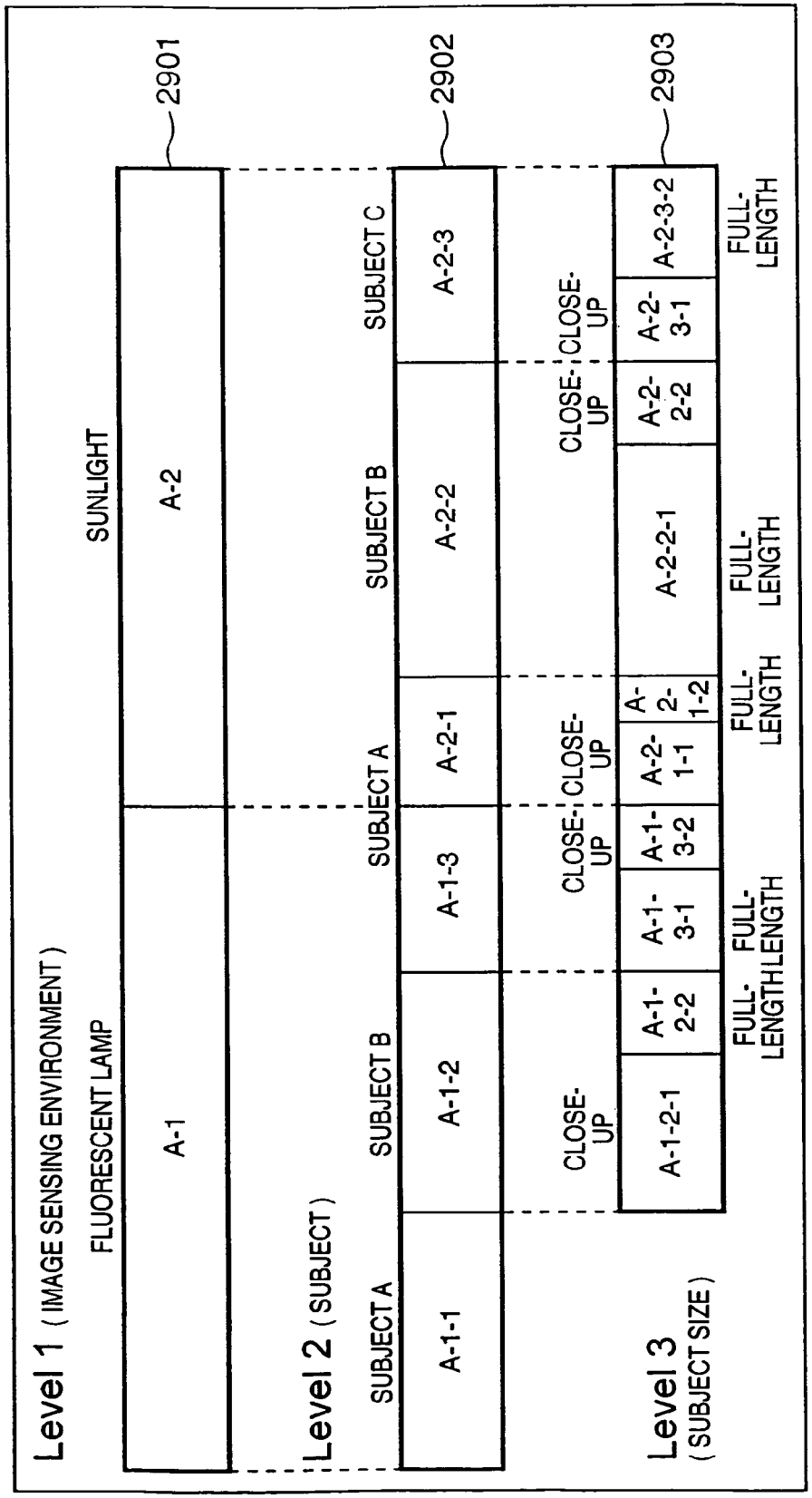
FIG. 29 shows an outline of hierarchized sub-shots.

FIG. 29 is a view for explaining an outline of sub-shot hierarchization. In FIG. 29, 2901 to 2903 indicate the same moving image file as that which has the sub-shot division results 2601 to 2603 in FIG. 26. That is, FIG. 29 shows the hierarchization result on the basis of the respective sub-shot division viewpoints in FIG. 26. Reference numeral 2901 denotes a first layer (level 1) which includes the division result from the viewpoint of image sensing environments. Reference numeral 2902 denotes a second layer (level 2) which includes the division result from the viewpoint of subjects. Note that how to determine the hierarchization relationship among layers will be described later. As lower layers of an interval (A-1) as an image sensing interval under the light of the fluorescent lamp, in the first layer 2901, an interval (A-1-1) as an image sensing interval of subject A, an interval (A-1-2) as an image sensing interval of subject B, and an interval (A-1-3) as another image sensing interval of subject A are present. Likewise, as lower layers of A-2, layers A-2-1, A-2-2, and A-2-3 are present. Reference numeral 2903 denotes a third layer (level 3) which includes the division result from the viewpoint of subject sizes. As lower layers of the interval (A-1-2) as the image sensing interval of subject B under the light of the fluorescent lamp, an interval (A-1-2-1) as a close-up shot interval of subject B, and an interval (A-1-2-2) as a full-length shot interval of subject B are present. Likewise, layers A-1-3-1 and A-1-3-2 are present as lower layers of A-1-3; layers A-2-1-1 and A-2-1-2 as lower layers of A-2-1; layers A-2-2-1 and A-2-2-2 as lower layers of A-2-2; and layers A-2-3-1 and A-2-3-2 as lower layers of A-2-3.

Figure 21:
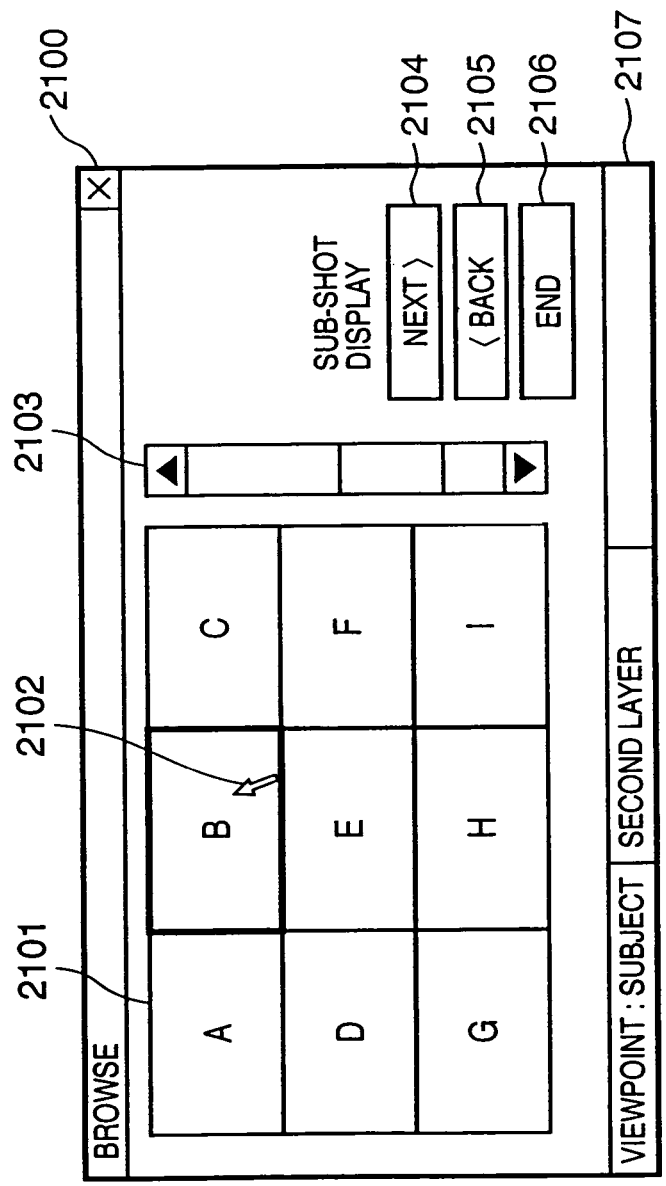
FIG. 21 shows an example of a user interface of the browse device.

FIG. 21 shows an example of the user interface of the browse device of this embodiment. Reference numeral 2101 denotes a thumbnail & moving image playback display area. The display area 2101 displays thumbnails of shots or sub-shots in a browse mode, and displays a played-back moving image in a moving image playback mode. Reference numeral 2102 denotes a pointer which is used to select a shot or sub-shot and to issue a playback instruction. Reference numeral 2103 denotes a scroll bar. Upon displaying thumbnails on the display area 2101, when the number of thumbnails to be displayed exceeds the maximum number of thumbnails (nine thumbnails in FIG. 21) that can be displayed, thumbnails which are not displayed can be displayed in turn by operating the scroll bar 2103. Reference numerals 2104 and 2105 denote sub-shot display buttons. If the "next" button 2104 is turned on, a sub-shot list of a layer lower by one level than the currently selected shot or sub-shot is displayed on the display area 2101. If the "back" button 2105 is turned on, a list of sub-shots (or shots) higher by one level than the current layer is displayed on the display area 2101, contrary to the "next" button. Reference numeral 2107 denotes a state display field which displays the current layer and the sub-shot division viewpoint of that layer upon displaying sub-shots. Reference numeral 2106 denotes an end button which is used to input a processing end instruction to this device.

Figure 27:
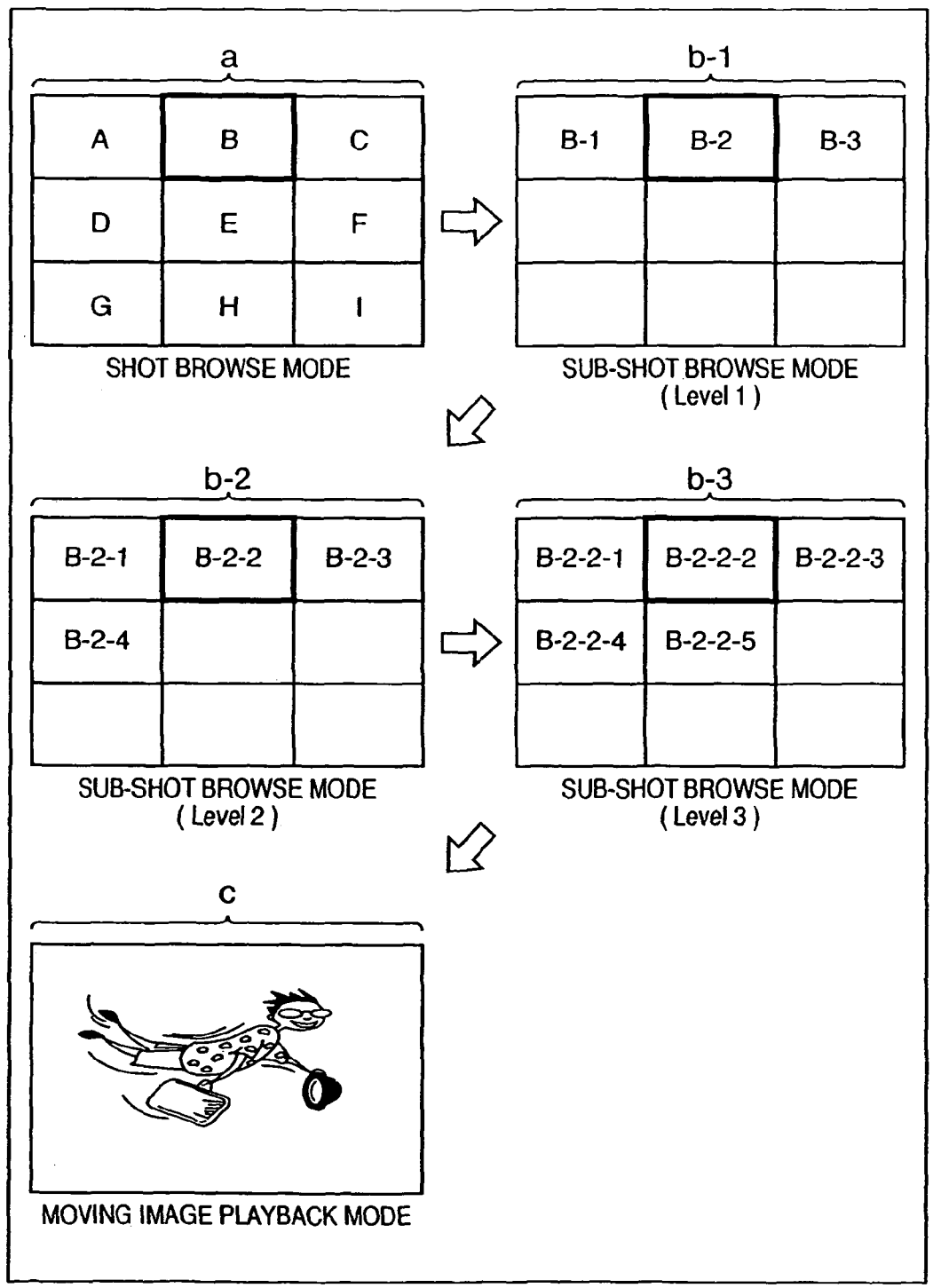
FIG. 27 shows an example of the operation of a display area on the user interface shown in FIG. 21.

FIG. 27 shows the display states on the display area 2101 in FIG. 21 according to respective operations. In a shot browse mode (a), a list of thumbnails corresponding to respective shots is displayed. When the user selects a desired thumbnail (shot) (in FIG. 27, a bold frame indicates that shot B is selected), and then turns on the "next" button 2104 using the pointer 2102, sub-shots of the selected shot (shot B in FIG. 27) are displayed (b-1). That is, a list of thumbnails of sub-shots of the first layer of the selected shot is displayed. Likewise, when the user selects a desired sub-shot (B-2 in FIG. 27) and turns on the "next" button 2104 using the pointer 2102, sub-shots of the lower layer of the selected sub-shot) can be displayed ((b-2) indicates the second layer, and (b-3) indicates the third layer).

When the user turns on the "back" button 2105, sub-shots or shots of the upper layers can be displayed in turn (for example, (b-3)→(b-2)→(b-1)→(a)). Furthermore, when the user selects a given sub-shot (B-2-2-2 in (b-3)), and double-clicks that sub-shot, a moving image is played back from the beginning of the selected sub-shot, and is displayed on the display area 2101 (c). Of course, when the user selects a given shot in the shot browse mode (a) and then double-clicks it, a moving image can be played back from the beginning of that shot.

In this way, the user can search for a desired interval of a moving image by displaying sub-shots in turn from upper layers. In the example of FIG. 29, the user can narrow down sub-shots in turn for respective viewpoints like "under the light of the fluorescent lamp" (first layer), "subject B" (second layer), and "close-up" (third layer).

Figure 22:
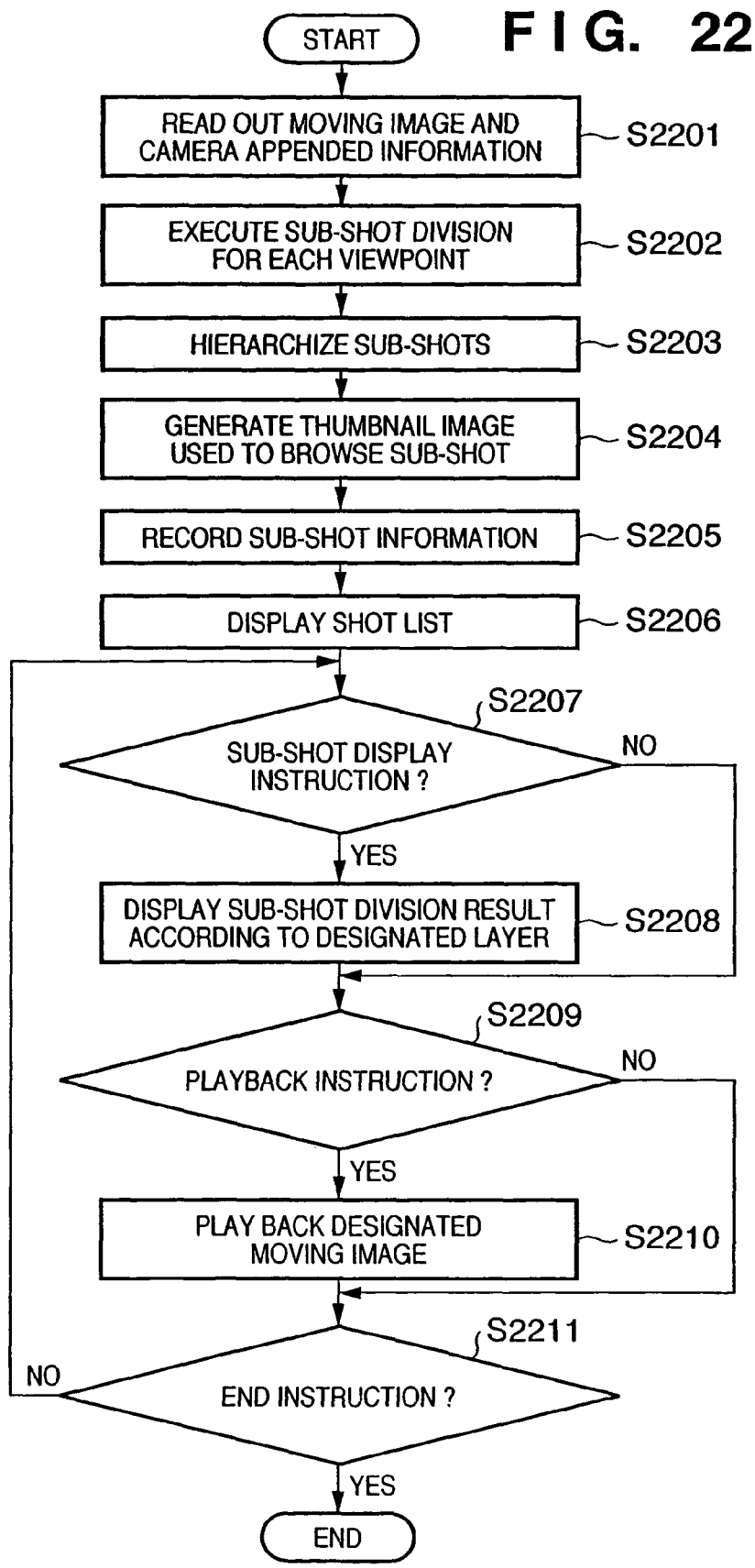
FIG. 22 is a flow chart showing an example of the operation of the browse device.
Figure 23B:
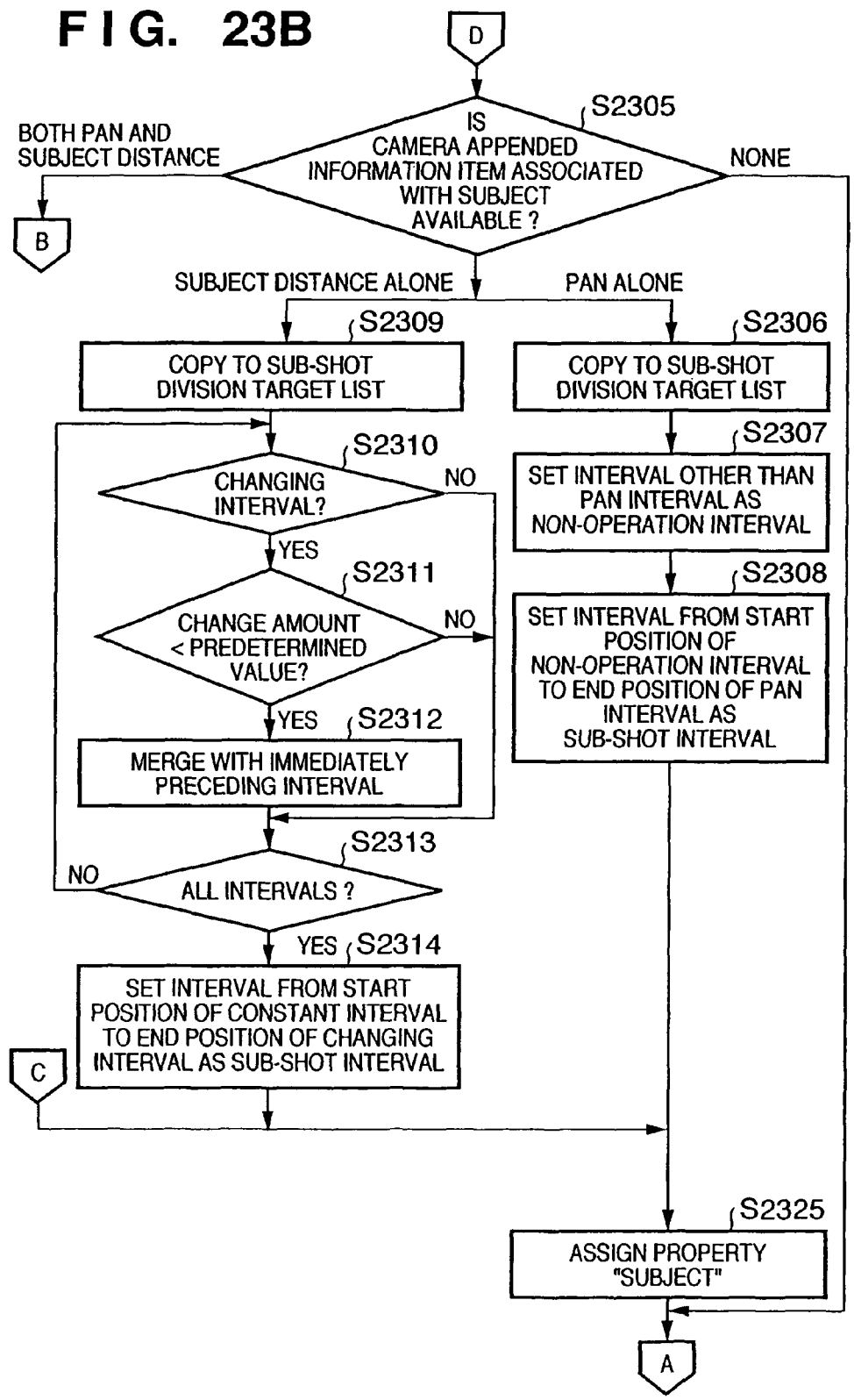
FIG. 23B is a flow chart showing the detailed sequence of a sub-shot division process of the browse device.
Figure 23C:
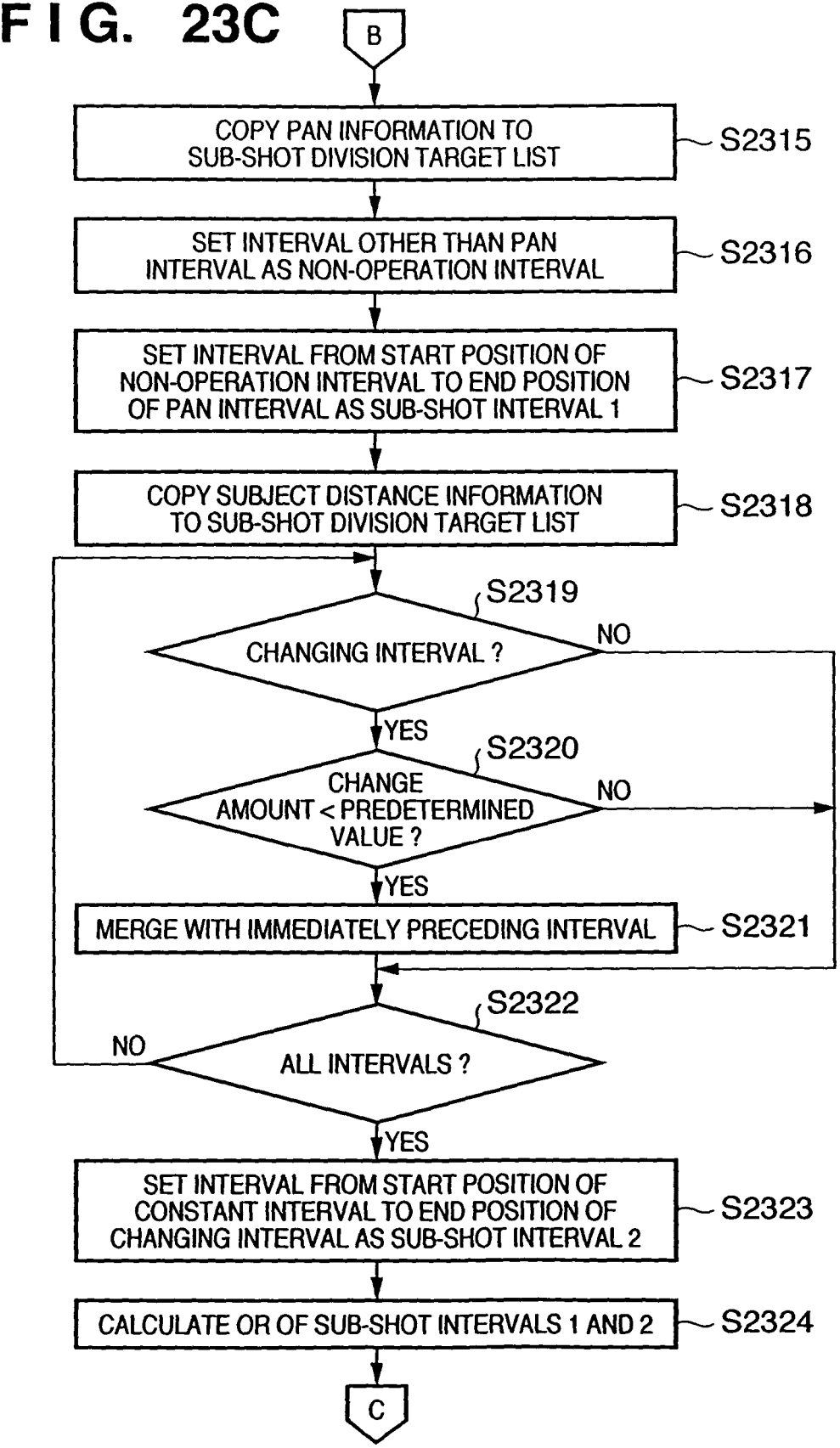
FIG. 23C is a flow chart showing the detailed sequence of a sub-shot division process of the browse device.
Figure 23D:
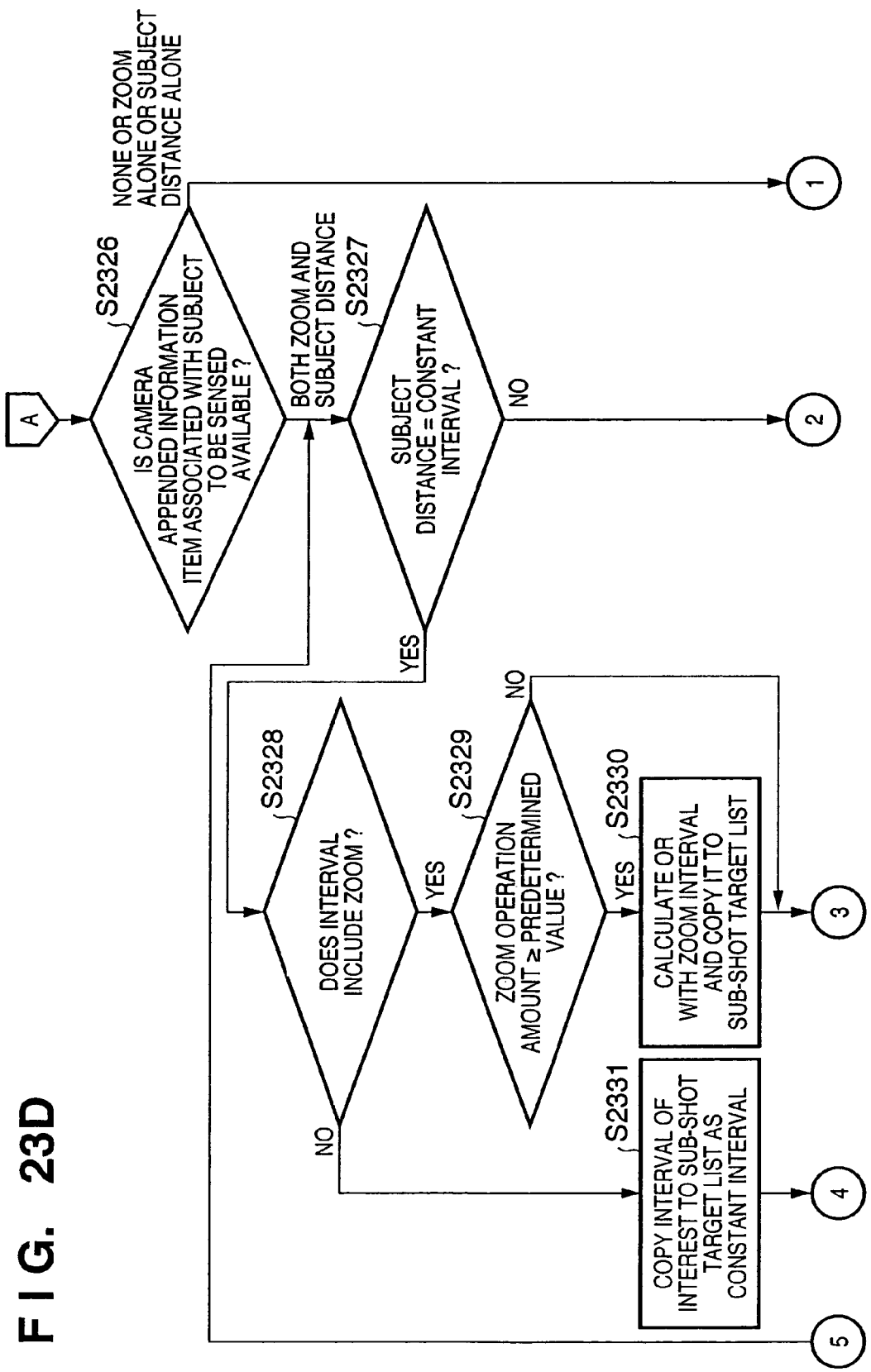
FIG. 23D is a flow chart showing the detailed sequence of a sub-shot division process of the browse device.
Figure 23E:
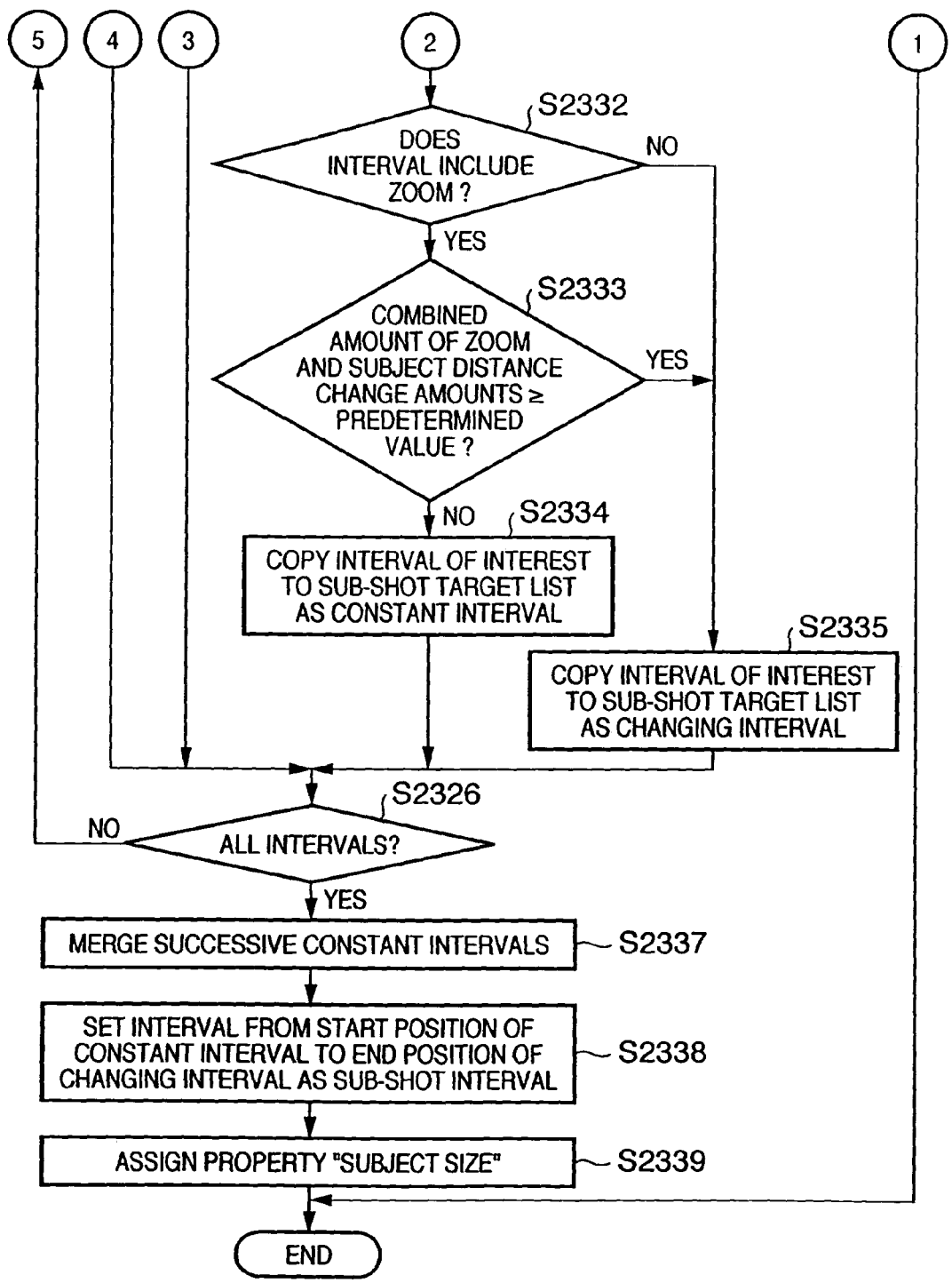
FIG. 23E is a flow chart showing the detailed sequence of a sub-shot division process of the browse device.

The operation of the browse device of this embodiment with the above arrangement will be described in more detail below with reference to FIG. 22. FIG. 22 is a flow chart showing an example of the operation of the browse device according to this embodiment.

The process of this device is roughly classified into a sub-shot division process from step S2201 to step S2205, and a browsing process from step S2206 to step S2211.

The sub-shot division process will be explained first. In step S2201, the reading unit 2002 reads out all moving image files from the storage medium 2001, and acquires moving image data and a plurality of pieces of camera appended information (to be referred to as a camera appended information list hereinafter) included in the readout files. In step S2202, the sub-shot division unit 2002 divides each moving image data into sub-shots for respective viewpoints on the basis of the readout camera appended information list, and determines division points for respective viewpoints (details of this process will be described later). In step S2203, the sub-shot hierarchization unit 2008 executes the sub-shot hierarchization process, as described above using FIG. 29. In step S2204, the thumbnail generation unit 2007 generates thumbnail images which are used to display a list of sub-shots on the browse device. Each thumbnail image can be generated by acquiring the first frame of each sub-shot interval from a moving image, and reducing it. Of course, the list display pattern and thumbnail generation method are not limited to these specific ones, and any other patterns may be adopted as long as the contents of sub-shots can be approximately recognized.

In step S2205, the recording unit 2006 records the hierarchized sub-shot division results in the storage medium 2001. This recording process on the storage medium 2001 is not indispensable, but the browse/playback unit 2005 may refer to the division results via the RAM or the like. However, when such sub-shot information is temporarily recorded in the storage medium 2001, other devices can use the hierarchized sub-shot division results.

Note that the format upon storing sub-shot information has already been explained in the first embodiment (see FIG. 13), and a description thereof will be omitted.

Figure 25:
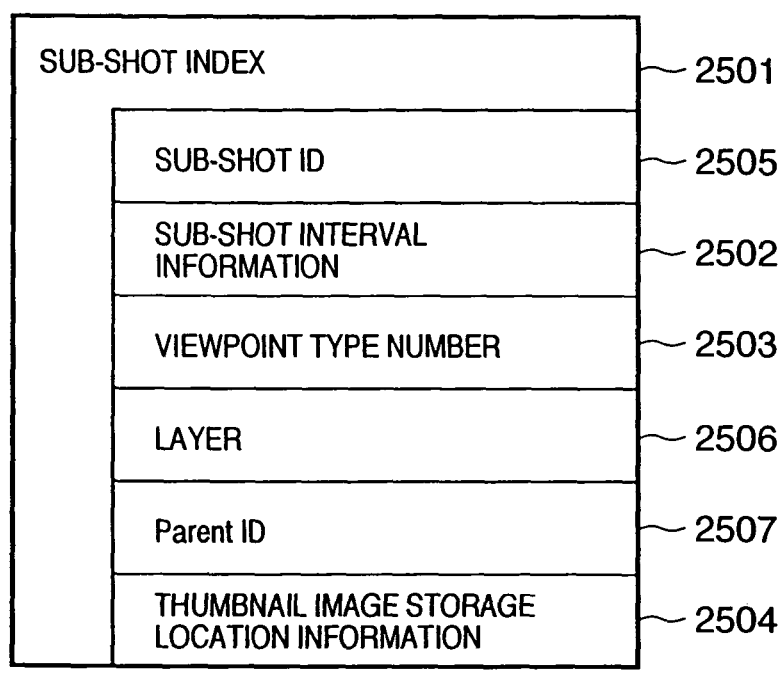
FIG. 25 shows an example of the internal structure of a sub-shot index shown in FIG. 13.

FIG. 25 shows the internal structure of each sub-shot index 1303 in FIG. 13 in this embodiment. A sub-shot index 2501 has some fixed-length items. A sub-shot ID 2505 is used to identify each individual sub-shot. Sub-shot interval information 2502 represents a sub-shot interval using time information, and is used to designate one sub-shot in a shot. Note that the sub-shot interval may be expressed using a frame number as in the camera appended information. A viewpoint type number 2503 is used to identify a viewpoint (to be described later) upon sub-shot division. A layer 2506 indicates the layer of the sub-shot of interest. A Parent ID 2507 describes the sub-shot ID of a parent sub-shot. If the sub-shot of interest is that of the uppermost layer, a specific ID (for example, 0) is assigned. Thumbnail image storage location information 2504 represents the storage location of a thumbnail image in the thumbnail image storage area using, for example, an offset from the head of that area.

The detailed sequence of the sub-shot division process in step S2202 will be described below using FIGS. 23A to 23E.

A sub-shot division process associated with the viewpoint "image sensing environment" is executed first. It is checked in step S2301 if camera appended information items associated with the viewpoint "image sensing environment" are available. As specific items associated with an image sensing environment, various items such as focus, IRIS, Gain, WB, AE Mode, and the like are available. However, in this embodiment, WB and Gain are used for the sake of simplicity. WB setups are changed according to an image sensing environment. For example, the user sets a preset sunlight mode under the sunlight, and sets a preset fluorescent lamp mode under the light of the fluorescent lamp. If different WB Modes are set, it can be determined that an image sensing environment has changed. Gain assumes a positive value upon sensing an image in a very dark environment, and is used as means for correcting the brightness of an image by the image sensing device. Whether or not an image sensing environment has changed can be determined by checking if Gain assumes a positive value.

If neither of WB and Gain are available in the camera appended information item list, since the sub-shot division process from the viewpoint of "image sensing environment" cannot be made, the control skips steps S2302 to S2304, and jumps to step S2205. If either WB or Gain is available, the flow advances to step S2302. In step S2302, the appending target interval of WB or Gain is used as a sub-shot interval intact, and is copied to the sub-shot interval information 2502. If both WB and Gain are available, the flow advances to step S2303. In step S2203, the OR of the appending target intervals of WB and Gain is calculated and is copied as a sub-shot interval to the sub-shot interval information 2502. In step S2304, a viewpoint type number "1" indicating "image sensing environment" is appended to the sub-shot interval determined in step S2302 or S2303, and is recorded as the viewpoint type number 2503.

In this manner, in the example of the viewpoint "image sensing environment", only a plurality of different items that match the viewpoint are selected from the camera appended information, and respective intervals are ORed to determine a sub-shot interval. Hence, the intervals of items which are not related to this viewpoint can be excluded.

Next, a sub-shot division process associated with the viewpoint "subject" is executed. It is checked in step S2305 if camera appended information items associated with the viewpoint "subject" are available. As specific items associated with the viewpoint "subject", various items such as Pan, Tilt, Subject Distance, and the like are available. However, in this embodiment, Pan and Subject Distance are used for the sake of simplicity. Upon moving a viewpoint from subject A to subject B, the user must make a Pan operation that swings the image sensing device in the horizontal direction. Hence, it can be determined that a subject has changed before and after the Pan operation. Also, when subject B appears between subject A and the image sensing device 1010 while sensing subject A, the subject distance changes abruptly. When the subject distance changes abruptly in this way, it is estimated that a subject has changed.

If neither Pan nor Subject Distance are available in the camera appended information item list, the control skips the sub-shot division process associated with the viewpoint "subject" (from step S2306 to step S2325), and jumps to step S2326.

On the other hand, if only Pan is available in the camera appended information item list, the flow advances to step S2306 to copy all Pan appending target intervals to a sub-shot interval target list. The sub-shot interval target list is used as a temporary file, and has the same format as the camera appended information storage area 501. The flow then advances to step S2307 to insert intervals without any Pan operations to the sub-shot interval target list as non-operation intervals. At this time, a special number (for example, 0) is recorded in the type number 604 (FIG. 6) so as to indicate a non-operation. The flow advances to step S2308 to copy an interval from the start position of each non-operation interval to the end of the Pan operation in the sub-shot interval target list to the sub-shot interval information 2502 as a sub-shot interval. By way of exception, if the terminal end of a shot corresponds to a non-operation interval, that interval is set as a sub-shot interval intact (not shown). In this embodiment, a sub-shot interval is defined from the start position of each non-operation interval to the end of the Pan operation. This is because the Pan operation forms an interval in which subjects are changing, and an interval immediately before the Pan operation is considered as a part of a sub-shot interval of the Pan operation. Hence, these intervals are merged to form one sub-shot interval.

If it is determined in step S2305 that only Subject Distance is available, the flow advances to step S2309 to copy all Subject Distance appending target intervals to the sub-shot interval target list. The flow advances to step S2310, and one interval is extracted in turn from the head of the sub-shot interval target list to check if that interval is a Changing or Constant Subject Distance interval (Table 10). If the interval of interest is the Constant Subject Distance interval, the control skips the processes in steps S2311 and S2312 and jumps to step S2313.

On the other hand, if it is determined in step S2310 that the interval of interest is the Changing Subject Distance interval, the flow advances to step S2311 to check if a change amount (the absolute value of the difference between the Start and End Subject Distance Steps) of the subject distance is smaller than a predetermined value A. Note that the predetermined value A is not particularly limited but it is 2 in this embodiment. That is, the condition of step S2311 is not met when the subject distance has changed abruptly. At this time, the control skips step S2312, and jumps to step S2313. On the other hand, if the condition of step S2311 is met, since the subject distance has not changed abruptly, the flow advances to step S2312 to merge the interval of interest with the immediately preceding interval in the sub-shot interval target list. If a change in subject distance is slow, it is estimated that a subject is not changed, and the distance to an identical subject has changed. Hence, such interval cannot be used as a sub-shot division target interval.

Step S2313 is an end determination step. That is, it is checked if the aforementioned processes in steps S2310 to S2312 have been done for all the intervals in the sub-shot interval target list. If intervals to be processed still remain, the flow returns to step S2310 to repeat the above processes. If the processes have been done for all the intervals, the flow advances to step S2314 to copy each sub-shot interval from the start position of the Constant Subject Distance interval to the end of the Changing Subject Distance interval in the sub-shot interval target list to the sub-shot interval information 2502. By way of exception, if the terminal end of a shot corresponds to a Constant Subject distance interval, that interval is set as a sub-shot interval intact (not shown). This is because an interval in which the subject distance has changed abruptly corresponds to an interval in which subjects are changing, and an interval immediately before such change in subject distance is considered as a part of a sub-shot interval of that change in subject distance. Hence, these intervals are merged to form one sub-shot interval.

If it is determined in step S2305 that both Pan and Subject Distance are available, the flow advances to step S2315. Since steps S2315 to S2317 are the same as steps S2306 to S2308 and steps S2319 to S2323 are the same as steps S2309 to S2314, a description thereof will be omitted. However, in steps S2318 and S2323, sub-shot information is temporarily copied to sub-shot interval candidate lists 1 and 2 which is a temporary file as in the sub-shot interval target list and has the same format as the camera appended information storage area 501 without being directly copied to the sub-shot interval information 2502. In step S2324, the ORs of sub-shot interval candidate lists 1 and 2 are calculated, and are copied to the sub-shot interval information 2502.

In step S2325, a viewpoint type number "2" that represents "subject" is appended to respective sub-shot intervals determined in one of steps S2308, S2314, and S2324.

In this manner, in the example of the viewpoint "subject", only a plurality of different items that match the viewpoint are selected from the camera appended information, and intervals in which respective items meet specific conditions (for example, a change amount and the like) are extracted and ORed to determine a sub-shot interval. Hence, the intervals of items which are not related to this viewpoint can be excluded. In addition, even an interval of an item which is related to the viewpoint can be excluded if it has a small influence.

Finally, a sub-shot division process associated with the viewpoint "subject size" is executed. It is checked in step S2326 if camera appended information items associated with the viewpoint "subject size" are available. As specific items associated with the viewpoint "subject size", various items such as Zoom, Digital Zoom, Subject Distance, and the like are available. However, in this embodiment, Zoom and Subject Distance are used for the sake of simplicity. In order to take a close-up shot of the face of subject A after the user adjusts the subject size to take a full-length shot of subject A, he or she must operate Zoom to the tele side while maintaining the constant subject distance, or must approach subject A to decrease the subject distance. Also, in order to take subject A with the same size while subject A is moving away from the user (photographer), the user must operate Zoom to the tele side. Hence, by combining additional information of Zoom and Subject Distance, it is estimated if the subject size has changed.

If either of Zoom or Subject Distance is not available in the camera appended information item list, since the sub-shot division process associated with the viewpoint "subject size" cannot be done, the control skips steps S2327 to S2339.

If it is determined in step S2326 if the list includes additional information of both Zoom and Subject Distance, the flow advances to step S2327, and one interval is extracted in turn from the head of the sub-shot interval target list to check if that interval is a Changing or Constant Subject Distance interval. If the interval of interest is a Constant Subject Distance interval, processes in steps S2328 to S2331 are executed. On the other hand, if the interval of interest is a Changing Subject Distance interval, processes in steps S2332 to S2335 are executed. Step S2336 is an end determination step. That is, it is checked if the series of processes have been done for all the intervals of Subject Distance.

A case will be explained wherein it is determined in step S2327 that the interval of interest is a Constant Subject Distance interval. It is checked in step S2328 if Zoom is included in the current interval. If no Zoom is found, the flow advances to step S2331 to copy the interval of interest to a sub-shot target interval list as a constant subject size interval. If Zoom is found, the flow advances to step S2329. It is checked in step S2329 if the Zoom operation amount (the absolute value of the difference between Start and End Magnifications) is equal to or larger than a predetermined value B. This is for the following reason. That is, if the operation amount is small, it can be determined that the user finely adjusts the Zoom amount. Also, "1.5×" or the like is preferably used as the predetermined value B, but the present invention is not limited to such specific value. If the Zoom operation amount is smaller than the predetermined value B, since the interval of interest is not suitable for a sub-shot division interval target, the control skips step S2330.

On the other hand, if the Zoom operation amount is equal to or larger than the predetermined value B, the flow advances to step S2330. At this time, since this Zoom operation amount is large enough to change the subject size, and the subject distance is constant, the Zoom interval is an interval in which the subject size is changed. Hence, the current subject distance interval and Zoom interval are ORed, and the OR is copied to the sub-shot target interval list. For example, if the current subject distance interval includes one Zoom interval, it is divided into three intervals, that is, an interval from the beginning of the subject distance interval to the beginning of the Zoom interval, an interval from the beginning to the end of the Zoom interval, and an interval from the end of the Zoom interval to the end of the subject distance interval, and their types are respectively a constant subject size interval, changing subject size interval, and constant subject size interval in turn.

A case will be explained below wherein it is determined in step S2327 that the subject distance is changed (in case of the Changing Subject Distance interval). It is checked in step S2332 if the current interval includes Zoom. If no Zoom is found, the flow advances to step S2335. Since no Zoom operation is made, if the subject distance is changed, it is estimated that the subject size is changed. At this time, the flow advances to step S2335, and the current interval is copied to the sub-shot target interval list as a changing interval.

On the other hand, if it is determined in step S2332 that the current interval includes Zoom, the flow advances to step S2333. At this time, since Zoom and Subject Distance are changed at the same time, estimation cannot be made unless the two amounts are combined. Various estimation methods are available. For example, whether or not the subject size is changed can be estimated by:

Total change amount=absolute value of ((Start Subject Distance Step–End Subject Distance Step)–$H$×(Start Magnification–End Magnification))

where $H$ is a coefficient, which is determined depending on the characteristics of the zoom lens or the like. In this embodiment, $H=1$.

For example, when the user approaches a subject (from STEP2 to STEP1 in Table 10) and operates Zoom to the wide side (from 3× to 2×), the total change amount is zero since it is the absolute value of (2-1)-(3-2) from the above equation. This indicates that the subject size remains unchanged. On the other hand, when the user approaches a subject (from STEP2 to STEP1) and operates Zoom to the tele side (from 3× to 4×), the total change amount is 2 since it is the absolute value of (2-1)-(3-4) from the above equation. This indicates that the subject size is changed. Hence, if the total change amount is large, it is estimated that the subject size is changed.

If it is determined in step S2333 that the total change amount is equal to or larger than a predetermined value C, it is determined that the subject size is changed. Note that the predetermined value C is not particularly limited, and is 1 in this embodiment. If the total change amount is equal to or larger than the predetermined value C, the flow advances to step S2335 described above. If the total change amount is smaller than the predetermined value C, since it is consequently estimated that the subject size remains unchanged, the flow advances to step S2334 to copy the current subject distance interval to the sub-shot target interval list as a constant interval.

If it is determined in end determination step S2336 that the processes have been done for all the intervals, the flow advances to step S2337. In step S2337, successive constant intervals in the sub-shot target interval list are merged if such intervals are available. This is because the subject size consequently remains the same during such successive intervals. The flow advances to step S2338 to copy each sub-shot interval from the start position of the constant interval to the end of the changing interval in the sub-shot interval target list to the sub-shot interval information 2502. By way of exception, if the terminal end of a shot corresponds to a constant interval, that interval is set as a sub-shot interval intact (not shown). This is because an interval in which the subject size is changed is considered as a part of an immediately preceding interval, and these intervals are merged to form one sub-shot interval. In step S2339, a viewpoint type number "3" that represents "subject size" is appended to sub-shot intervals determined in step S2338.

In this manner, in the example of the viewpoint "subject size", only a plurality of different items that match the viewpoint are selected from the camera appended information, and respective items are combined to consider not only a change amount of a given interval or the like but also a total change amount, so as to only intervals that meet specific conditions, thus determining sub-shot intervals. In this manner, the intervals of items which are not related to the viewpoint can be excluded, and intervals according to the viewpoint, which cannot be extracted by simply ORing a plurality of items, can be extracted.

With the process in step S2202 described above, sub-shot intervals according to each viewpoint can be extracted from a plurality of kinds of camera appended information.

Figure 28A:
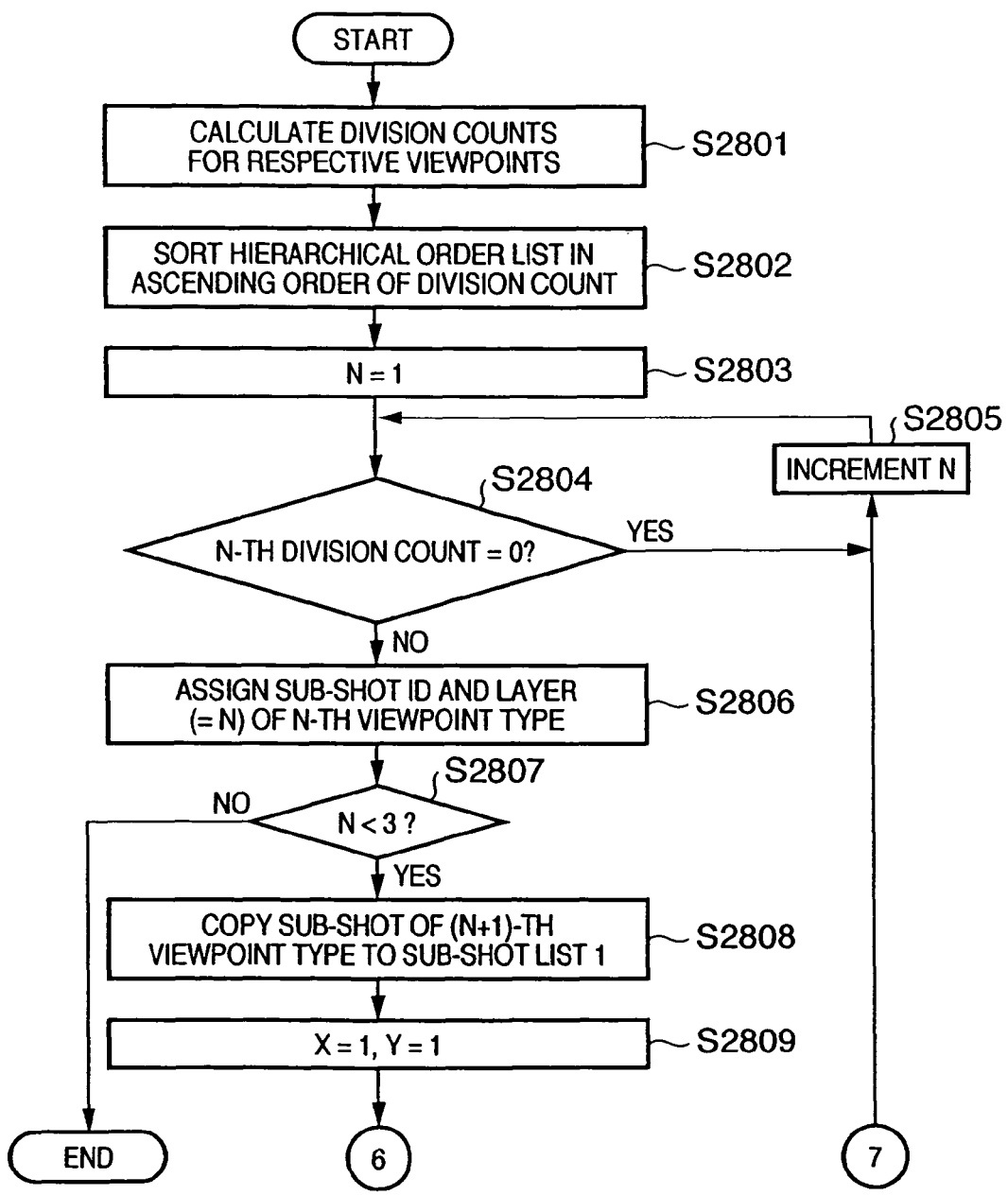
FIG. 28A is a flow chart showing the detailed sequence of a sub-shot hierarchization process of the browse device.
Figure 28B:
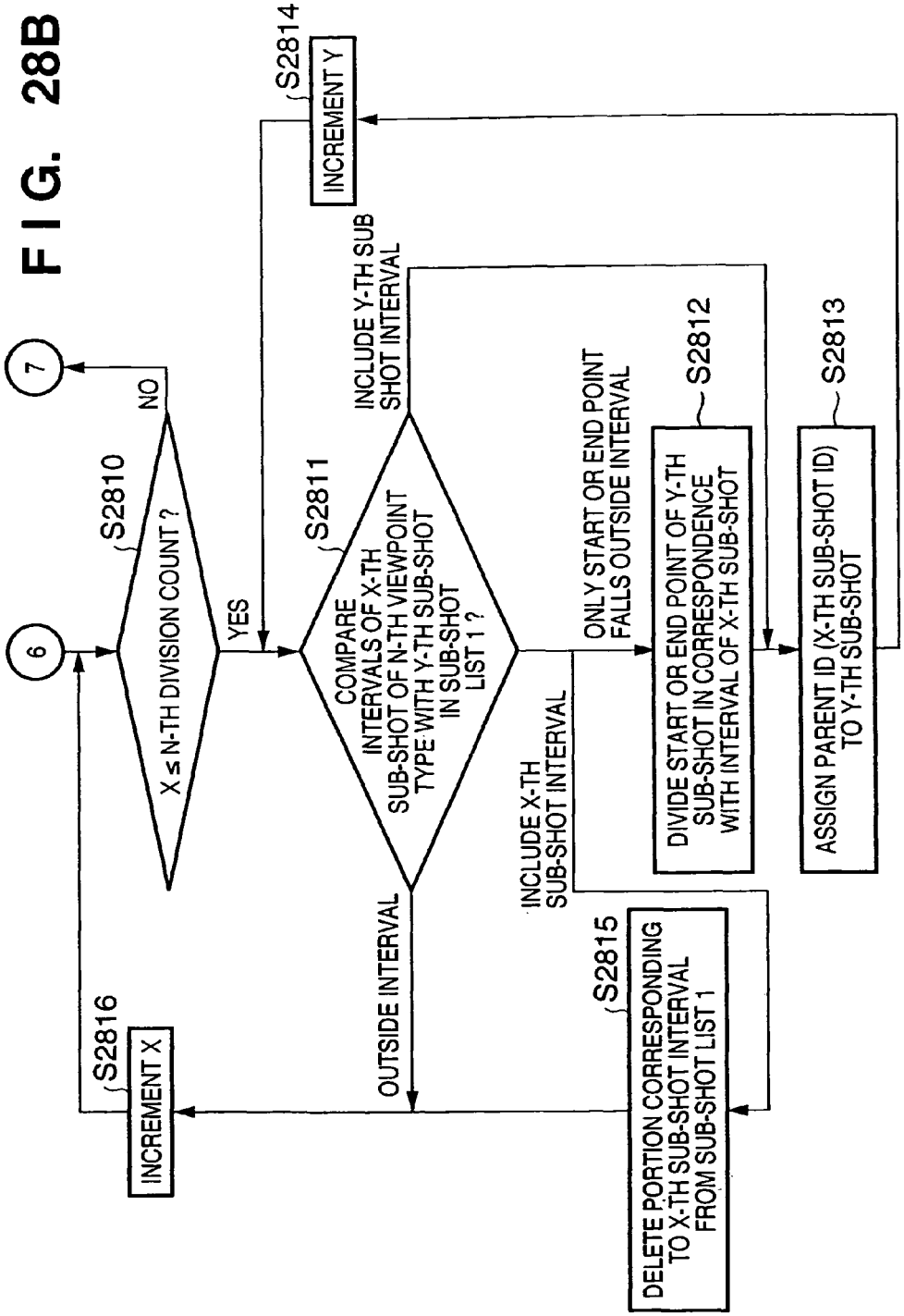
FIG. 28B is a flow chart showing the detailed sequence of a sub-shot hierarchization process of the browse device.

The detailed sequence of the sub-shot hierarchization process in step S2203 will be described below with reference to FIG. 28A and FIG. 28B.

Figure 30:
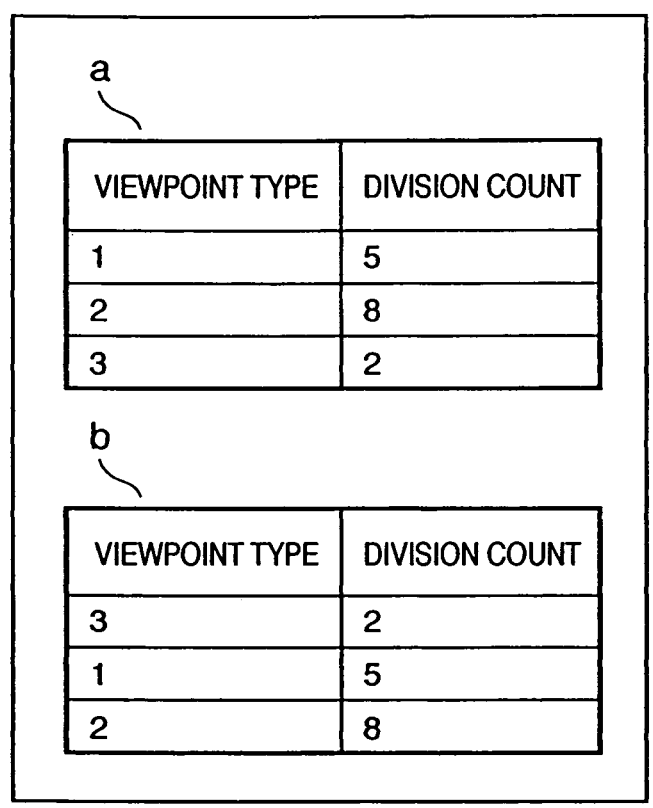
FIG. 30 shows an example of a hierarchical order list.

In step S2801, the numbers of sub-shot intervals determined in step S2202 are counted for respective viewpoints, and the count results are stored in a hierarchical order list. The hierarchical order list will be described below with reference to FIG. 30. FIG. 30 shows an example of the hierarchical order list. The hierarchical order list includes a viewpoint type and division count. Hierarchization is made in turn from the first viewpoint type. As default values, the viewpoint types are stored in the order of 1, 2, and 3 ((a) of FIG. 30). This is because it is normally desirable to hierarchize in this order since it is a common practice to narrow down intervals in the order of image sensing environment (viewpoint type 1), subject (viewpoint type 2), and subject size (viewpoint type 3) when the user searches for a desired interval. In the following description, assume that the division counts of the respective viewpoints are stored as in the example (a) of FIG. 30 in step S2801.

In step S2802, the hierarchical order list is sorted in ascending order of division count. In the state of (a) of FIG. 30, the viewpoint types are re-ordered by the process in step S2802, as shown in (b) of FIG. 30. Such re-ordering is made for the following reason. In some sensed moving images, a subject remains unchanged, and only image sensing environments change frequently, or the subject size does not nearly change, and only subjects change frequently, that is, many subjects are included. In such case, by setting the viewpoint with a smaller division count as the top layer, the sub-shots of the top layer can include many sub-shots of lower layers. In this manner, when the user searches for a desired interval, he or she can largely narrow down the search range, and can quickly reach a desired interval. If some viewpoints have the same division count, the default order is preferentially used since the default state is normally preferable.

In step S2803, 1 is set in N as an initial value. It is checked in step S2804 if the N-th division count in the hierarchical order list is zero. If the N-th division count is zero, since no division is made based on the N-th viewpoint, the flow advances to step S2805 to increment N, and the flow returns to step S2804. If the N-th division count is not zero, the flow advances to step S2806. In step S2806, sub-shot IDs 2501 are assigned in turn from the sub-shot index of the first sub-shot of the N-th viewpoint type, and N indicating the N-th layer is assigned to the layer 2503 of each index. The flow then advances to step S2807 to check if N<3. This is an end determination process. Since this embodiment explains an example including only three layers, the hierarchization process ends when N=3.

In step S2808, a sub-shot index list in the sub-shot index storage area 1301 with the (N+1)-th viewpoint type is copied to sub-shot list 1. Sub-shot list 1 is used as a temporary file, which includes the same elements as those of the sub-shot index storage area 1301.

In step S2809, 1 is set in X and Y as an initial value. The flow advances to step S2810 to check if X is equal to or smaller than the division count (the number of sub-shots) of the N-th layer. That is, an end determination process for checking if processes in steps S2811 to S2816 have been done for all sub-shots of the N-th viewpoint is executed. While X is equal to or smaller than the N-th division count, the processes in steps S2811 to S2816 are repeated.

In step S2811, the X-th sub-shot of the N-th viewpoint type is compared with the Y-th sub-shot interval of sub-shot list 1. If the X-th sub-shot interval includes the Y-th sub-shot interval, the flow advances to step S2813. This corresponds to a case (a) of FIG. 31. In the case (a) of FIG. 31, reference numeral 3101 denotes the X-th sub-shot interval; and 3102, the Y-th sub-shot interval. In step S2813, the sub-shot ID 2501 of the X-th sub-shot is assigned to the Parent ID 2503 of the Y-th sub-shot so as to determine the Y-th sub-shot as that in the lower layer of the X-th sub-shot. The flow advances to step S2814 to increment Y, and the flow returns to step S2811.

If it is determined in step S2811 that either the start or end point of the Y-th sub-shot interval falls outside the X-th sub-shot interval, the flow advances to step S2812. This corresponds to a case (b) in FIG. 31. In the case (b) of FIG. 31, reference numeral 3103 denotes the X-th sub-shot interval; and 3104, the Y-th sub-shot interval. In step S2812, the start or end point of the Y-th sub-shot, which falls outside the X-th sub-shot, is divided in correspondence with the X-th sub-shot interval. In the case (b) of FIG. 31, the Y-th sub-shot is divided into an interval 3106 on the end point side outside the X-th sub-shot interval, and an interval 3105 within the X-th sub-shot interval. Note that the interval 3105 is used as a new Y-th sub-shot. Next, the aforementioned processes in steps S2813 and S2814 are executed.

If it is determined in step S2811 that the Y-th sub-shot interval includes the X-th sub-shot interval, the flow advances to step S2815. This corresponds to a case (c) of FIG. 31. In the case (c) of FIG. 31, reference numeral 3107 denotes the X-th sub-shot interval; and 3108, the Y-th sub-shot interval. In this case, since the X-th sub-shot cannot be further divided by the lower layer, an interval corresponding to the X-th sub-shot interval is deleted from sub-shot list 1 in step S2815 (since hierarchization of this embodiment aims at reaching a desired interval by gradually narrowing down sub-shot intervals, it is nonsense to assure a lower layer that cannot divide the interval of the upper layer). Reference numeral 3109 denotes a remaining interval, which is handled as the (Y+1)-th interval. The flow advances to step S2816 to increment X, and the flow returns to step S2810.

If it is determined in step S2811 that the Y-th sub-shot interval falls outside the X-th sub-shot interval, the flow advances to step S2816. This corresponds to a case (d) in FIG. 31. In this case, reference numeral 3110 denotes the X-th sub-shot interval; and 3111, the Y-th sub-shot interval.

Referring back to FIG. 22, the browsing process from step S2206 to step S2211 will be described below.

In step S2206, thumbnails that represent respective moving image files (shots) are displayed on the display area 2101. As a thumbnail that represents each shot, a thumbnail of a sub-shot which is registered at the head position may be used. However, a thumbnail for a shot may be independently generated. That is, the contents of each shot need only be surveyed. Note that the thumbnails are arranged on the display area 2101 in turn from the uppermost row to lower rows and from the left to the right in each row in the order of, for example, image sensing start times described in the file headers.

It is checked in step S2207 if a sub-shot display instruction is input. This checking step can be implemented by examining if the user designates a shot or sub-shot and then turns on the sub-shot display button 2104 or 2105 using the pointer 2102. However, if the "back" button 2105 is turned on in the shot list display mode, since no upper layer is available, the display contents remain unchanged. If neither the button 2104 nor the button 2105 are ON, the control skips step S2208, and jumps to step S2209.

If either the button 2104 or 2105 is ON, the flow advances to step S2208. If the "next" button 2104 is ON, sub-shots of a lower layer are displayed; if the "back" button 2105 is ON, those of an upper layer are displayed. In this case, the state display field 2107 displays the current layer and viewpoint, which can be identified by the user.

It is checked in step S2209 if a moving image playback instruction is input. This checking step can be implemented by examining if the user double-clicks a specific shot or sub-shot using the pointer 2102. If no playback instruction is input, the control skips step S2210 and jumps to step S2211. On the other hand, if the playback instruction is input, a moving image is played back from the beginning of the designated shot or sub-shot in step S2210. After the playback process, the control returns to the previous shot or sub-shot list display (not shown). It is then checked in step S2211 if an end instruction is input. This checking step can be implemented by examining if the end button 2106 is turned on. If no end instruction is input, the flow returns to step S2207 to repeat the above processes. If an end instruction is input, this process ends.

As described above, according to the fourth embodiment, the user can effectively narrow down sub-shots by selecting a sub-shot and designating sub-shot display, and can quickly reach a desired interval (sub-shot). For this reason, such function can be easily used in the playback process, moving image edit process, and the like.

Fifth Embodiment

The fifth embodiment of the present invention will be described below.

In the fourth embodiment, information acquired from the sensors and the operation unit provided to the image sensing device 1010 or control information is appended as camera appended information. In the fifth embodiment, camera appended information that can extracted by analyzing sensed image data is appended after image sensing, and is used as camera appended information.

Since the arrangement of the moving image processing system, that of the image sensing device 1010, and the like are the same as those in the fourth embodiment, a description thereof will be omitted, and only differences will be explained below.

Figure 24:
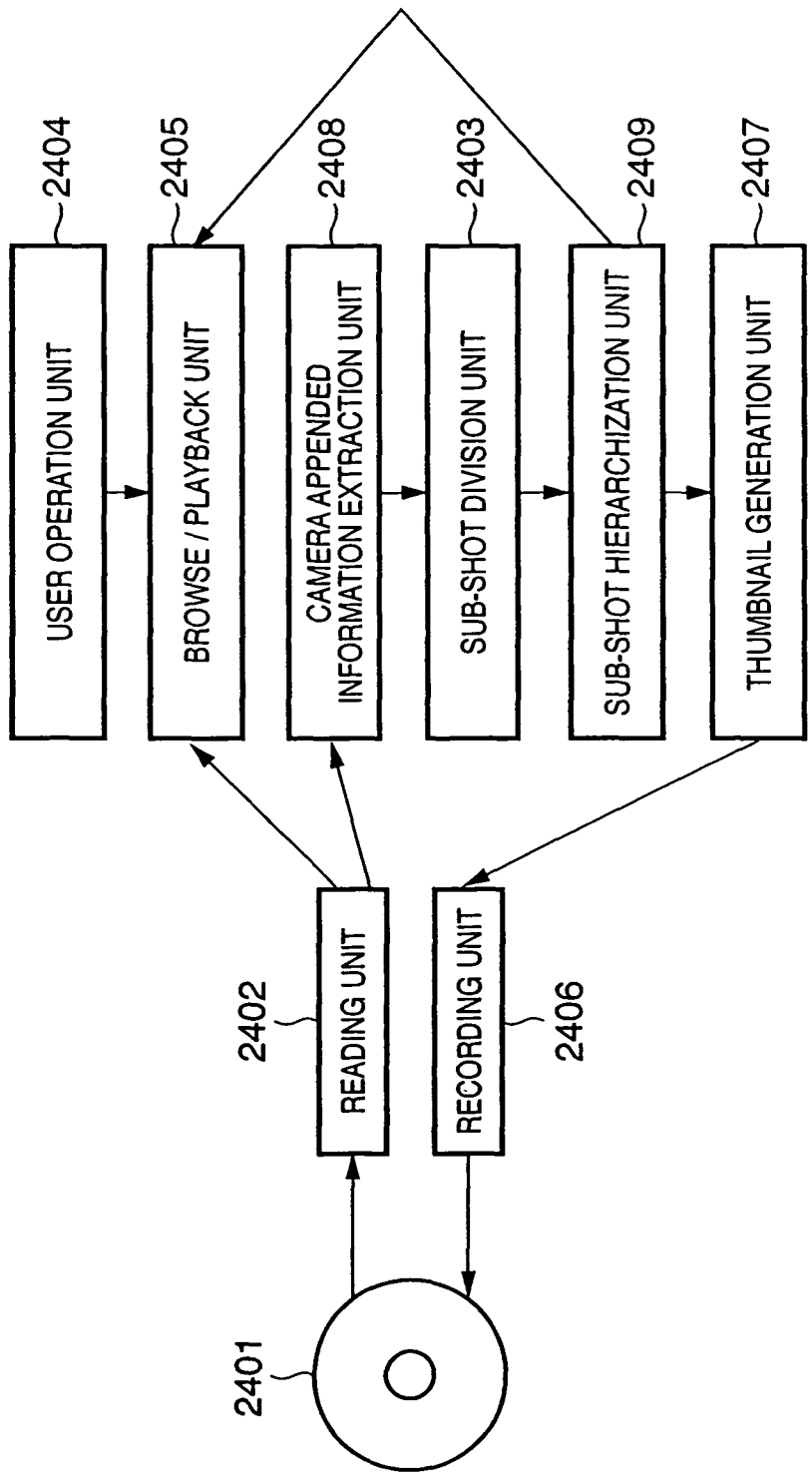
FIG. 24 is a block diagram showing the functional arrangement of a browse device according to the fifth embodiment.

FIG. 24 is a block diagram showing the functional arrangement of the browse device according to this embodiment. In FIG. 24, components 2401 to 2407 are the same as the components 2001 to 2007 of the fourth embodiment, and a description thereof will be omitted.

Reference numeral 2408 denotes a camera appended information extraction unit, which analyzes video data read out from a storage medium 2401 via a reading unit 2402, and extracts camera appended information which is not appended by the image sensing device 1010. In the following description, assume that, for example, pan/tilt information is not appended by the image sensing device 1010.

As a method of extracting pan/tilt information from video data, focuses of expansion of motion vectors are calculated using Huff transformation, a focus of expansion that gains a maximum score of a plurality of focuses of expansion is determined as that for a background, and constraint equations about pan/tilt information are solved. For further details about a method of calculating the relationship between the pan/tilt information and focuses of expansion, and the pan/tilt information, please refer to, for example, "Kenichi Kanatani, "Image Understanding", Morikita Shuppan". Camera appended information obtained by analyzing video data in this way is further added, and can be used in a sub-shot division unit 2403.

The pan/tilt information obtained in this way is added to the camera appended information storage area described using FIG. 5, and is used upon generating the contents of the sub-shot information storage area shown in FIG. 25.

Sixth Embodiment

In the fourth and fifth embodiments, two devices, that is, the image sensing device 1010 and browse device 1030 are used. Alternatively, if the image sensing device 1010 has sufficient processing performance, it may be used alone by including the functions of the browse device 1030. In this case, if sub-shot information is recorded on the storage medium 1020, the sub-shot division result can be used by other devices.

In the fourth and fifth embodiments, the sub-shot division unit 2003, thumbnail generation unit 2007, user operation unit 2004, and browse/playback unit 2005 are implemented on a single device. Alternatively, if sub-shot information (FIGS. 13 and 25) is recorded on the storage medium 2001 (2401), these units may form independent devices.

In the fourth and fifth embodiments, the sub-shot division unit 2003, thumbnail generation unit 2007, and camera appended information extraction unit 2408 are implemented on the browse device 1030. However, if the image sensing device 1010 has sufficient processing performance, these units may be implemented on the image sensing device 1010. In this case, the browse device 1030 can execute the browse process by recording sub-shot information (FIGS. 13 and 25) on the storage medium 1020 (storage medium 28).

In the fourth and fifth embodiments, the image sensing device 1010 generates camera appended information for each interval (FIGS. 5 and 6) during image sensing, and records the generated information in the storage medium 1020. However, if the image sensing device 1010 does not have a sufficient memory size or processing performance, camera appended information for each frame may be recorded, and a process for integrating the recorded information may be executed later. In this case, as a method of storing camera appended information for each frame, information may be stored in an unused area or the like in management information of image data. More specifically, in case of, for example, an MPEG-2 stream, information may be stored in a user area of a picture header. The image sensing device 1010 may also redundantly record camera appended information for respective frames even if it has performance that can record camera appended information for respective intervals. In this way, even when camera appended information for each interval is lost by a file operation and need be changed, camera appended information for each interval can be re-generated based on those for respective frames.

In the fourth and fifth embodiments, camera appended information and sub-shot information for respective intervals are stored in a binary format. However, an the image sensing device 1010 with sufficient processing performance or the browse device 1030 may be used, so that the information may be expressed in a text format, an XML (Extensible Markup Language) format by defining a unique DTD (Document Type Definition), or the like. When such information is stored in a format according to MPEG7, it may be stored in Segment DS.

In the fourth and fifth embodiments, camera appended information and sub-shot information are exchanged via the storage medium 1020, but may be exchanged by communication means such as IEEE1394 or the like.

In the fourth and fifth embodiments, one shot forms one moving image file. Alternatively, a plurality of shots may form one moving image file. In this case, identification numbers may be assigned to specify correspondence among respective shots, camera appended information, and sub-shot information.

In the fourth and fifth embodiments, three sub-shot division viewpoints, that is, "image sensing environment", "subject", and "subject size", have been exemplified. However, the present invention is not limited to such specific viewpoints, and various other viewpoints (for example, an effect ON/OFF state and the like) may be used. If the number of division viewpoints is increased, the number of layers may be increased accordingly.

Moreover, in the fourth and fifth embodiments, the sub-shot division result is used in browsing. However, if a sub-shot is defined as a basic unit, and viewpoint type designation means is provided, the sub-shot division result may be used by various other methods such as a moving image edit process, frame print process, digest playback process, and the like. For example, in case of the moving image edit process, if a sensed shot is divided into sub-shots from respective viewpoints, the division positions can be used to designate In and Out points of the edit process. In case of the frame print process, frame print candidates for each viewpoint can be presented by extracting central frames of sub-shot intervals. In case of the digest playback process, digest playback for the designated viewpoint can be executed by playing back respective sub-shots several seconds from their beginning.

Figure 31:
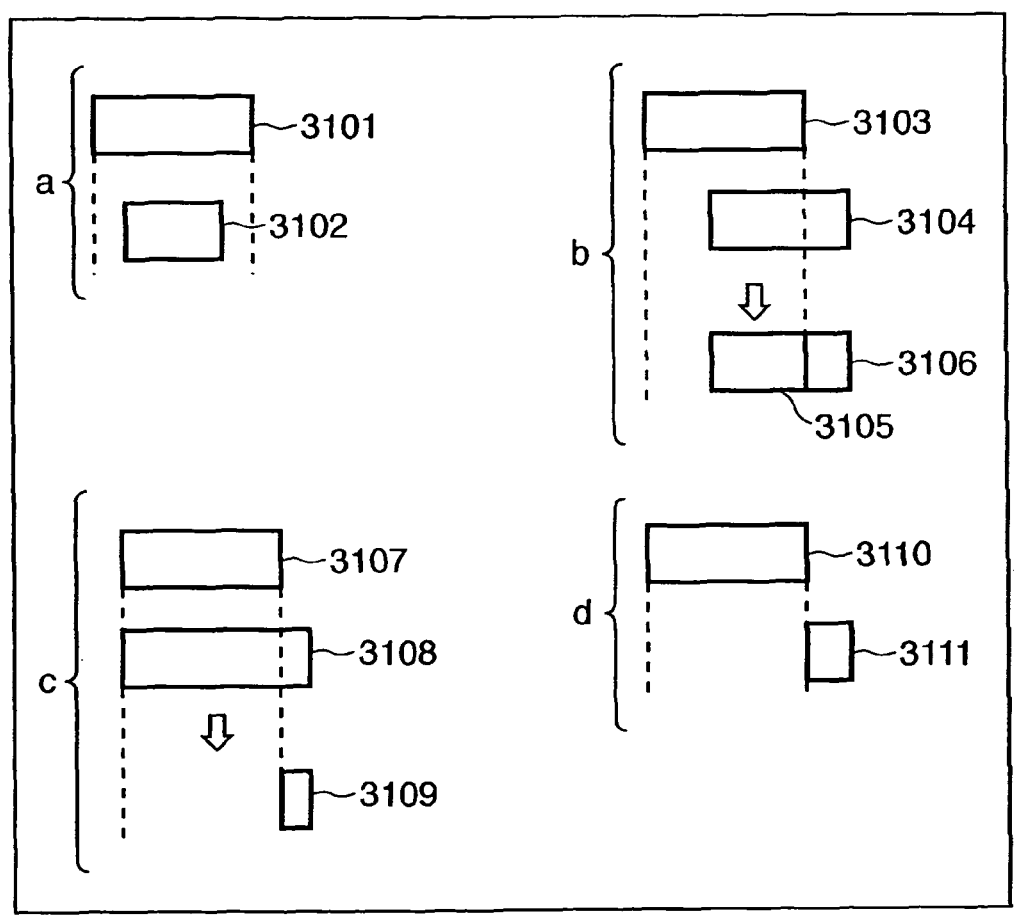
FIG. 31 is a view for explaining examples of the relationships among sub-shot intervals in the hierarchization process.

In the fourth and fifth embodiments, in the case (c) of FIG. 31, no lower layer is set since no more division is made. For example, when an interval corresponding to the lower layer (third layer) of a sub-shot of interest (in the second layer) cannot be divided, and is the same as the sub-shot of interest, the third layer is not set. In this case, a warning message "no lower layer is available" may be displayed upon depression of the "next" button 2104 in the browse mode, or the "next" button 2104 itself may be deactivated. However, even in such case, the third layer may be set, and upon depression of the "next" button 2104 in the browse mode, only one thumbnail having the same interval may be displayed.

In the fourth and fifth embodiments, the user interface shown in FIG. 21 is adopted. However, the present invention is not limited to such specific interface, and a button that can directly designate a target layer may be provided.

In the fourth and fifth embodiments, the hierarchical order list is sorted in ascending order of division count in step S2802. If hierarchization is always made using only a general hierarchical order, this step may be omitted. Alternatively, the user may designate a hierarchical order in advance. That is, the user may desirably set the hierarchical order of respective viewpoints in the hierarchical order list (a) in FIG. 30. Also, the user may designate whether or not to execute the sort process in step S2802.

As described above, according to the present invention, a moving image is divided into units for each viewpoint, and hierarchized sub-shots can be obtained. The user can narrow down sub-shots by repeating selection of a sub-shot and designation of sub-shot display. In this way, the user can quickly obtain a desired sub-shot.

Note that the objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a Floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore to apprise the public of the scope of the present invention, the following claims are made.

What is claimed is:

1. A moving image processing method for dividing a moving image sensed between a beginning of recording and an ending of recording, on the basis of a plurality of items of additional data which indicate states upon sensing the moving image, wherein the additional data is added to the moving image and is able to be read out for each item from the moving image, comprising:

a generation step of defining an item group formed of one or a plurality of items selected from the plurality of items, and generating division information corresponding to the item group on the basis of the additional data of the items which belong to the item group;

a hierarchization step of hierarchizing a plurality of division information generated for each item group, and of adding division positions based on division information of an upper layer to division positions of division information of a lower layer, wherein the plurality of division information is hierarchized and the division positions are added in a case that the plurality of division information is generated in the generation step in correspondence with a plurality of item groups; and a holding step of holding the division information obtained in the hierarchization step in correspondence with the moving image data in a memory.

2. The method according to claim 1, further comprising a setting step of setting the hierarchical order of the plurality of pieces of division information on the basis of division counts of the division information.

3. The method according to claim 2, wherein the setting step includes a step of setting division information with a smaller division count to have a higher hierarchical order.

4. The method according to claim 1, wherein the hierarchical order of the plurality of pieces of division information is set according to a hierarchical order which is set in advance for respective item groups.

5. The method according to claim 1, further comprising a designation step of designating the hierarchical order of the plurality of pieces of division information.

6. The method according to claim 1, further comprising:

a representative image generation step of generating and holding representative images which represent respective intervals of a moving image that are specified by division information of respective layers obtained in the hierarchization step; and a display step of displaying, when one interval of one layer is designated, representative images of intervals included in the designated interval in a layer lower than the one layer.

7. The method according to claim 6, further comprising an execution step of executing a predetermined process for an interval of a moving image, which corresponds to a representative image selected from the representative images displayed in the display step.

8. The method according to claim 1, further comprising a storage step of storing the division information obtained in the hierarchization step in a storage medium in correspondence with the moving image data.

9. The method according to claim 1, wherein the item group includes one of an environment upon sensing an image, a sensed subject, a subject size upon sensing an image, and an effect applied to a moving image.

10. A moving image processing apparatus for dividing a moving image sensed between a beginning of recording and an ending of recording, on the basis of a plurality of items of additional data which indicate states upon sensing the moving image, wherein the additional data is added to the moving image and is able to be read out for each item from the moving image, comprising:

a generation unit constructed to define an item group formed of one or a plurality of items selected from the plurality of items, and generating division information corresponding to the item group on the basis of the additional data of the items which belong to the item group;

a hierarchization unit constructed to hierarchize a plurality of division information generated for each item group, and constructed to add division positions based on division information of an upper layer to division positions of division information of a lower layer, wherein the plurality of division information is hierarchized and the division positions are added in a case that the plurality of division information is generated by the generation unit in correspondence with a plurality of item groups; and a holding unit constructed to hold the division information obtained by said hierarchization unit in correspondence with the moving image data.

11. A computer readable recording medium recording a control program which makes a computer execute a moving image processing method of claim 1.

12. A computer-executable control program stored on a computer-readable medium, for making a computer execute the moving image processing method of claim 1.

* * * * *